(12) United States Patent
Tokuchi

(10) Patent No.: US 10,587,763 B2
(45) Date of Patent: Mar. 10, 2020

(54) INFORMATION PROCESSING APPARATUS AND NON-TRANSITORY COMPUTER READABLE MEDIUM FOR COMBINING VIDEO CONTENTS AND USER IMAGE

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/052,643

(22) Filed: Aug. 2, 2018

(65) Prior Publication Data

US 2019/0182391 A1    Jun. 13, 2019

(30) Foreign Application Priority Data

Dec. 11, 2017    (JP) .................................. 2017-236582

(51) Int. Cl.
| | |
|---|---|
| *G06K 15/00* | (2006.01) |
| *H04N 1/00* | (2006.01) |
| *G06F 3/01* | (2006.01) |
| *G06T 19/00* | (2011.01) |

(52) U.S. Cl.
CPC ..... *H04N 1/00164* (2013.01); *H04N 1/00129* (2013.01); *H04N 1/00167* (2013.01); *G06F 3/011* (2013.01); *G06T 19/006* (2013.01)

(58) Field of Classification Search
CPC .......... H04N 1/00164; H04N 1/00129; H04N 1/00167; G06F 3/011; G06F 3/0482; G06F 3/012; G06F 3/044; G06T 19/006

USPC ......................................... 358/1.1–1.18, 402
See application file for complete search history.

(56) References Cited

U.S. PATENT DOCUMENTS

| | | |
|---|---|---|
| 5,900,849 A | 5/1999 | Gallery |
| 2014/0354515 A1 | 12/2014 | LaValle et al. |
| 2015/0163473 A1 | 6/2015 | Osawa et al. |
| 2015/0213778 A1 | 7/2015 | Moravetz |
| 2015/0234455 A1 | 8/2015 | LaValle et al. |
| 2016/0238841 A1 | 8/2016 | LaValle et al. |
| 2017/0004654 A1 | 1/2017 | Moravetz |
| 2017/0228923 A1 | 8/2017 | Kashihara |
| 2018/0028915 A1* | 2/2018 | Doucet ................. A63F 13/214 |
| 2018/0082483 A1 | 3/2018 | Moravetz |
| 2018/0096519 A1* | 4/2018 | Tokubo ................. G06F 1/1626 |
| 2018/0129047 A1 | 5/2018 | LaValle et al. |
| 2018/0160097 A1* | 6/2018 | Weng ....................... H04N 5/77 |
| 2018/0190022 A1* | 7/2018 | Zamir ................... G06T 19/006 |

FOREIGN PATENT DOCUMENTS

| | | |
|---|---|---|
| JP | H10504917 | 5/1998 |
| JP | 2001337294 | 12/2001 |
| JP | 2008089657 | 4/2008 |
| JP | 2013258614 | 12/2013 |
| JP | 5891131 | 3/2016 |
| JP | 2016140078 | 8/2016 |

(Continued)

*Primary Examiner* — Gabriel I Garcia
(74) *Attorney, Agent, or Firm* — JCIPRNET

(57) ABSTRACT

An information processing apparatus includes a controller. When a device that changes an image presented in a field of view of a user along with a motion direction of the user receives an output instruction, the controller performs a control to output an image including a presentation image of an area being presented to the user at a time when the output instruction is received and a user's own image.

19 Claims, 45 Drawing Sheets

(56) References Cited

FOREIGN PATENT DOCUMENTS

| | | |
|---|---|---|
| JP | 2016158795 | 9/2016 |
| JP | 2016214822 | 12/2016 |
| JP | 6087453 | 3/2017 |
| JP | 2017506449 | 3/2017 |
| JP | 2017102298 | 6/2017 |
| JP | 2017102732 | 6/2017 |
| JP | 2017120441 | 7/2017 |
| JP | 2017138973 | 8/2017 |

* cited by examiner

FIG. 14

| USER IMAGE ID 1405 | CAPTURING DATE/TIME 1410 | TYPE 1415 | CAPTURING ANGLE 1420 | CAMERA-TO-USER DISTANCE 1425 | TWO-DIMENSIONAL IMAGE /THREE-DIMENSIONAL IMAGE 1430 | USER IMAGE 1435 |
|---|---|---|---|---|---|---|
| u0001 | 2017/12/24/9:00 | SMILING FACE | CAPTURED FROM OBLIQUELY UPPER RIGHT SIDE | 1 m | TWO-DIMENSIONAL IMAGE | |
| .... | .... | .... | .... | .... | .... | .... |

| TARGET IMAGE ID 1505 | TIME 1510 | DISPLAY POSITION 1515 | TARGET IMAGE 1520 |
|---|---|---|---|
| g0001 | 2017/12/25/9:00 | 10°~170° |  |
| .... | .... | .... | .... |

| TARGET IMAGE ID 1605 | USER IMAGE ID 1610 | COMBINATION POSITION 1615 | | |
|---|---|---|---|---|
| | | X 1620 | Y | Z 1630 |
| | | | | |

1600
1625

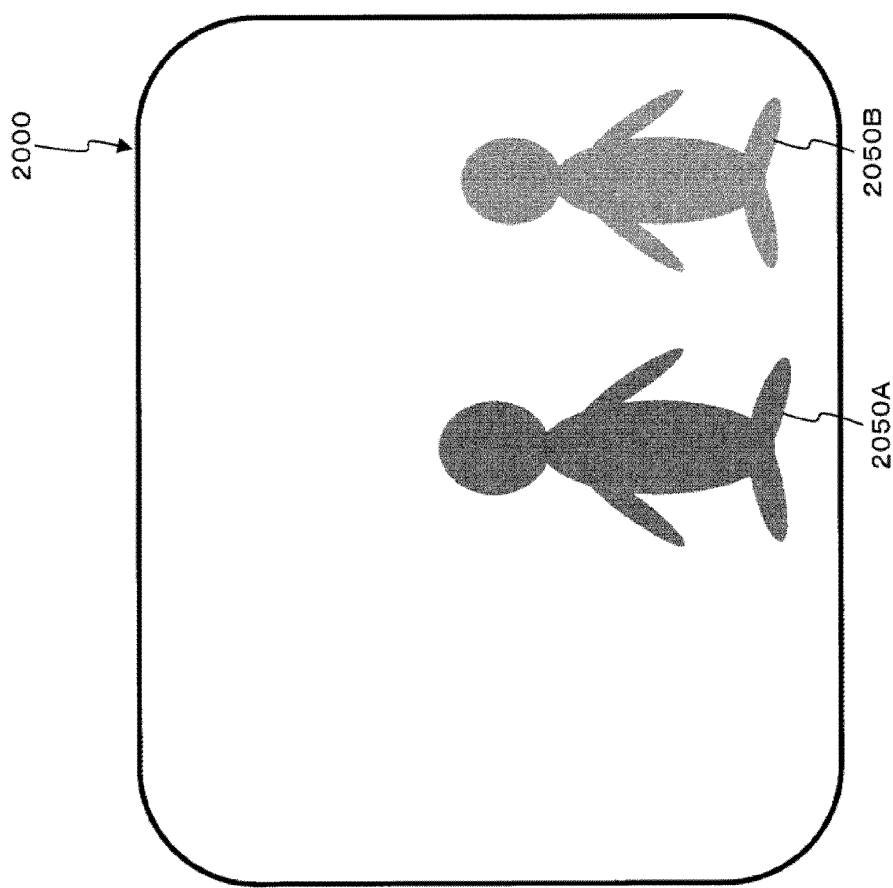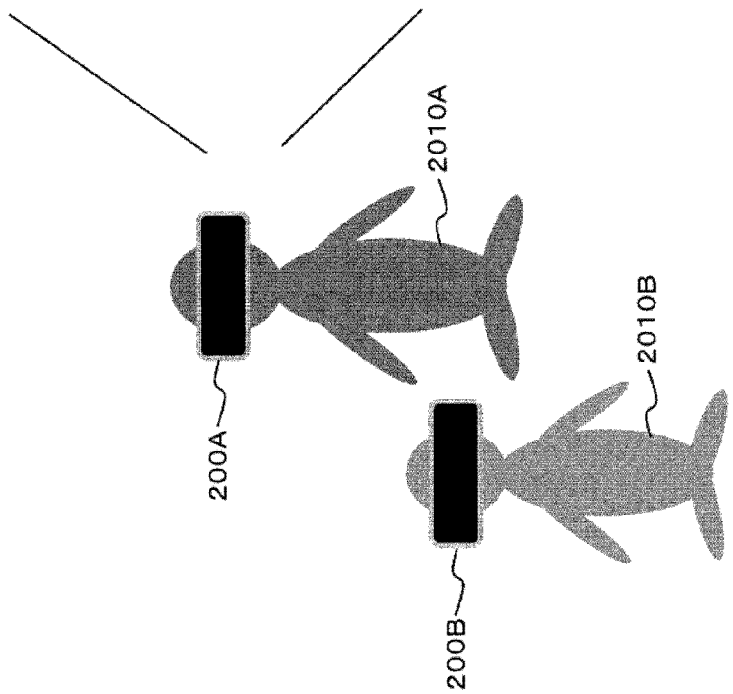
FIG. 20

| 2805 | 2810 | 2815 | 2820 | |
|---|---|---|---|---|
| PRINTER ID | BORDERLESS PRINT-ABLE/UNPRINTABLE | BLACK-AND-WHITE/COLOR | PAPER SIZE | .... |
| | | | | |

| PRINTING INSTRUCTION | PRINTING DATA | PAPER SIZE | PRINT ORIENTATION | NUMBER OF COPIES | BORDERLESS PRINTING | | | | ... |
|---|---|---|---|---|---|---|---|---|---|
| | | | | | UPPER SIDE | RIGHT SIDE | LOWER SIDE | LEFT SIDE | |

| DATE/TIME | NUMBER OF BORDERLESS PRINTING COPIES | | | | PAPER SIZE | BLACK-AND -WHITE/COLOR | USER |
|---|---|---|---|---|---|---|---|
| | UPPER SIDE | RIGHT SIDE | LOWER SIDE | LEFT SIDE | | | |
| 4510 | 4522 | 4524 | 4526 | 4528 | 4530 | 4540 | 4550 |

4500
4520

INFORMATION PROCESSING APPARATUS AND NON-TRANSITORY COMPUTER READABLE MEDIUM FOR COMBINING VIDEO CONTENTS AND USER IMAGE

CROSS-REFERENCE TO RELATED APPLICATIONS

This application is based on and claims priority under 35 USC 119 from Japanese Patent Application No. 2017-236582 filed Dec. 11, 2017.

BACKGROUND

Technical Field

The present invention relates to an information processing apparatus and a non-transitory computer readable medium.

SUMMARY

According to an aspect of the present disclosure, an information processing apparatus includes a controller. When a device that changes an image presented in a field of view of a user along with a motion direction of the user receives an output instruction, the controller performs a control to output an image including a presentation image of an area being presented to the user at a time when the output instruction is received and a user's own image.

BRIEF DESCRIPTION OF THE DRAWINGS

Exemplary embodiment(s) of the present invention will be described in detail based on the following figures, wherein:

FIG. 14 is an explanatory view illustrating an example of the data structure of a user image table;

FIG. 15 is an explanatory view illustrating an example of the data structure of a target image table;

FIG. 16 is an explanatory view illustrating an example of the data structure of a combination result table;

FIG. 20 is an explanatory view illustrating an example of a process according to the exemplary embodiment;

FIGS. 29A to 29C are explanatory views illustrating examples of a process according to the exemplary embodiment;

FIG. 37 is an explanatory view illustrating an example of the data structure of a printing instruction table;

FIG. 45 is an explanatory view illustrating an example of the data structure of a borderless printing log table;

DETAILED DESCRIPTION

Hereinafter, an exemplary embodiment of the present disclosure will be described with reference to the accompanying drawings.

Figure 1:
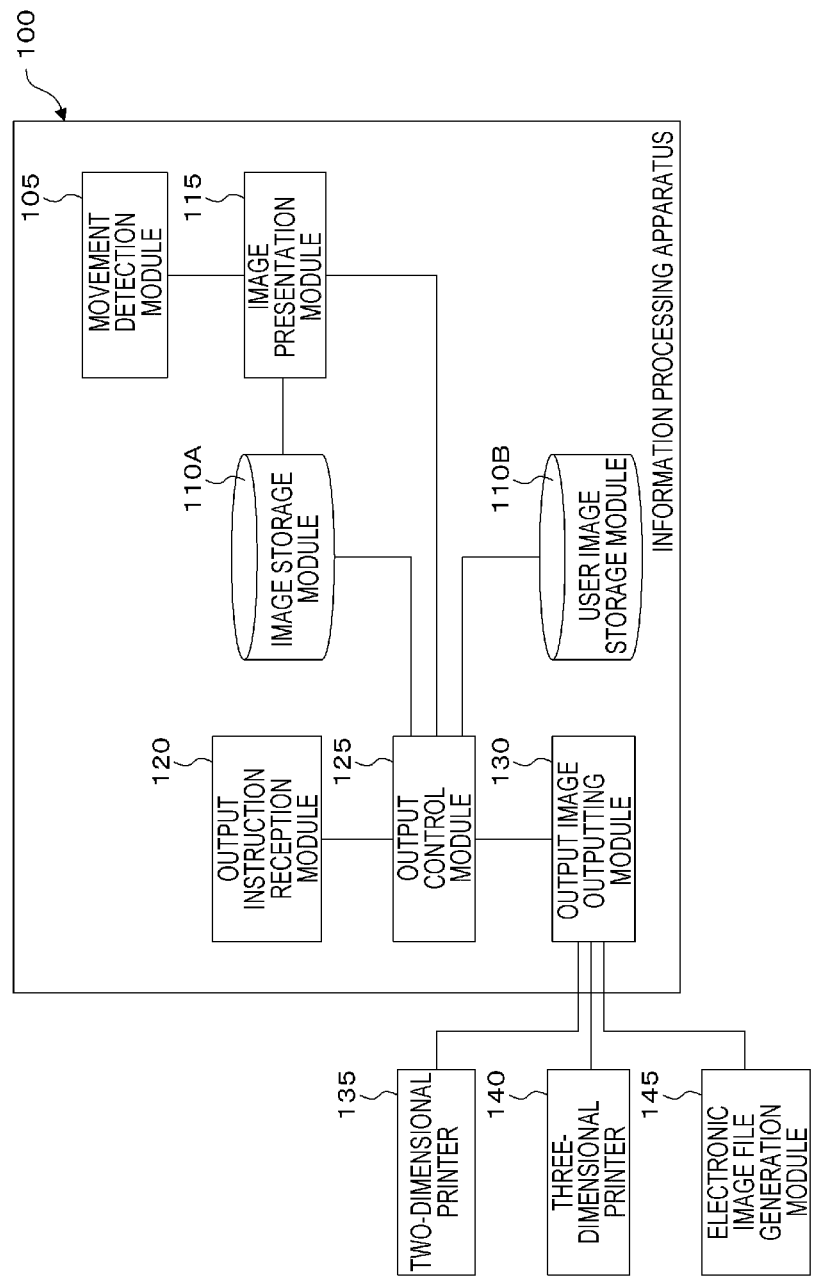
FIG. 1 is a conceptual module configuration diagram of an example of the configuration of an exemplary embodiment.

FIG. 1 illustrates a conceptual module configuration diagram of an example of the configuration of the exemplary embodiment.

In general, modules refer to logically separable components of, for example, software (computer program) or hardware. Accordingly, modules in the present exemplary embodiment indicate not only modules in a computer program but also modules in a hardware configuration. Thus, the description of the present exemplary embodiment also include a description of a computer program that causes a computer to function as those modules (a program that causes a computer to execute respective processes, a program that causes a computer to function as respective units, or a program that causes a computer to implement the respective functions), a system, and a method. For the convenience of the description, the expressions "store," "caused to store," and equivalent expressions thereto will be used. When the present exemplary embodiment is a computer program, these expressions mean storing something in a storage device or performing a control to store something in a storage device. In addition, one module may correspond to one function. In implementation, however, one module may be configured with one program, plural modules may be configured with one program, or in reverse, one module may be configured with plural programs. Further, plural modules may be executed by one computer, or one module may be executed by plural computers in a distributed or parallel environment. In addition, one module may include another module. In addition, hereinafter, the term "connection" is used in a case of a logical connection as well (e.g., data exchange, instructions, a reference relationship among data, and login), in addition to a physical connection. The term "predetermined" refers to being determined prior to a target process. The term "predetermined" includes the meaning of being determined according to a circumstance/state at or until a specific time point not only before a process according to the present exemplary embodiment is started, but also prior to the target process even after the process according to the present exemplary embodiment is started. When plural "predetermined values" exist, the values may be different from each other, or two or more of the values (including all of the values) may be identical to each other. In addition, the description "when it is A, B is performed" means that "it is determined whether it is A or not, and when it is determined that it is A, B is performed," except for a case where the determination of whether it is A or not is unnecessary. In addition, when items are enumerated like "A, B, and C," the enumeration is merely exemplary and includes a case of selecting only one of the items (e.g., only A), unless otherwise specified.

In addition, a system or an apparatus includes the configuration implemented by, for example, one computer, one hardware component, or one device as well, in addition to the configuration in which, for example, plural computers, plural hardware components, or plural devices are connected to each other by a communication unit such as a network (including a one-to-one corresponding communication connection). The terms "apparatus" and "system" are used as synonyms. The "system" does not include a system merely meaning a social "structure" (social system) which is an artificial engagement.

In addition, target information is read from a memory device per process which is performed by each module or for each process in a case where plural processes are performed in a module. After the process is executed, the process result is written in a storage device. Thus, the description of the reading from the storage device prior to the process and the writing in the storage device after the process may be omitted. In addition, examples of the storage device may include a hard disk, a random access memory (RAM), an external storage medium, a storage device through a communication line, and a register in a central processing unit (CPU).

An information processing apparatus 100 of the present exemplary embodiment enables an output of an image when a device that changes a presented image along with a motion direction of a user receives an output instruction. As in the example illustrated in FIG. 1, the information processing apparatus 100 includes a movement detection module 105, an image storage module 110A, a user image storage module 110B, an image presentation module 115, an output instruction reception module 120, an output control module 125, and an output image outputting module 130.

The "device that changes a presented image along with a motion direction of a user" is, for example, a head mounted display. The head mounted display refers to a display which is used in a state of being mounted on a head, such as a goggle, a helmet, or eye glasses. The head mounted display is also called "smart glasses."

The virtual reality (VR) is a technology which artificially generates realistic environments to interact with the human sensory organs, and is implemented by a system which displays images generated by a computer in real time on the head mounted display.

In addition, the phrase "along with a motion direction of a user" refers to detecting a movement of, for example, a user's body such as the user's head or a user's gaze and reflecting the detection result on the display.

The movement detection module 105 is connected to the image presentation module 115. The movement detection module 105 detects a motion of the user. As described above, the movement detection module 105 detects a movement of the user's body such as the head or the user's gaze.

The image storage module 110A is connected to the image presentation module 115 and the output control module 125. The image storage module 110A stores an image that can be presented in the field of view of the user. The image storage module 110A stores data such as a moving image, a still image, a three-dimensional image, and audio. Specifically, the image storage module 110A stores a 360-degree surrounding image at each time. It is noted that the stored images do not necessarily show 360-degree surroundings. That is, even a case where images of surroundings only up to a specific angle are prepared satisfies the "device that changes a presented image along with a motion direction of a user" in the present disclosure. When the image of surroundings can be switched and displayed only up to the specific angle, a control process may be performed such that no image exists or image switching is not performed beyond the specific angle. In addition, when, for example, a moving image, a still image, a three-dimensional image, or audio of an object to be output is not associated with a play time (i.e., when there is no association between the object to be output and a play time), the object that is being played is specified only according to the angle, and the process of the present exemplary embodiment is performed according to the user's motion direction and the user's output instruction of at that time.

The user image storage module 110B is connected to the output control module 125. The user image storage module 110B stores an image of the user. The image of the user is, for example, an image obtained by capturing the entire body of the user (which may include three-dimensional data), or an image obtained by capturing the face of the user (which may include three-dimensional data). As for the user, in addition to the image of the user who is using the information processing apparatus 100, an image of another user may be stored. As described later, the image of the other user may be a user image of another user who is using the same contents as the contents being processed in the information processing apparatus 100, or a user image of another user present near the user who is using the information processing apparatus 100. Specifically, for example, a user image table 1400 to be described later using an example of FIG. 14 is stored.

The image presentation module 115 is connected to the movement detection module 105, the image storage module 110A, and the output control module 125. The image presentation module 115 changes an image presented in the field of view of the user, along with the motion of the user detected by the movement detection module 105.

In the VR, an image located in the 360-degree directions is displayed according to each scene of application software. That is, when X minutes elapse from the start of the application software, a 360-degree surrounding image for a scene after the X minutes is displayed, and when Y hours elapse, a 360-degree surrounding image for a scene after the Y hours is displayed. It is noted that since the human's field of view is basically about 180 degrees, an area is cut out and displayed to fit a display unit of a virtual reality display apparatus 200, in a range that can correspond to the field of view.

The internal configuration of the image presentation module 115 will be described later using an example of FIG. 3.

The output instruction reception module 120 is connected to the output control module 125. The output instruction reception module 120 receives an output instruction from the user. The output instruction is given by, for example, a button provided in the information processing apparatus 100, an operation of a controller (e.g., a remote control device) connected to the information processing apparatus 100 (e.g., an operation by raising the controller upward and rightward), an instruction by voice, an operation by a movement of the gaze (e.g., an operation by gazing at an output instruction button presented in the field of view of the user, or eye blinking), or a movement of the head part (e.g., a gesture such as a head shaking from side to side or nodding). These operations are analyzed (e.g., voice recognition, gaze analysis, or gesture analysis) and received as the output instruction.

The output control module 125 is connected to the image storage module 110A, the user image storage module 110B, the image presentation module 115, the output instruction reception module 120, and the output image outputting module 130. When the device that changes an image presented in the field of view of the user along with the motion direction of the user receives the output instruction, the output control module 125 performs a control to output an area of an image being presented to the user at the time when the output instruction is received. The output destination is an output device such as a two-dimensional printer 135, a three-dimensional printer 140, or an electronic image file generation module 145. The output destination may be selected in such a manner that a selection screen is presented to the user and the user selects the output destination or may be selected according to a predetermined priority. When the selection screen or the priority is determined, the selection screen or priority may be determined according to an object present in an image being currently displayed. That is, when an object having simple two-dimensional information is displayed, the priority is given to the two-dimensional printer 135 or the electronic image file generation module 145. Meanwhile, when an object having three-dimensional information is displayed, the priority is given to the three-dimensional printer 140. The three-dimensional information is, for example, information defined by stereolithography standard triangulated language (STL), voxel, or fabricatable voxel (FAV).

In addition, the output control module 125 may perform a control to output the image to the electronic image file generation module 145 that generates an electronic image file of the image. In addition, the electronic image file generation module 145 may be provided in the information processing apparatus 100 or may be an apparatus outside the information processing apparatus 100.

In addition, the output control module 125 may perform a control to output the image to the three-dimensional printer 140 that generates a three-dimensional object from the image. When the area being presented in the field of view of the user includes three-dimensional data, the output control module 125 may perform a control to output at least the three-dimensional data to the three-dimensional printer 140.

In addition, the output control module 125 may perform a control to output the image to the two-dimensional printer 135 that prints the image on a two-dimensional recording medium. The two-dimensional recording medium is, for example, paper, label, fabric or resin.

In addition, when the output instruction is received, the output control module 125 may perform a control so that a form of the image to be output on the two-dimensional recording medium is caused to be a borderless form.

In addition, when the output instruction is received, the output control module 125 may perform a control to determine the form of the image to be output on the two-dimensional recording medium, according to whether the output destination is capable of performing a borderless printing.

For example, when the output instruction is received and when the output destination is capable of performing the borderless printing, the output control module 125 may perform a control so that the form of the image to be output on the two-dimensional recording medium is caused to be the borderless form.

In addition, when the output instruction is received and when the output destination is incapable of performing the borderless printing, the output control module 125 may perform a control so that the form of the image to be output on the two-dimensional recording medium is caused to be a bordered form.

In addition, when the device that changes an image presented in the field of view of the user along with the motion direction of the user receives the output instruction, the output control module 125 performs a control to output an image including a first image of an area that is being presented to the field of view of the user at the time when the output instruction is received, and a second image outside the area.

The "image including the first image and the second image" may be either an image obtained by combining the first image and the second image to be superposed on each other, or an image obtained by combining the first image and the second image to be connected to each other.

In addition, the output control module 125 may perform the control to output the image including the first image and the second image to the electronic image file generation module 145 that generates an electronic image file of the image including the first image and the second image.

In addition, the output control module 125 may perform the control to output the image including the first image and the second image to the three-dimensional printer 140 that generates a three-dimensional object from the image including the first image and the second image. In addition, when three-dimensional data is included in the area that is being presented to the user, at least the three-dimensional data may be output to the output destination. When three-dimensional data is included in the area of the second image as well, the control may be performed so that the three-dimensional printer 140 outputs the three-dimensional data.

In addition, the output control module 125 may perform the control to output the image including the first image and the second image to the two-dimensional printer 135 that prints the image including the first image and the second image on a two-dimensional recording medium. Then, when the output instruction is received, the form of the image to be output on the two-dimensional recording medium may be caused to be a borderless form.

In addition, when the output instruction is received, the output control module 125 may set a form of the image to be output on the two-dimensional recording medium to be a borderless form.

In addition, when the output instruction is received, the output control module 125 may determine the form of the image to be output on the two-dimensional recording medium, according to whether the output destination is capable of performing a borderless printing.

For example, when the output instruction is received and when the output destination is capable of performing the borderless printing, the output control module 125 may set the form of the image to be output on the two-dimensional recording medium to be the borderless form.

For example, when the output instruction is received and when the output destination is incapable of performing the borderless printing, the output control module 125 may set the form of the image to be output on the two-dimensional recording medium to be the bordered form.

In addition, the second image is an image that is presentable but is not included in the field of view of the user at the time when the output instruction is received. For example, the second image is an image that the user may be able to see by turning his/her head but is not seeing (an image that the user cannot see or an image outside the field of view). Specifically, the second image corresponds to an image behind the user at the time when the output instruction is received.

In addition, the second image is an image located at a position on any one or more of the left side, the right side, the upper side, and the lower side of the first image. A positional relationship between the first image and the second image is illustrated.

In addition, when outputting the image including the first image and the second image, the output control module 125 may perform the output so that the first image and the second image are distinguished from each other. For example, a figure indicating a boundary between the first image and the second image may be added and output. The figure indicating the boundary may be, for example, a line (e.g., a white line or a red line). In addition, the first image may be output as it is, and the second image may be output lightly.

In addition, the output control module 125 may determine in which direction of the first image the second image is arranged. As for "in which direction of the first image the second image is arranged," the first image and the second image form a panoramic image. It is determined, for example, (1) whether to arrange the second image while centering the first image, (2) whether to output the second image clockwise with respect to the first image (arrange the second image on the right side of the first image), or (3) whether to output the second image counterclockwise with respect to the first image (arrange the second image on the left side of the first image).

In addition, the arrangement may be determined according to an instruction from the user or according to a predetermined arrangement.

In addition, the output control module 125 may determine a position of the first image and arrange the second image around the position.

In addition, when an image non-display area exists at an edge of a display area of the image being presented by the device (as a specific example, the head mounted display) and when the output instruction is received, the output control module 125 may preferentially output a bordered image.

In addition, where the image non-display area does not exist at the edge of the display area of the image being presented by the device and when the output instruction is received, the output control module 125 may preferentially output a borderless image.

The output control module 125 may generate the second image using the data in the image storage module 110A.

In addition, the output control module 125 may assume that a motion B is performed in addition to a motion A of the user at the time when the output instruction is received and may cause the image presentation module 115 to generate an image to be presented. The motion B is a motion to cause an image, other than the image presented by the motion A, to be presented. Specifically, the motion B is a motion for seeing an area that cannot be seen by the motion A, and corresponds to, for example, a motion of turning the head.

Because there is a possibility of a different development if the user is seeing an area that the user does not see, the image presentation module 115 is caused to generate an image on the assumption that the user performs such a motion. For example, when the user is looking at the back in a game, a different story is developed. To this end, the output control module 125 transfers the result equivalent to the detection result by the movement detection module 105 to the image presentation module 115, and causes the image presentation module 115 to generate an image on the assumption that the motion is performed at the date and time when the output instruction is received.

In addition, when a borderless image exists in only one of the first image of the area being presented to the field of view of the user and the second image outside the area, the output control module 125 may inquire the user about a setting of the output.

In addition, when a uniform image exists in the second image which is an area outside the field of view of the user, the output control module 125 notifies the user of a warning of the output.

In addition, when an image instructed by the user's operation to be output includes an image which is inadequate, the output control module 125 performs the output excluding an image inadequate to the output.

In addition, when the device that changes an image presented in the field of view of the user along with the motion direction of the user receives the output instruction, the output control module 125 performs a control to output an image including a presentation image that is being presented to the field of view of the user at the time when the output instruction is received, and a user's own image (an image of a user who is using the information processing apparatus 100).

In addition, the output control module 125 may output the image including the presentation image and the user image to the electronic image file generation module 145 that generates an electronic image file of the image including the presentation image and the user's own image.

In addition, the output control module 125 may output the image including the presentation image and the user image to the three-dimensional printer 140 that generates a three-dimensional object from the image including the presentation image and the user image. When the area being presented to the user includes three-dimensional data, the output control module 125 may perform a control to output at least the three-dimensional data to the three-dimensional printer 140.

In addition, the output control module 125 may output the image including the presentation image and the user image to the two-dimensional printer 135 that prints the image including the presentation image and the user image on a two-dimensional recording medium.

Then, in that case (where the image including the presentation image and the user image is output), when receiving the output instruction, the output control module 125 may perform a control to cause a form of the image to be output on the two-dimensional recording medium to be a borderless form.

In addition, when the output instruction is received, the output control module 125 may perform a control to determine the form of the image to be output on the two-dimensional recording medium, according to whether the output destination is capable of performing a borderless printing.

For example, when the output instruction is received and when the output destination is capable of performing the borderless printing, the output control module 125 may perform a control so that the form of the image to be output on the two-dimensional recording medium is caused to be the borderless form.

In addition, when the output instruction is received and when the output destination is incapable of performing the borderless printing, the output control module 125 may perform a control so that the form of the image to be output on the two-dimensional recording medium is caused to be a bordered form.

In addition, the output control module 125 may perform a control to output an image including the presentation image, the user image, and a user image of another user.

For example, when there is another user B who is using the same contents as the contents (application) being processed in the information processing apparatus 100, the output control module 125 may perform a control to output an image including the presentation image, the user image, and a user image of the other user B. For example, when there is a user B who is enjoying the same game in another information processing apparatus 100 (more specifically, when two users are competing or cooperating with each other in a game), the user image of the user who is using the information processing apparatus 100 and the image of the user B who is using the other information processing apparatus 100 are combined with the presentation image and output.

For example, when the output control module 125 receives the output instruction and when another user C is present near the user who is using the information processing apparatus 100, the output control module 125 may perform a control to output an image including the presentation image, the user image, and a user image of the other user C. For example, when there is the user C who is using another information processing apparatus 100 at a (physically) nearby place in the real world (regardless of whether the user C is using the same contents), the user images of the user who is using the information processing apparatus 100 and the user C who is using the other information processing apparatus 100 are combined with the presentation image and output.

In addition, when the user moves to a predetermined position in the contents being processed in the information processing apparatus 100, the output control module 125 may urge the user to make the output instruction or may determine that the output instruction is received and perform the control of the output. For example, when the user moves to a symbolic spot where it can be recognized that the user is using the contents (more specifically, an instagram worthy scene), a message urging the user to take a photograph may be presented, or a photograph may be automatically taken.

In addition, when receiving the output instruction, the output control module 125 may receive a setting change of the user's own image. For example, the setting change may be related to an arrangement position or angle of the user image. Alternatively, the setting change may be related to the facial expression of the user in the user image.

In addition, when performing the output, the output control module 125 may generate information for managing history information of the user and the image to be output. In addition, the generated information may be embedded in the image to be output. This information may be used as history information for the user (e.g., indicating when the contents are used or what contents are used), or may have a function as identification information. "Embedding the information in the image" may be implemented using an information hiding (data hiding) technique such as electronic watermarking. The information hiding technique may be either a perceptible type in which a human being also can perceive the embedded information, or an imperceptible type in which it is hard for a human being to perceive the embedded information. The history information may be managed in the information processing apparatus 100 or in an external device such as a server that manages the VR contents.

The output image outputting module 130 is connected to the output control module 125, the two-dimensional printer 135, the three-dimensional printer 140, and the electronic image file generation module 145. The output image outputting module 130 outputs an image to the two-dimensional printer 135, the three-dimensional printer 140 or the electronic image file generation module 145, according to the control of the output control module 125. The communication between the output image outputting module 130 and the two-dimensional printer 135, the three-dimensional printer 140 or the electronic image file generation module 145 may be either a wired or wireless communication.

The two-dimensional printer 135 is connected to the output image outputting module 130 of the information processing apparatus 100. The two-dimensional printer 135 prints an image transferred from the output image outputting module 130 on the two-dimensional recording medium. The two-dimensional printer 135 is, for example, a general printer. For example, the two-dimensional printer 135 may use any of an electrophotographic method and an inkjet method.

The three-dimensional printer 140 is connected to the output image outputting module 130 of the information processing apparatus 100. The three-dimensional printer 140 generates a three-dimensional object according to the image (including the three-dimensional data) transferred from the output image outputting module 130. That is, the three-dimensional printer 140 is a device that shapes a three-dimensional object (product) based on the three-dimensional data. The three-dimensional printer 140 may also be called a 3D printer. As for the shaping method, for example, any of the stereolithography, a powder method, fused deposition modeling, sheet lamination, and an inkjet method may be used.

The electronic image file generation module 145 is connected to the output image outputting module 130 of the information processing apparatus 100. The electronic image file generation module 145 generates an electronic image file of the image transferred from the output image outputting module 130. For example, the electronic image file generation module 145 converts the image into a PDF (portable document format) file. It is noted that the electronic image file generation module 145 may be provided in the information processing apparatus 100.

Figure 2:
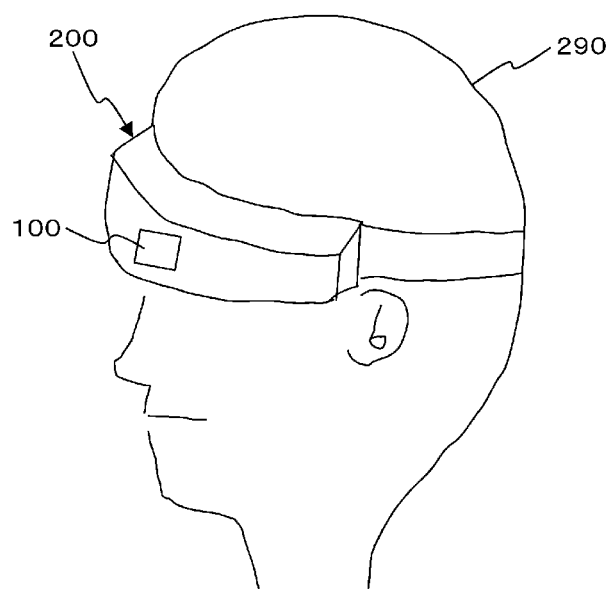
FIG. 2 is an explanatory view of an example of the system configuration using the exemplary embodiment.

FIG. 2 is an explanatory view illustrating an example of the system configuration using the present exemplary embodiment.

The virtual reality display apparatus 200 is called a head mounted display. The virtual reality display apparatus 200 includes the information processing apparatus 100. The virtual reality display apparatus 200 has, for example, a goggle shape. Alternatively, the virtual reality display apparatus 200 may have a shape of eye glasses. The image presentation module 115 of the information processing apparatus 100 includes a presentation unit (e.g., a display or screen) configured to cover the vision (field of view or a field in front of eyes) of a user 290 wearing the virtual reality display apparatus 200. That is, the virtual reality display apparatus 200 is configured so that when the virtual reality display apparatus 200 is mounted on the head of the user 290, the presentation unit of the image presentation module 115 is disposed in front of the left and right eyes of the user 290. As a result, the user 290 views only an image presented by the image presentation module 115 in the field of view, and can be immersed in the virtual space. The image presentation module 115 may be configured with a left-eye presentation unit to be projected to the left eye of the user 290 and a right-eye presentation unit to be projected to the right eye of the user 290.

The movement detection module 105 of the information processing apparatus 100 includes at least one of a geomagnetic sensor, an acceleration sensor, an inclination sensor (e.g., an angular velocity sensor or a gyroscope sensor) or a gaze sensor. The movement detection module 105 of the information processing apparatus 100 is capable of detecting various movements of the virtual reality display apparatus 200 mounted on the head of the user 290 (that is, various movements of the head of the user) or the gaze of the user 290.

In addition, the virtual reality display apparatus 200 may include, for example, a controller operated by the user 290, a microphone receiving the voice of the user 290, a speaker (including headphones and earphones) outputting the voice, and a motion sensor that detects a movement of the body (e.g., the hands, fingers, legs, and the like) of the user 290.

For example, after the virtual reality display apparatus 200 is activated, a reference position of the user 290 is determined. By estimating an amount of a displacement (angular change such as gyro) from the reference position, it is determined which image in the 360-degree surroundings in the scene is to be displayed based on the reference position. Thus, when the output instruction is made at the currently displayed position of the user 290 which is determined for each scene, a displayed image or the displayed image and an image that can be displayed but is not displayed at the time point are output to any one of the two-dimensional printer 135, the three-dimensional printer 140, and the electronic image file generation module 145, or a combination thereof. An output destination is determined, for example, through a selection screen, based on a device (the two-dimensional printer 135, the three-dimensional printer 140, or the electronic image file generation module 145) connected at that time, or based on the priorities which are defined by the user 290 in advance.

When the output instruction is made, a preview screen of the image to be output may be displayed, a screen for various settings such as a size may be displayed as in an output instruction from a general personal computer, and the output may be determined after the instruction is completed on the screen. For example, on the preview screen, the arrangement position and angle of the user image, and the facial expression of the user 290 may be changeable.

In addition, the electronic image file generation module 145 may post the generated image file on, for example, SNS (social networking service). Especially, when the image including the user's own image is output, the image may be posted as a photograph that the user takes of the user herself.

The contents of the VR are, for example, games, travel, real estate preview, and school classes.

Figure 3:
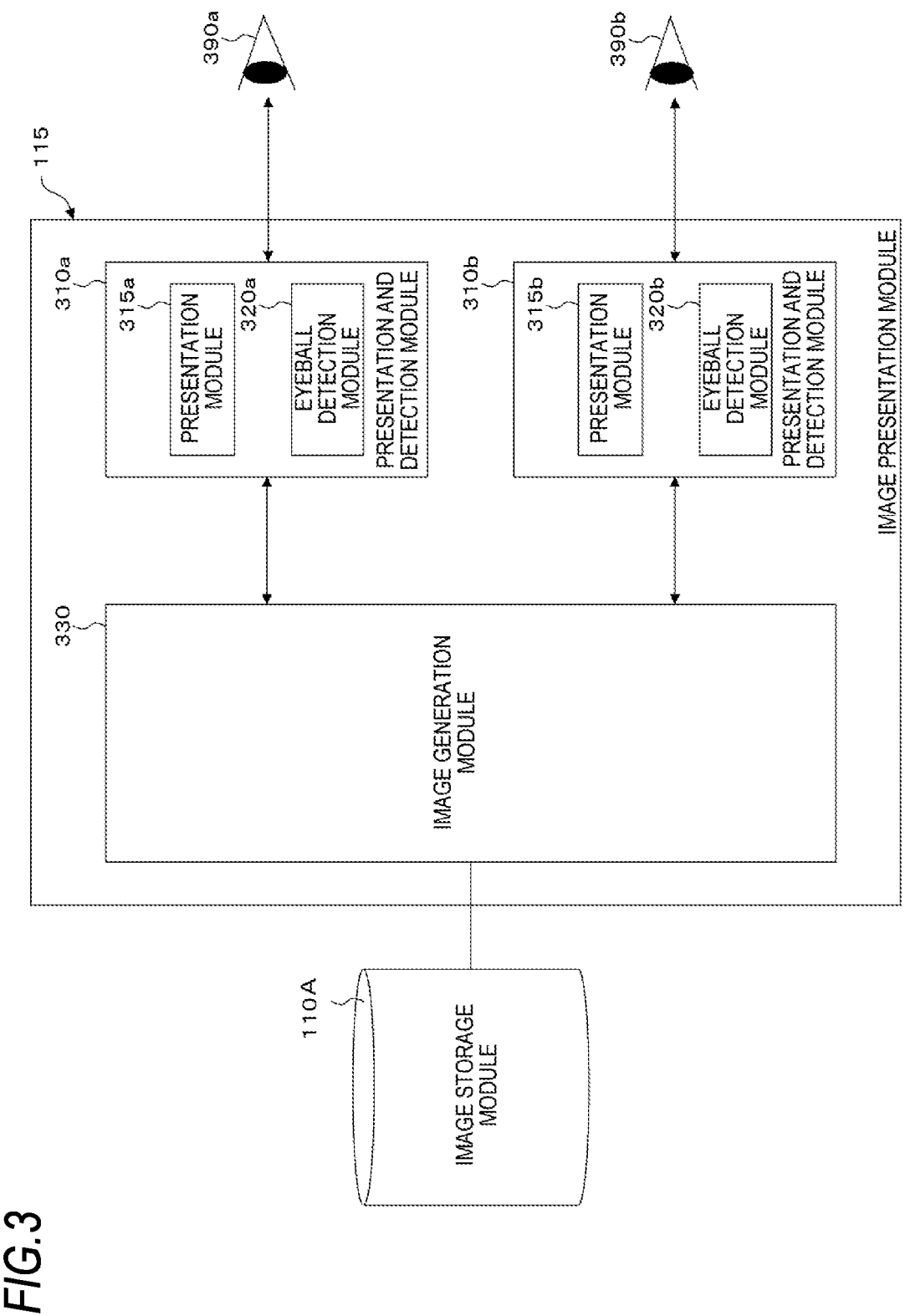
FIG. 3 is a conceptual module configuration diagram of an example of the configuration of an image presentation module.

FIG. 3 is a conceptual module configuration diagram illustrating an example of the configuration of the image presentation module 115.

The image presentation module 115 includes presentation and detection modules 310a and 310b and an image generation module 330. It is noted that the presentation and detection modules 310a and 310b, presentation modules 315a and 315b, and eyeball detection modules 320a and 320b have the same configurations for both of the left and right eyes. Thus, these components will be denoted with the reference numerals 310, 315, and 320 in the following descriptions.

The image storage module 110A is connected to the image generation module 330 of the image presentation module 115. The image generation module 330 is connected to the image storage module 110A and the presentation and detection module 310. The presentation and detection module 310 includes the presentation module 315 and the eyeball detection module 320, and is connected to the image generation module 330.

Based on image data acquired from the image storage module 110A, the image generation module 330 generates image signals to be output to the left and right presentation modules 315 (the presentation modules 315a and 315b). Next, the presentation module 315 emits image light corresponding to the image signals to respective display surfaces, so that the image is presented to the eyes 390 of the user 290.

The eyeball detection module 320 detects the gaze of the eyes 390 of the user 290. The eyeball detection module 320 performs a part of the process by the movement detection module 105.

Figure 4:
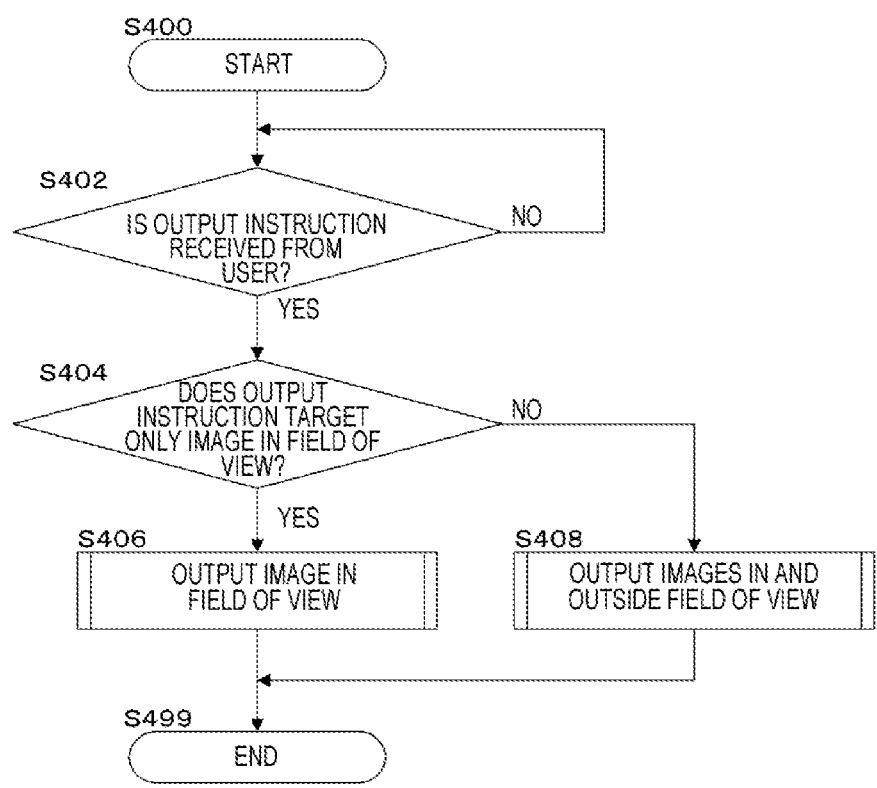
FIG. 4 is a flowchart illustrating an example of a process according to the exemplary embodiment.

FIG. 4 is a flowchart illustrating an example of a process according to the present exemplary embodiment.

In step S402, the output instruction reception module 120 determines whether the output instruction is received from the user 290. When it is determined that the output instruction is received, the process proceeds to step S404. Otherwise, the process stands by until the output instruction is received.

In step S404, it is determined whether the output instruction targets only the image in the field of view. When it is determined that the output instruction targets only the image in the field of view, the process proceeds to step S406. Otherwise, the process proceeds to step S408. For example, the determination may be made according to the instruction from the user 290 (an instruction to output only the image in the field of view or an instruction to output the image outside the field of view as well). In addition, the target may be determined by default.

In step S406, the image in the field of view is output. The detailed process of step S406 will be described later using flowcharts illustrated in examples of FIGS. 8 to 10B.

In step S408, the images in and outside the field of view are output. The detailed process of step S408 will be described later using the flowcharts illustrated in the examples of FIGS. 8 to 10B.

Figure 5:
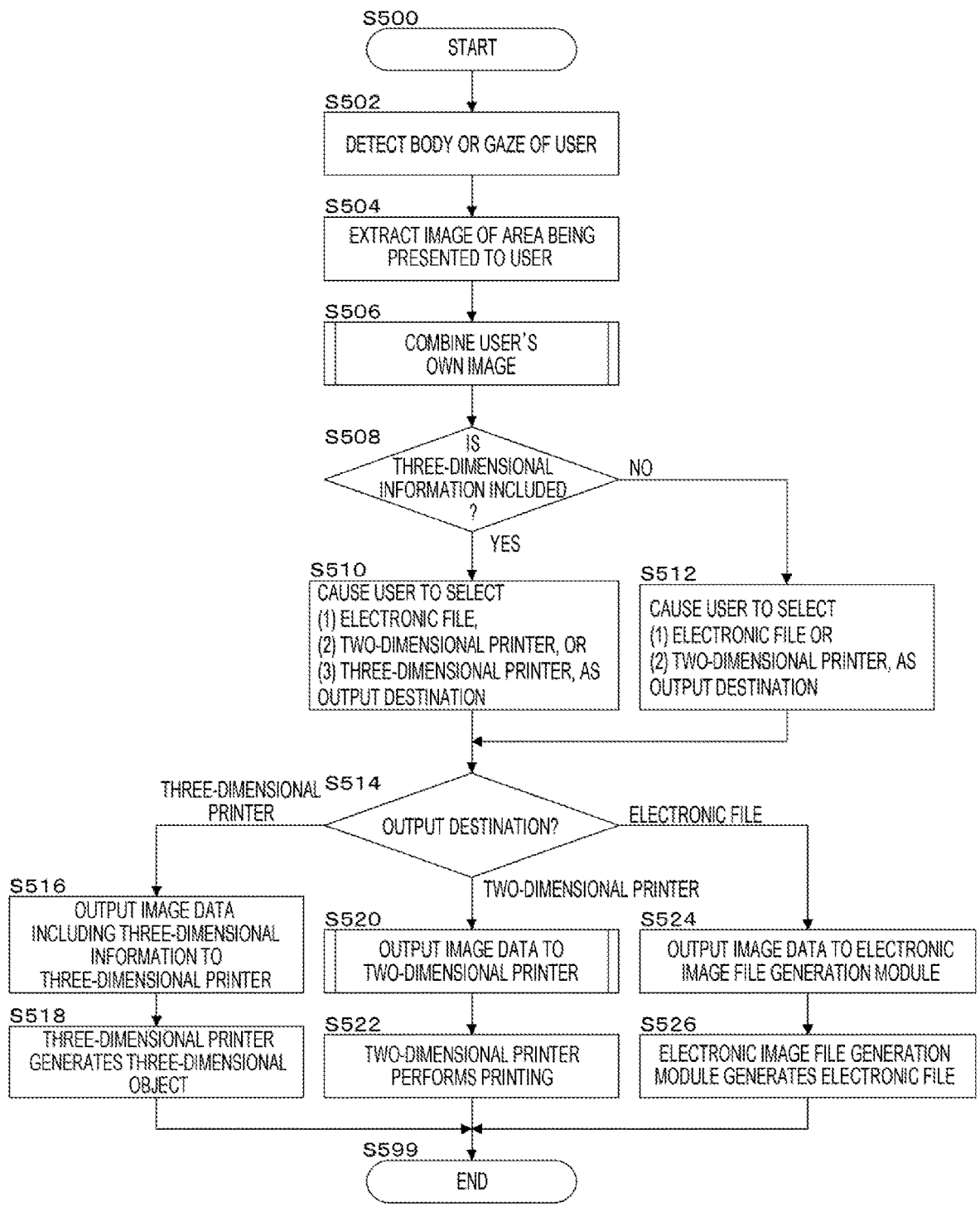
FIG. 5 is a flowchart illustrating an example of a process according to the exemplary embodiment.

FIG. 5 is a flowchart illustrating an example of a process according to the present exemplary embodiment. This process example changes a user interface, depending on whether the image data to be output includes three-dimensional information.

In step S502, the body or gaze of the user 290 is detected.

In step S504, an image of an area being presented to the user 290 is extracted. Specifically, an image being presented by the image presentation module 115 at a time point when the output instruction is received in step S502 may be extracted. The extracted image is the image to be output. The image being presented includes an image for the right eye and an image for the left eye, and any one of the images for the right and left eyes may be extracted. In addition, an image viewed by both eyes (the image to be output) may be generated from the images for the right and left eyes.

In step S506, the use's own image is combined with the output image. The detailed process of step S506 will be described later using the flowcharts illustrated in the examples of FIGS. 12, 19, and 21. Any one or more of processes in the flowcharts illustrated in the examples of FIGS. 12, 19, and 21 may be performed.

In step S508, it is determined whether the image includes the three-dimensional information. When it is determined that the image includes the three-dimensional information, the process proceeds to step S510. Otherwise, the process proceeds to step S512. The three-dimensional information is, for example, the FAV which is a data format for three-dimensional printing.

In addition, the three-dimensional information may be embedded in the image. In this case, the image presented to the user 290 is a combination of a two-dimensional image and a three-dimensional image.

In addition, for example, a link to predetermined three-dimensional information to be output to the three-dimensional printer 140 may be embedded in the image. In this case, the image presented to the user 290 is a two-dimensional image similar to other images. However, when the output instruction is made, a link associated with an object in the image may be traced, so that the three-dimensional information to be shaped by the three-dimensional printer 140 is extracted. For example, the three-dimensional information may be extracted using the three-dimensional object data file 2700 to be described later using the example of FIG. 27.

Figure 11C:
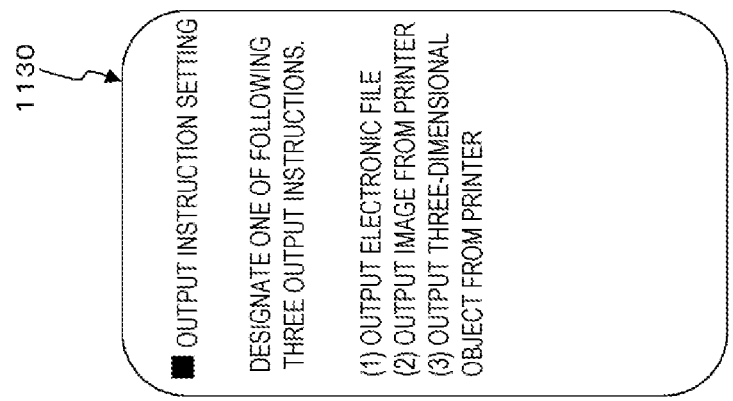
FIGS. 11A to 11C are explanatory views illustrating examples of presentation of a screen according to the exemplary embodiment.

In step S510, the user 290 is caused to select (1) the electronic file, (2) the two-dimensional printer 135, or (3) the three-dimensional printer 140, as the output destination. For example, the screen 1130 illustrated in FIG. 11C is presented.

Figure 11B:
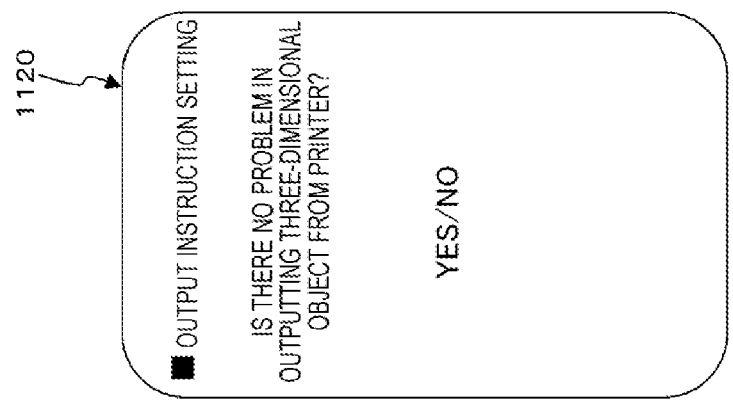
Figure 11A:
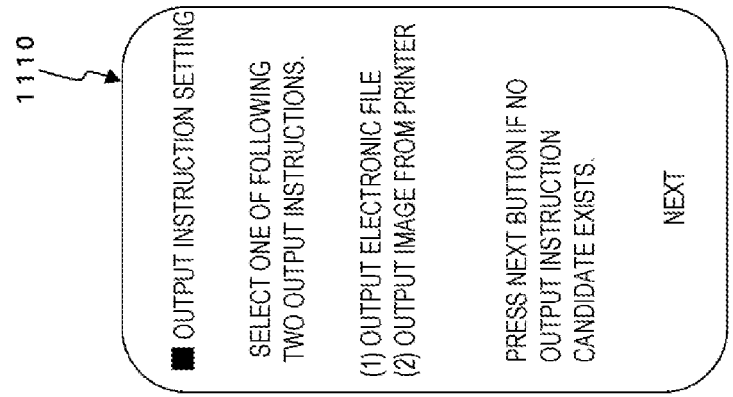

In step S512, the user 290 is caused to select (1) the electronic file or (2) the two-dimensional printer 135, as an output destination. For example, the screen 1110 illustrated in FIG. 11A is presented.

In step S514, the output destination is determined. When the three-dimensional printer 140 is selected, the process proceeds to step S516. When the two-dimensional printer 135 is selected, the process proceeds to step S520. When the electronic file is selected, the process proceeds to step S524.

In step S516, the image data including the three-dimensional information is output to the three-dimensional printer 140.

In step S518, the three-dimensional printer 140 generates a three-dimensional object.

In step S520, the image data is output to the two-dimensional printer 135. The detailed process of step S520 will be described later using the flowchart illustrated in the example of FIG. 24 or 25.

In step S522, the two-dimensional printer 135 performs printing.

In step S524, the image data is output to the electronic image file generation module 145.

In step S526, the electronic image file generation module 145 generates an electronic file.

Figure 6:
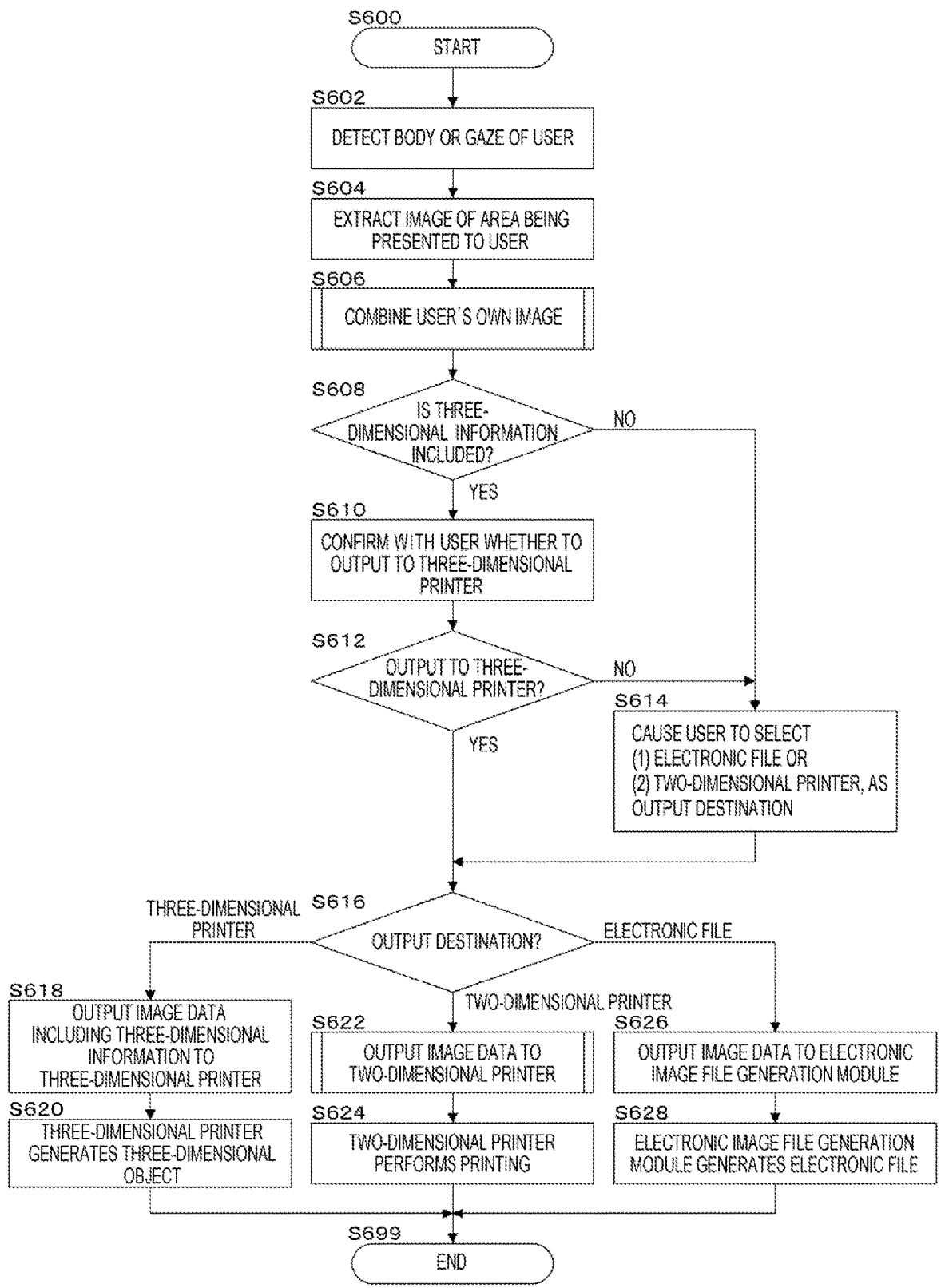
FIG. 6 is a flowchart illustrating an example of a process according to the exemplary embodiment.

FIG. 6 is a flowchart illustrating an example of a process according to the present exemplary embodiment. This process example relates to a user interface that preferentially selects the three-dimensional printer 140 when the image data to be output includes the three-dimensional information. The processes of steps S602 to S608 are the same as the processes of steps S502 to S508 of the flowcharts illustrated in the example of FIG. 5, and the processes of steps S616 to S628 are the same as the processes of steps S514 to S526 of the flowchart illustrated in the example of FIG. 5.

In step S602, the body or gaze of the user 290 is detected.

In step S604, an image of an area being presented to the user 290 is extracted.

In step S606, the user's own image (the image of the user 290 herself) is combined with the output image. The detailed process of step S606 will be described later using flowcharts illustrated in the examples of FIGS. 12, 19 and 21. Any one or more of processes in the flowcharts illustrated in the examples of FIGS. 12, 19, and 21 may be performed.

In step S608, it is determined whether the image includes the three-dimensional information. When it is determined that the image includes the three-dimensional information, the process proceeds to step S610. Otherwise, the process proceeds to step S614.

In step S610, it is confirmed with the user 290 whether to output to the three-dimensional printer 140. For example, the screen 1120 illustrated in FIG. 11B is presented.

In step S612, it is determined whether to output to the three-dimensional printer 140. When it is determined to output, the process proceeds to step S616. Otherwise, the process proceeds to step S614.

In step S614, the user 290 is caused to select (1) the electronic file or (2) the two-dimensional printer 135, as an output destination. For example, the screen 1110 illustrated in FIG. 11A is presented.

In step S616, the output destination is determined. When the three-dimensional printer 140 is selected, the process proceeds to step S618. When the two-dimensional printer 135 is selected, the process proceeds to step S622. When the electronic file is selected, the process proceeds to step S626.

In step S618, the image data including the three-dimensional information is output to the three-dimensional printer 140.

In step S620, the three-dimensional printer 140 generates a three-dimensional object.

In step S622, the image data is output to the two-dimensional printer 135. The detailed process of step S622 will be described later using the flowchart illustrated in the example of FIG. 24 or 25.

In step S624, the two-dimensional printer 135 performs printing.

In step S626, the image data is output to the electronic image file generation module 145.

In step S628, the electronic image file generation module 145 generates an electronic file.

Figure 7:
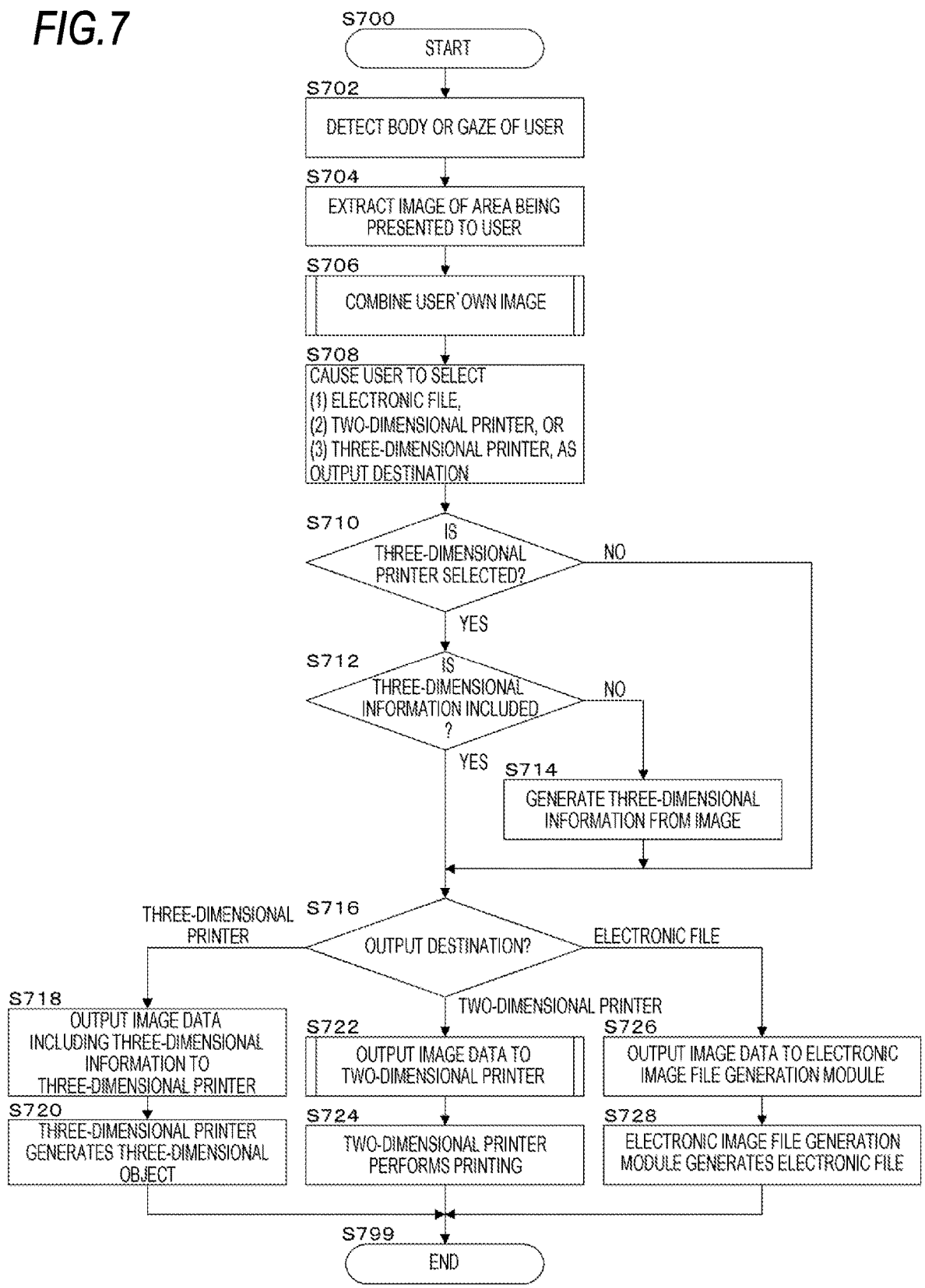
FIG. 7 is a flowchart illustrating an example of a process according to the exemplary embodiment.

FIG. 7 is a flowchart illustrating an example of a process according to the present exemplary embodiment. In this process example, for example, a process deals with a case where the three-dimensional printer 140 is selected as the output destination regardless of whether the image data to be output includes the three-dimensional information. The processes of steps S702 to S706 and S712 are the same as the processes of steps S502 to S508 of the flowcharts illustrated in the example of FIG. 5, and the processes of steps S716 to S728 are the same as the processes of steps S514 to S526 of the flowchart illustrated in the example of FIG. 5.

In step S702, the body or gaze of the user 290 is detected.

In step S704, an image of an area being presented to the user 290 is extracted.

In step S706, the user's own image (the image of the user 290 herself) is combined with the output image. The detailed process of step S706 will be described later using flowcharts illustrated in the examples of FIGS. 12, 19 and 21. Any one or more of processes in the flowcharts illustrated in the examples of FIGS. 12, 19, and 21 may be performed.

In step S708, the user 290 is caused to select (1) the electronic file, (2) the two-dimensional printer 135, or (3) the three-dimensional printer 140, as the output destination. For example, the screen 1130 illustrated in FIG. 11C is presented.

In step S710, it is determined whether the three-dimensional printer 140 is selected. When it is determined that the three-dimensional printer 140 is selected, the process proceeds to step S712. Otherwise, the process proceeds to step S716.

In step S712, it is determined whether the image to be output includes the three-dimensional information. When it is determined that the image includes the three-dimensional information, the process proceeds to step S716. Otherwise, the process proceeds to step S714.

In step S714, the three-dimensional information is generated from the image. The three-dimensional information may be generated from the two-dimensional image by using an existing technology. For example, the three-dimensional information may be generated by using an artificial intelligence model which completes learning with pairs of two-dimensional images and three-dimensional images. Alternatively, the three-dimensional information may be generated from the images for the left and right eyes.

In step S716, the output destination is determined. When the three-dimensional printer 140 is selected, the process proceeds to step S718. When the two-dimensional printer 135 is selected, the process proceeds to step S722. When the electronic file is selected, the process proceeds to step S726.

In step S718, the image data including the three-dimensional information is output to the three-dimensional printer 140.

In step S720, the three-dimensional printer 140 generates a three-dimensional object.

In step S722, the image data is output to the two-dimensional printer 135. The detailed process of step S722 will be described later using the flowchart illustrated in the example of FIG. 24 or 25.

In step S724, the two-dimensional printer 135 performs printing.

In step S726, the image data is output to the electronic image file generation module 145.

In step S728, the electronic image file generation module 145 generates an electronic file.

Figure 8:
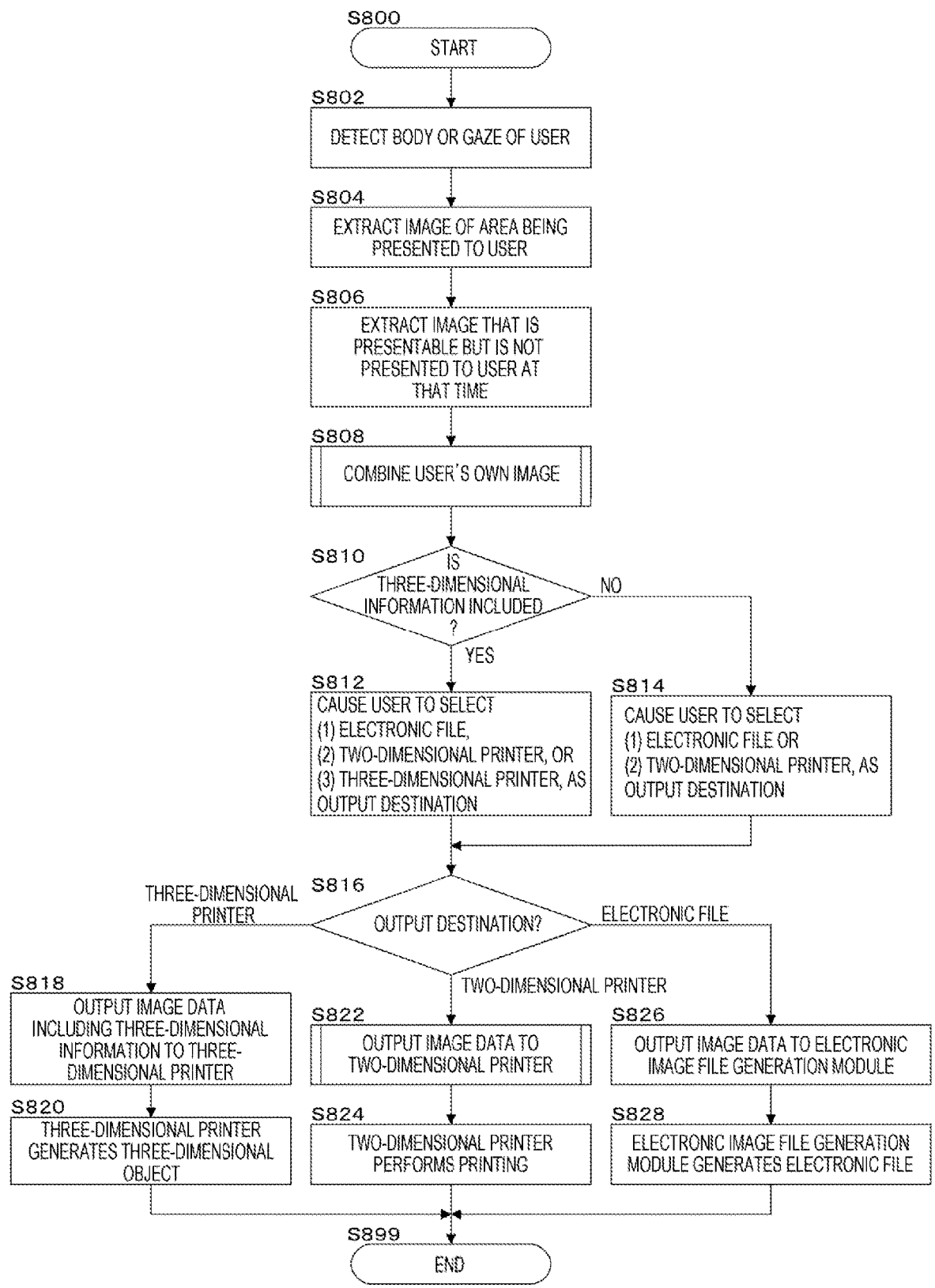
FIG. 8 is a flowchart illustrating an example of a process according to the exemplary embodiment.

FIG. 8 is a flowchart illustrating an example of a process according to the present exemplary embodiment. FIG. 8 corresponds to the flowchart illustrated in the example of FIG. 5 and illustrates the process applied to a case where the first image and the second image are output.

In step S802, the body or gaze of the user 290 is detected.

In step S804, an image of an area being presented to the user 290 is extracted.

In step S806, the image that is presentable to the user 290 but is not presented at that time is extracted.

In step S808, the user's own image (the image of the user 290 herself) is combined with the output image. The detailed process of step S808 will be described later using flowcharts illustrated in the examples of FIGS. 12, 19 and 21. Any one or more of processes in the flowcharts illustrated in the examples of FIGS. 12, 19, and 21 may be performed.

In step S810, it is determined whether three-dimensional information is included in the image (any of (i) only the image extracted in step S804 (corresponding to the first image), (ii) only the image extracted in step S806 (corresponding to the second image), (iii) the image extracted in step S804 or S806, and (iv) the images extracted in steps S804 and S806). When the three-dimensional information is included in the image, the process proceeds to step S812. Otherwise, the process proceeds to step S814. The three-dimensional information is, for example, the FAV which is a data format for three-dimensional printing.

In addition, the three-dimensional information may be embedded in the image. In this case, the image presented to the user 290 is a combination of a two-dimensional image and a three-dimensional image.

In addition, for example, a link to predetermined three-dimensional information to be output to the three-dimensional printer 140 may be embedded in the image. In this case, the image presented to the user 290 is a two-dimensional image similar to other images. However, when the output instruction is made, a link associated with an object in the image may be traced, so that the three-dimensional information to be shaped by the three-dimensional printer 140 is extracted. For example, the three-dimensional information may be extracted using the three-dimensional object data file 2700 to be described later using the example of FIG. 27.

In step S812, the user 290 is caused to select (1) the electronic file, (2) the two-dimensional printer 135, or (3) the three-dimensional printer 140, as the output destination. For example, the screen 1130 illustrated in FIG. 11C is presented.

In step S814, the user is caused to select (1) the electronic file or (2) the two-dimensional printer 135, as an output destination. For example, the screen 1110 illustrated in FIG. 11A is presented.

In step S816, the output destination is determined. When the three-dimensional printer 140 is selected, the process proceeds to step S818. When the two-dimensional printer 135 is selected, the process proceeds to step S822. When the electronic file is selected, the process proceeds to step S826.

In step S818, the image data including the three-dimensional information is output to the three-dimensional printer 140.

In step S820, the three-dimensional printer 140 generates a three-dimensional object.

In step S822, the image data is output to the two-dimensional printer 135. The detailed process of step S822 will be described later using the flowchart illustrated in the example of FIG. 24 or 25.

In step S824, the two-dimensional printer 135 performs printing.

In step S826, the image data is output to the electronic image file generation module 145.

In step S828, the electronic image file generation module 145 generates an electronic file.

Figure 9A:
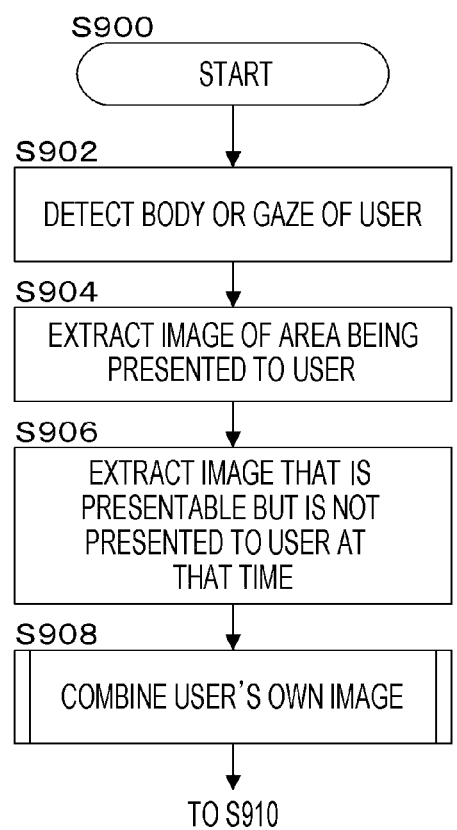
FIGS. 9A and 9B are flowcharts illustrating an example of a process according to the exemplary embodiment.
Figure 9B:
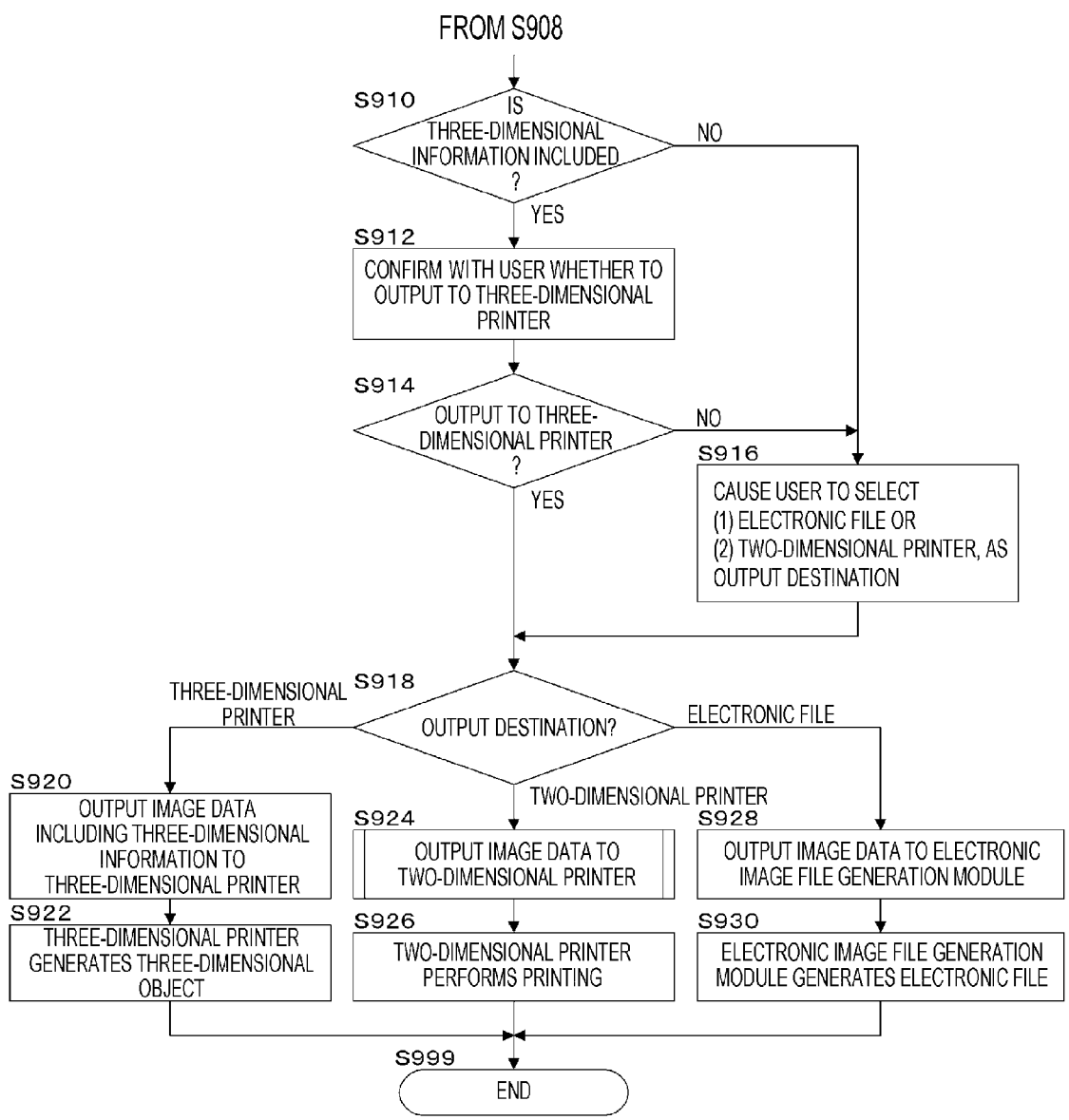

FIGS. 9A and 9B are flowcharts illustrating an example of a process according to the present exemplary embodiment. FIGS. 9A and 9B corresponds to the flowchart illustrated in the example of FIG. 6 and illustrates the process applied to a case where the first image and the second image are output. The processes of steps S902 to S910 are the same as the processes of steps S802 to S810 of the flowcharts illustrated in the example of FIG. 8, and the processes of steps S918 to S930 are the same as the processes of steps S816 to S828 of the flowchart illustrated in the example of FIG. 8.

In step S902, the body or gaze of the user 290 is detected.

In step S904, an image of an area being presented to the user 290 is extracted.

In step S906, the image that is presentable to the user 290 but is not presented at that time is extracted.

In step S908, the user's own image (the image of the user 290 herself) is combined with the output image. The detailed process of step S908 will be described later using flowcharts illustrated in the examples of FIGS. 12, 19 and 21. Any one or more of processes in the flowcharts illustrated in the examples of FIGS. 12, 19, and 21 may be performed.

In step S910, it is determined whether the image includes the three-dimensional information. When it is determined that the image includes the three-dimensional information, the process proceeds to step S912. Otherwise, the process proceeds to step S916.

In step S912, it is confirmed with the user 290 whether to output to the three-dimensional printer 140. For example, the screen 1120 illustrated in FIG. 11B is presented.

In step S914, it is determined whether to output to the three-dimensional printer 140. When it is determined to output, the process proceeds to step S918. Otherwise, the process proceeds to step S916.

In step S916, the user 290 is caused to select (1) the electronic file or (2) the two-dimensional printer 135, as an output destination. For example, the screen 1110 illustrated in FIG. 11A is presented.

In step S918, the output destination is determined. When the three-dimensional printer 140 is selected, the process proceeds to step S920. When the two-dimensional printer 135 is selected, the process proceeds to step S924. When the electronic file is selected, the process proceeds to step S928.

In step S920, the image data including the three-dimensional information is output to the three-dimensional printer 140.

In step S922, the three-dimensional printer 140 generates a three-dimensional object.

In step S924, the image data is output to the two-dimensional printer 135. The detailed process of step S924 will be described later using the flowchart illustrated in the example of FIG. 24 or 25.

In step S926, the two-dimensional printer 135 performs printing.

In step S928, the image data is output to the electronic image file generation module 145.

In step S930, the electronic image file generation module 145 generates an electronic file.

Figure 10A:
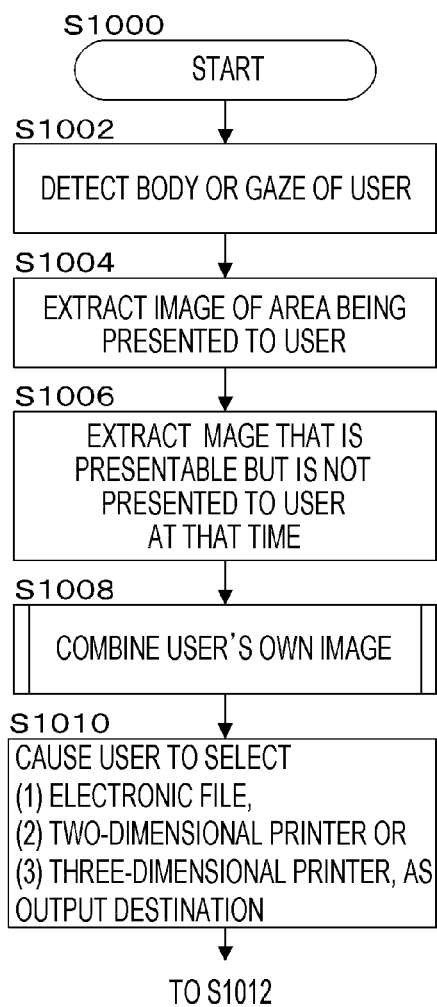
FIGS. 10A and 10B are flowcharts illustrating an example of a process according to the exemplary embodiment.
Figure 10B:
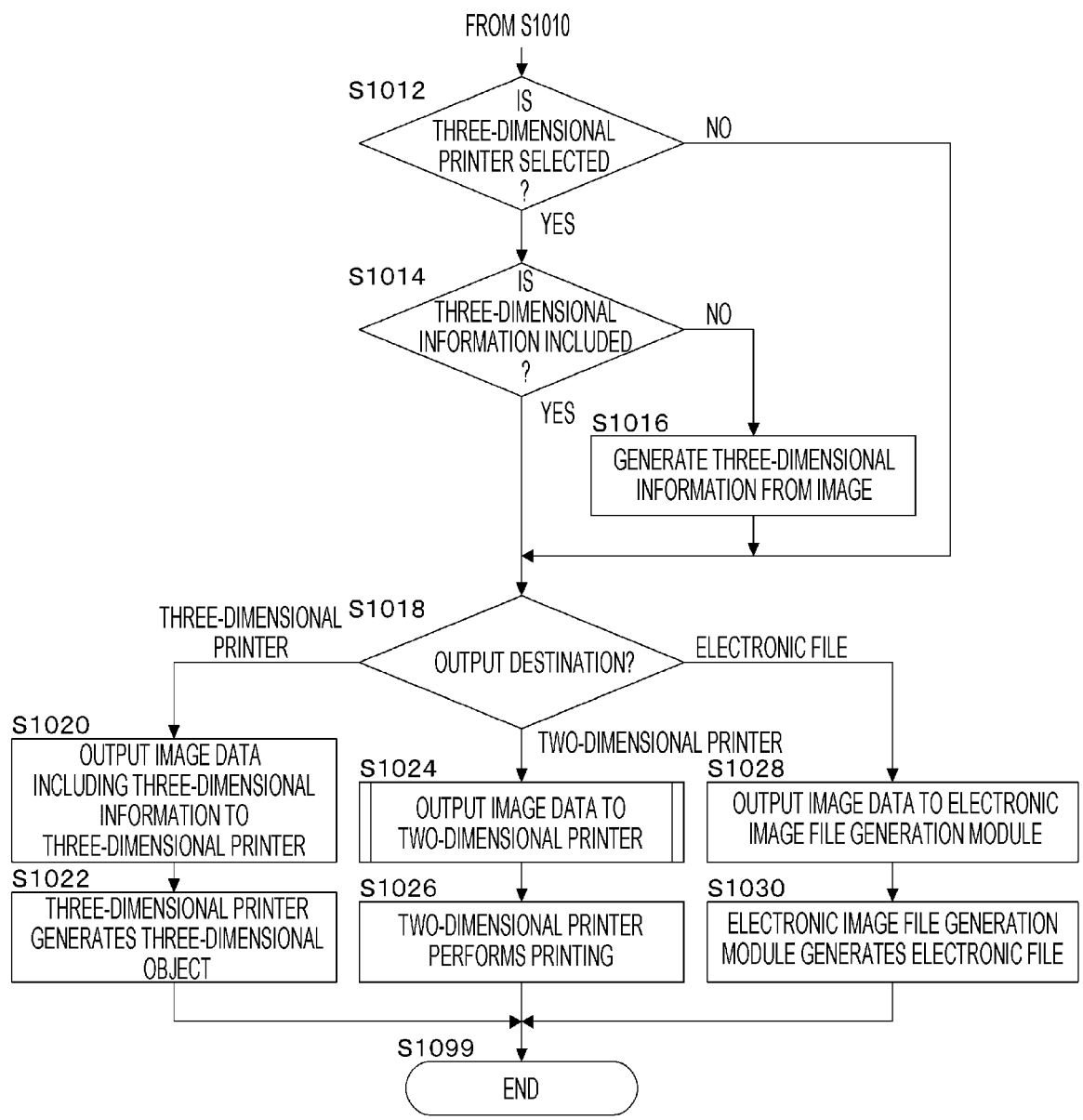

FIGS. 10A and 10B are flowcharts illustrating an example of a process according to the present exemplary embodiment. FIGS. 10A and 10B corresponds to the flowchart illustrated in the example of FIG. 7 and illustrates the process applied to a case where the first image and the second image are output. The processes of steps S1002 to S1008 and S1014 are the same as the processes of steps S802 to S810 of the flowcharts illustrated in the example of FIG. 8, and the processes of steps S1018 to S1030 are the same as the processes of steps S816 to S828 of the flowchart illustrated in the example of FIG. 8.

In step S1002, the body or gaze of the user 290 is detected.

In step S1004, an image of an area being presented to the user 290 is extracted.

In step S1006, the image that is presentable to the user 290 but is not presented at that time is extracted.

In step S1008, the user's own image (the image of the user 290 herself) is combined with the output image. The detailed process of step S1008 will be described later using flowcharts illustrated in the examples of FIGS. 12, 19 and 21. Any one or more of processes in the flowcharts illustrated in the examples of FIGS. 12, 19, and 21 may be performed.

In step S1010, the user 290 is caused to select (1) the electronic file, (2) the two-dimensional printer 135, or (3) the three-dimensional printer 140, as the output destination. For example, the screen 1130 illustrated in FIG. 11C is presented.

In step S1012, it is determined whether the three-dimensional printer 140 is selected. When it is determined that the three-dimensional printer 140 is selected, the process proceeds to step S1014. Otherwise, the process proceeds to step S1018.

In step S1014, it is determined whether the image to be output includes the three-dimensional information. When it is determined that the image includes the three-dimensional information, the process proceeds to step S1018. Otherwise, the process proceeds to step S1016.

In step S1016, the three-dimensional information is generated from the image. The three-dimensional information may be generated from the two-dimensional image by using an existing technology. For example, the three-dimensional information may be generated by using an artificial intelligence model which completes learning with pairs of two-dimensional images and three-dimensional images. Alternatively, the three-dimensional information may be generated from the images for the left and right eyes.

In step S1018, the output destination is determined. When the three-dimensional printer 140 is selected, the process proceeds to step S1020. When the two-dimensional printer 135 is selected, the process proceeds to step S1024. When the electronic file is selected, the process proceeds to step S1028.

In step S1020, the image data including the three-dimensional information is output to the three-dimensional printer 140.

In step S1022, the three-dimensional printer 140 generates a three-dimensional object.

In step S1024, the image data is output to the two-dimensional printer 135. The detailed process of step S1024 will be described later using the flowchart illustrated in the example of FIG. 24 or 25.

In step S1026, the two-dimensional printer 135 performs printing.

In step S1028, the image data is output to the electronic image file generation module 145.

In step S1030, the electronic image file generation module 145 generates an electronic file.

FIGS. 11A to 11C are the explanatory views illustrating the examples of the presentation of the screen according to the exemplary embodiment.

The example in FIG. 11A illustrates the example of the presentation in steps S512, S614, S814, and S916.

The screen 1110 in FIG. 11A illustrates the example of the presentation in steps S512, S614, S814, and S916.

When the "Next" button on the screen 1110 is selected, the output to the three-dimensional printer 140 is presented.

The screen 1120 in FIG. 11B illustrates the example of the presentation in steps S610 and S912.

When "NO" on the screen 1120 is selected, an output to another candidate (the two-dimensional printer 135 or the electronic image file generation module 145) is presented.

The screen 1130 in FIG. 11C illustrates an example of the presentation in steps S510, S708, S812, and S1010.

The screen 1130 may allow the user to designate plural output destinations. That is, products (two or more of a printed matter, a three-dimensional object, and an electronic file) may be obtained from two or more output destinations.

Figure 12:
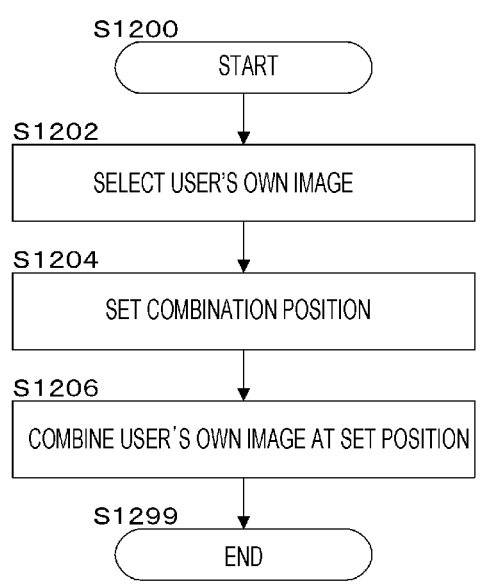
FIG. 12 is a flowchart illustrating an example of a process according to the exemplary embodiment.

FIG. 12 is a flowchart illustrating an example of a process according to the present exemplary embodiment.

In step S1202, the user's won image (the image of the user 290 herself) is selected according to an operation of the user 290. Specifically, the user image stored in the user image storage module 110B is selected.

In step S1204, a combination position of the user image is set. In the case of FIG. 5, a position is set for the image extracted in step S504. In the case of FIG. 6, a position is set for the image extracted in step S604. In the case of FIG. 8, a position is set for the image extracted in step S804 or S806. In the case of FIGS. 9A and 9B, a position is set for the image extracted in step S904 or S906. In the case of FIGS. 10A and 10B, a position is set for the image extracted in step S1004 or S1006.

In addition, the combination position may be set by a designation operation by the user 290 or may be set to a predetermined position.

In step S1206, the user's own image (the image of the user 290 herself) is combined at the set position. In addition, at the time of the combination, an adjustment with respect to the surroundings may be performed using a related-art technique. For example, an adjustment of color tone, an addition of, for example, shadow, and an adjustment of an illumination state of light may be performed.

Figure 13:
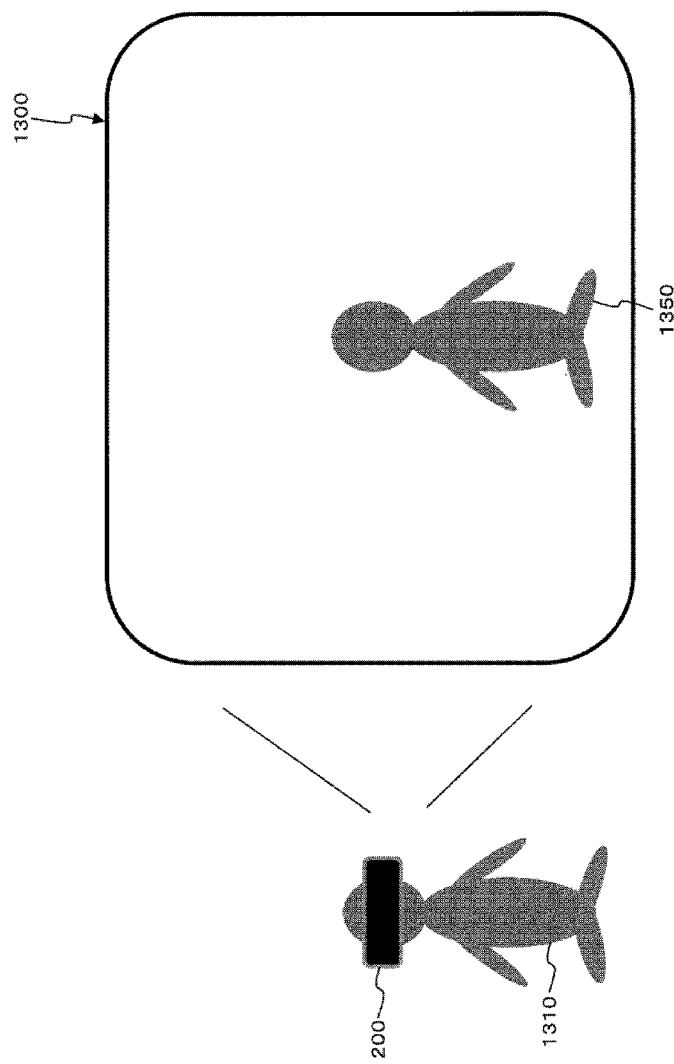
FIG. 13 is an explanatory view illustrating an example of a process according to the exemplary embodiment.

FIG. 13 is an explanatory view illustrating an example of a process according to the present exemplary embodiment.

The left portion of FIG. 13 illustrates that a user 1310 is seeing a VR image with the virtual reality display apparatus 200. The right portion of FIG. 13 illustrates an image 1300 which is an image that the user 1310 is seeing or an image that the user 1310 can see with the virtual reality display apparatus 200. For example, in the VR image, an image space with 360-degree images (which is not limited to 360 degree, as described above) is developed at a specific time t. Thus, the "image that the user 1310 can see" may refer to an image that the user 1310 is not seeing but can see by taking a motion of, for example, looking back, at the time t. For example, the "image that the user 1310 can see" corresponds to a background image at that time.

Taking a photograph of the user by the user herself in the image space of the VR image refers to adding the user's own image to a display position A at the time t at which the output instruction is made, so as to output and save the image. That is, a user image 1350 is added to the user 1310.

FIG. 14 is an explanatory view illustrating an example of the data structure of the user image table 1400. The user image table 1400 is stored in the user image storage module 110B. The user image table 1400 is data for managing the user image. The user image table 1400 includes a user image ID field 1405, a capturing date/time field 1410, a type field 1415, a capturing angle field 1420, a camera-to-user distance field 1425, a two-dimensional image/three-dimensional image field 1430, and a user image field 1435. In the present exemplary embodiment, the user image ID field 1405 stores information for uniquely identifying the user image (user image ID: Identification). The capturing date/time field 1410 stores capturing date and time. The type field 1415 stores a type. The capturing angle field 1420 stores a capturing angle. The camera-to-user distance field 1425 stores a distance between the camera and the user. The two-dimensional image/three-dimensional image field 1430 stores information indicating either a two-dimensional image or a three-dimensional image. The user image field 1435 stores the user image. A two-dimensional image is an image captured by a general digital camera. A three-dimensional image is an image captured using, for example, a camera, an infrared camera, an ambient light sensor, or a dot projector which is used for the face authentication, and is data based on which a three-dimensional object can be generated.

For example, for the user image ID: u0001, the capturing date and time is "2017/12/24/9:00," the type is "smiling face," the capturing angle is "captured from obliquely upper right side," the camera-to-user distance is "1 m," and the image is a two-dimensional image.

In the user image field 1435, images of various faces (e.g., smiling face, crying face, and ordinary facial expressions) and body types and poses (e.g., peace sign and jump) are stocked. The types are represented in the type field 1415.

Instead of stocking the images in advance, a user who has the virtual reality display apparatus 200 (the VR goggles) may be captured from the outside at the capturing time, and only the face part (the part hidden by the VR goggles) may be replaced.

In addition, the depth of field of the user 1310 which is a subject may be made large and reflected on an electronic image in a more realistic manner (conforming to the three-dimensional feature).

In addition, the depth of field may be reflected by a work of imparting textures to a 3D modeling. For example, two-dimensional textures may be combined on a three-dimensional model by UV mapping.

Even though the user image 1350 (a photograph of a character that the character takes of the character itself or a photograph of a user that the user takes of the user herself) is pasted to the same position, the image changes as the capturing angle or the distance from the camera varies. Thus, an appropriate image is selected using the capturing angle field 1420 and the user image field 1435.

For example, after the user image 1350 is put in the image 1300, the user image 1350 are selected and adjusted by moving the virtual reality display apparatus 200 or using, for example, voice, gaze, or a separate controller.

FIG. 15 is an explanatory view illustrating an example of the data structure of a target image table 1500. The target image table 1500 manages an image at the time when the output instruction is made (an image to which the user image is to be pasted; the image 1300 in the example of FIG. 13), among the images stored in the image storage module 110A. The target image table 1500 includes a target image ID field 1505, a time field 1510, a display position field 1515, and a target image field 1520. In the present exemplary embodiment, the target image ID field 1505 stores information (target image ID) for uniquely identifying a target image. The time field 1510 stores time. The display position field 1515 stores a display position. The target image field 1520 stores a target image.

For example, for the target image ID: g0001, the time is "2017/12/25/9:00," and the display position is "10 degrees to 170 degrees."

FIG. 16 is an explanatory view illustrating an example of a data structure of the combination result table 1600. The combination result table 1600 is generated by the process of the flowchart illustrated in the example of FIG. 12. The combination result table 1600 indicates an image obtained by combining the target image and the user image. The combination result table 1600 has a target image ID field 1605, a user image ID field 1610, and a combination position field 1615. The combination position field 1615 has an X field 1620, a Y field 1625, and a Z field 1630. The target image ID field 1605 stores a target image ID. The user image ID field 1610 stores a user image ID. The combination position field 1615 stores a combination position. The X field 1620 stores an X coordinate of the combination position. The Y field 1625 stores a Y coordinate of the combination position. The Z field 1630 stores a Z coordinate of the combination position (which may be treated as being unnecessary when the user image is not a three-dimensional image).

Instead of the user image table 1400, a user image table 1700 may be used. That is, identification information such as an ID may be embedded in an image captured in the virtual space. As described above, for example, the electronic watermarking may be used. In this manner, for example, counterfeiting prevention of the captured electronic file or collation of the captured electronic file may be implemented.

Identification information in an identification information field 1740 may be determined by, for example, a captured user (account information), a capturing place (virtual space or real space), capturing date and time, an application used in the virtual reality display apparatus 200, and a hash value of the user image.

Figure 17:
FIG. 17 is an explanatory view illustrating an example of the data structure of a user image table.

The user image table 1700 is obtained by adding the identification information field 1740 to the user image table 1400. FIG. 17 is an explanatory view illustrating an example of the data structure of a user image table 1700. The user image table 1700 has a user image ID field 1705, a capturing date/time field 1710, a type field 1715, a capturing angle field 1720, a camera-to-user distance field 1725, a two-dimensional image/three-dimensional image field 1730, a user image field 1735, and the identification information field 1740. In the present exemplary embodiment, the user image ID field 1705 stores information for uniquely identifying the user image (user image ID). The capturing date/time field 1710 stores capturing date and time. The type field 1715 stores a type. The capturing angle field 1720 stores a capturing angle. The camera-to-user distance field 1725 stores a distance between the camera and the user. The two-dimensional image/three-dimensional image field 1730 stores information indicating either a two-dimensional image or a three-dimensional image. The user image field 1735 stores the user image. The identification information field 1740 stores identification information.

For example, for the user image ID: u0001, the capturing date and time is "2017/12/24/9:00," the type is "smiling face," the capturing angle is capturing from obliquely upper right side, the camera-to-user distance is "1 m," the image is a two-dimensional image, and the identification information is "a."

When the user image table 1700 is used, a combination result table 1800 may be used in place of the combination result table 1600. The combination result table 1800 is obtained by adding an identification information field 1835 to the combination result table 1600.

Figure 18:
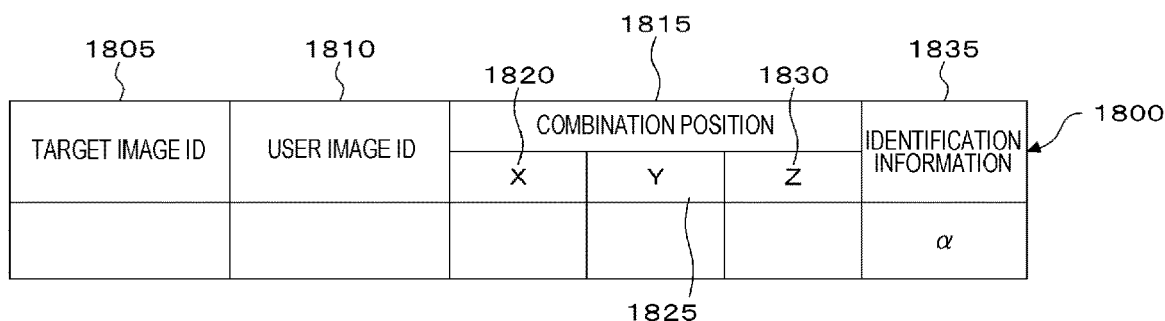
FIG. 18 is an explanatory view illustrating an example of a data structure of a combination result table.

FIG. 18 is an explanatory view illustrating an example of the data structure of the combination result table 1800. The combination result table 1800 has a target image ID field 1805, a user image ID field 1810, a combination position field 1815, and an identification information field 1835. The combination position field 1815 has an X field 1820, a Y field 1825, and a Z field 1830. The target image ID field 1805 stores a target image ID. The user image ID field 1810 stores a user image ID. The combination position field 1815 stores a combination position. The X field 1820 stores an X coordinate of the combination position. The Y field 1825 stores a Y coordinate of the combination position. The Z field 1830 stores a Z coordinate of the combination position (which may be treated as being unnecessary when the user image is not a three-dimensional image). The identification information field 1835 stores identification information.

Figure 19:
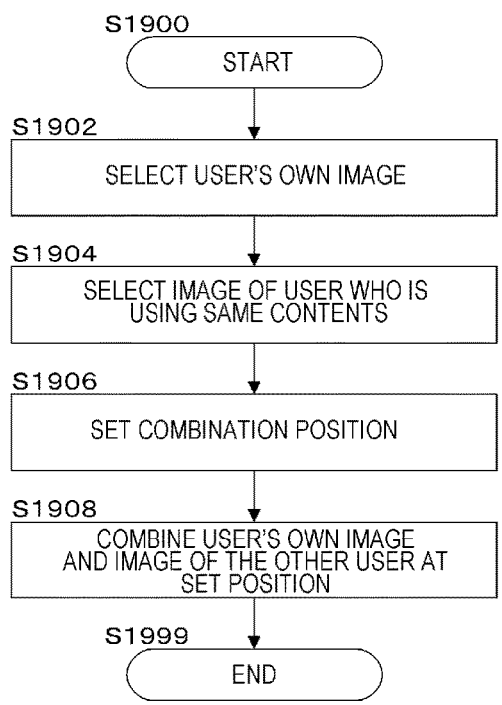
FIG. 19 is a flowchart illustrating an example of a process according to the exemplary embodiment.

FIG. 19 is a flowchart illustrating an example of a process by the present exemplary embodiment.

In step S1902, the user's own image is selected according to an operation of the user.

In step S1904, an image of another user who is using the same contents (application) is selected. As described above, the same contents refer to, for example, a case where two users are competing or cooperating with each other in the same game.

In step S1906, the combination position of the user images selected in steps S1902 and S1904 is set.

In step S1908, the user's own image and the image of the other user are combined with each other at the set position.

Steps S1902, S1906, and S1908 are equivalent to steps S1202, S1204, and S1206 of the flowchart illustrated in the example of FIG. 12, respectively.

It should be noted that in steps S1906 and S1908, the image of the other user is also targeted in addition to the user's own image.

FIG. 20 is an explanatory view illustrating an example of a process according to the present exemplary embodiment.

The left portion of FIG. 20 represents that users 2010A and 2010B are seeing the same VR image with virtual reality display apparatuses 200A and 200B, respectively. In the right portion of FIG. 20, an image 2000 represents an image that the user 2010A is seeing or an image that the user 2010A can see with the virtual reality display apparatus 200A.

When plural persons (the users 2010A and 2010B) are using the same contents and the plural persons are present near each other on the VR contents (at a nearby place in the virtual space) and take a photograph of the plural persons by themselves in that space, user images of the plural persons may be combined and output. That is, user images 2050A and 2050B are pasted to the image 2000. As a result, the plural persons can further enjoy the same VR contents.

Figure 21:
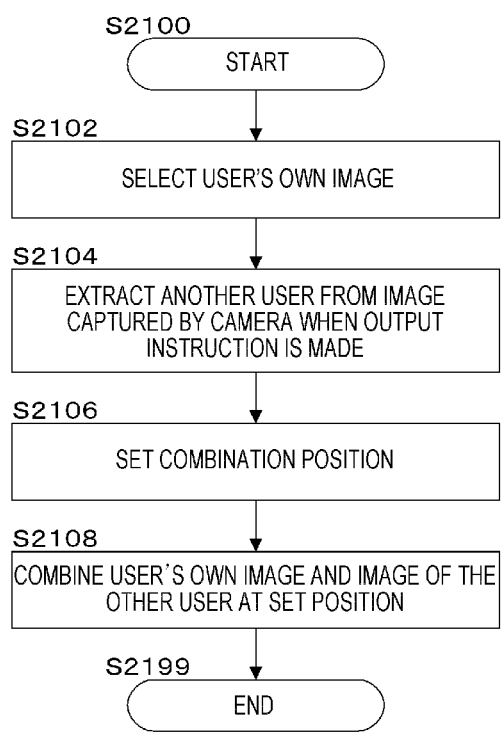
FIG. 21 is a flowchart illustrating an example of a process according to the exemplary embodiment.

FIG. 21 is a flowchart illustrating an example of a process according to the present exemplary embodiment.

In step S2102, the user's own image is selected according to an operation of the user.

In step S2104, when the output instruction is made, another user is extracted from the image captured by the camera 2220 provided in the virtual reality display apparatus 200. Here, the user image of the user who is using the virtual reality display apparatus 200 at the same physical position is extracted, regardless of whether the user is using the same contents. The user image of the user who is using the same contents and is captured by the camera 2220 may be extracted.

In step S2106, a combination position of the user images selected in steps S2102 and S2104 is set.

In step S2108, the user's own image and the image of the other user are combined with each other at the set position.

Steps S2102, S2106, and S2108 are equivalent to steps S1202, S1204, and S1206 of the flowchart illustrated in the example of FIG. 12, respectively.

It should be noted that in steps S2106 and S2108, the image of the other user is also targeted in addition to the user's own image.

Figure 22:
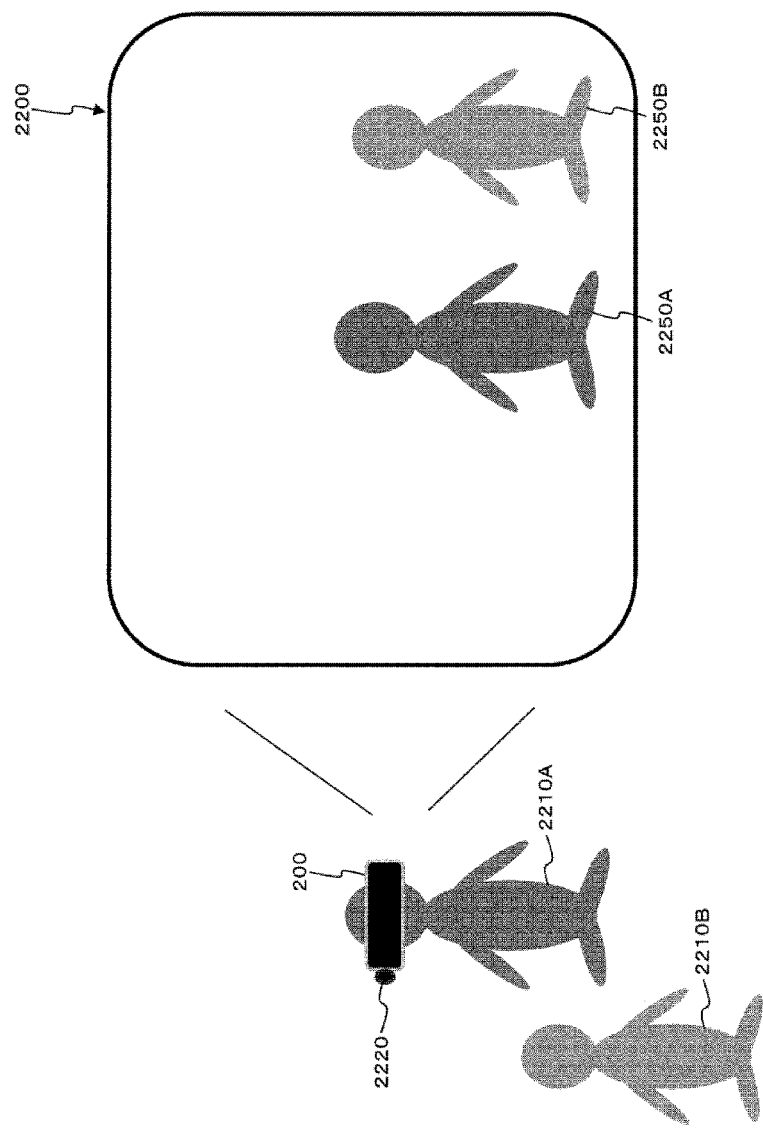
FIG. 22 is an explanatory view illustrating an example of a process according to the exemplary embodiment.

FIG. 22 is an explanatory view illustrating an example of a process according to the present exemplary embodiment.

The left portion of FIG. 22 illustrates that a user 2210A is seeing a VR image with the virtual reality display apparatus 200. On the right portion of FIG. 22, an image 2200 represents an image that the user 2210A is seeing or an image that the user 2210A can see with the virtual reality display apparatus 200.

Even when the user 2210A is using the VR contents alone, the user 2210A may be able to take a photograph of herself and a person (person 2210B) near the user 2210A in the reality space, by herself in the VR. At that time, the person 2210B who does not have the virtual reality display apparatus 200 may be captured by the camera 2220 provided in the virtual reality display apparatus 200 that the user 2210A has, or a previously captured user image may be used. That is, while the user 2210A is enjoying the VR alone, the plural persons (users 2210A and 2210B) are captured at the selfie time. In addition, the camera 2220 may be, for example, a digital camera capable of taking a 360-degree image.

In the example of FIG. 4, the output instruction by the user is received. Alternatively, a guidance may be given to make the output instruction.

Figure 23:
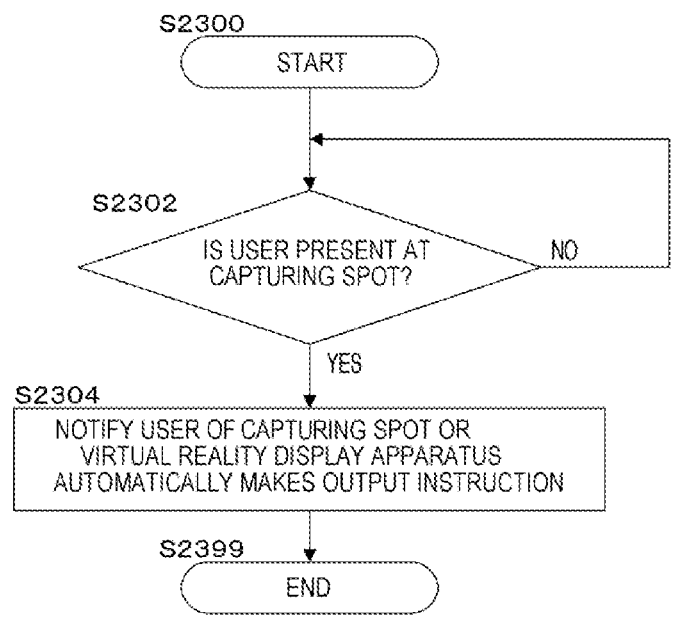
FIG. 23 is a flowchart illustrating an example of a process according to the exemplary embodiment.

FIG. 23 is a flowchart illustrating an example of a process by the present exemplary embodiment.

In step S2302, it is determined whether the user (the user who is using the virtual reality display apparatus 200) is present within a capturing spot. When it is determined that the user is present at the capturing spot, the process proceeds to step S2304. Otherwise, the process stands by until the user appears at the capturing spot. The capturing spot is a predetermined position in the virtual space. For example, the capturing spot is an instagram worthy scene or a scene where a predetermined character appears. In addition, a log of a spot where the output instruction is made may be stored and the spot where a lot of output instructions are made may be recommended as a capturing spot. In addition, the spot where a percentage of women to the captured users is high (a percentage of men is low) may be recommended as a capturing spot.

In step S2304, the user is notified of the capturing spot, or the virtual reality display apparatus 200 automatically makes the output instruction.

When the user moves to a specific position in the VR space, the function of notifying the specific position as a capturing spot or the function of automatically taking an evidence image in response to the user merely moving to the spot is implemented. Furthermore, a function of, for example, storing or notifying the captured image, and causing the captured image to be a part of another document may be added.

There are companies which perform "Instagram document-based interview" in a recruiting process by allowing the posting screen of Instagram as a portfolio. With the present exemplary embodiment, for example, an image captured at a specific capturing place in the VR space may be combined with a document (for interview) or posted on SNS, using identification information corresponding to the capturing place. The image may be evaluated for the recruiting activity or photogenic value.

Figure 24:
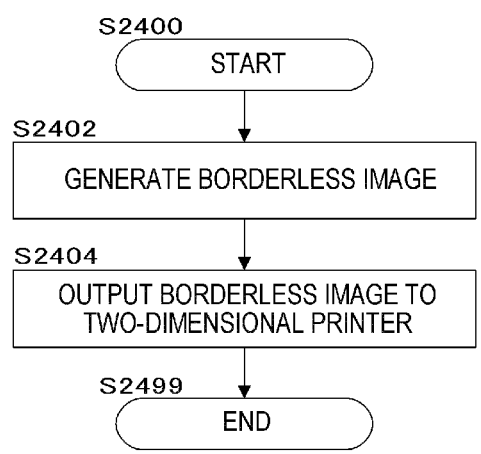
FIG. 24 is a flowchart illustrating an example of a process according to the exemplary embodiment.

FIG. 24 is the flowchart illustrating the example of the process (steps S520, S622, S722, S822, S924, and S1024) according to the present exemplary embodiment. This process example preferentially performs printing a borderless image.

In step S2402, a borderless image is generated.

In step S2404, the borderless image is output to the two-dimensional printer 135.

Figure 25:
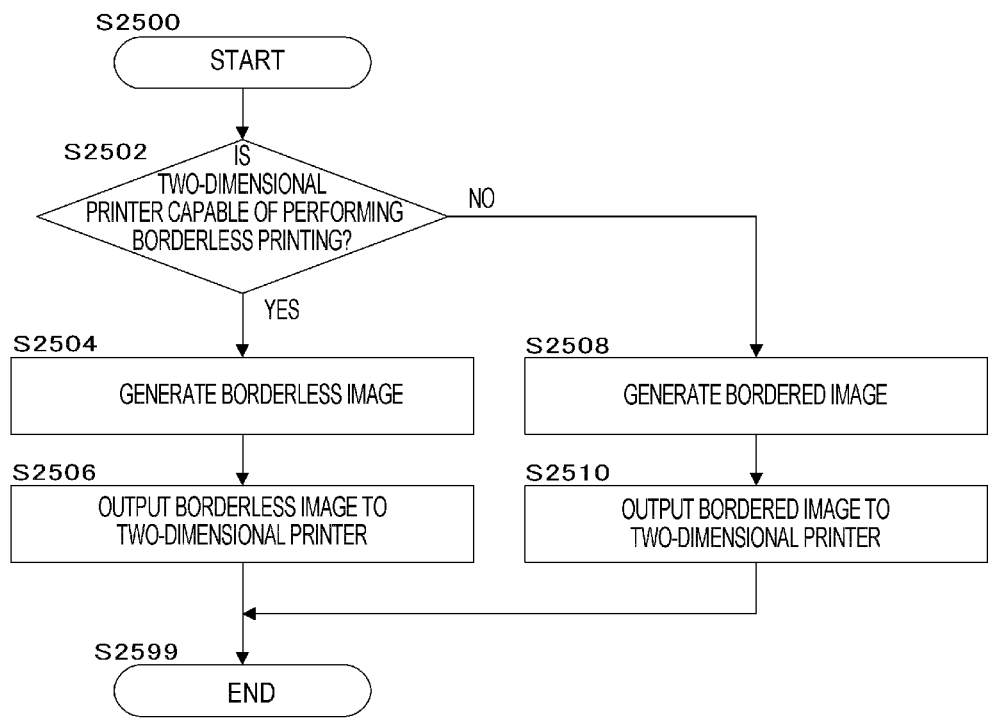
FIG. 25 is a flowchart illustrating an example of a process according to the exemplary embodiment.

FIG. 25 is the flowchart illustrating the example of the process (steps S520, S622, S722, S822, S924, and S1024) according to the present exemplary embodiment. An image to be generated is selected depending on whether the two-dimensional printer 135 is capable of performing the borderless printing.

In step S2502, it is determined whether the two-dimensional printer 135 is capable of performing the borderless printing. When it is determined that the two-dimensional printer 135 is capable of performing the borderless printing, the process proceeds to step S2504. Otherwise, the process proceeds to step S2508. For example, the determination process may be performed by using a printer attribute table 2800 to be described later with reference to FIG. 28.

In step S2504, a borderless image is generated.

In step S2506, the borderless image is output to the two-dimensional printer 135.

In step S2508, a bordered image is generated.

In step S2510, the bordered image is output to the two-dimensional printer 135.

Figure 26:
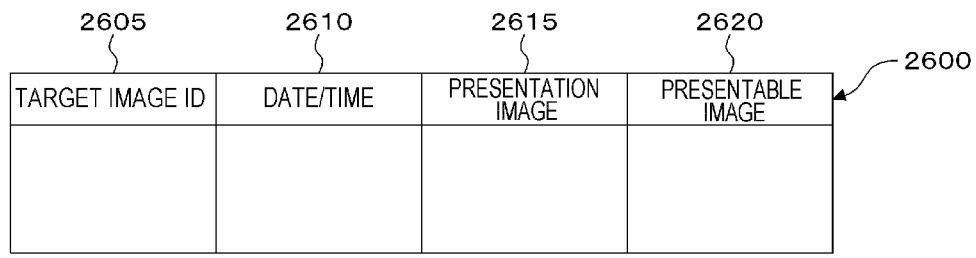
FIG. 26 is an explanatory view illustrating an example of the data structure of a printing target image table.

FIG. 26 is an explanatory view illustrating an example of the data structure of a printing target image table 2600.

The printing target image table 2600 manages images which are output by the output control module 125. The printing target image table 2600 has a target image ID field 2605, a date/time field 2610, a presentation image field 2615, and a presentable image filed 2620. The target image ID field 2605 stores a target image ID. The date/time field 2610 stores date and time (year, month, day, hour, minute, second, second or less, or a combination thereof) when the output instruction is made. The presentation image field 2615 stores the image being presented by the image presentation module 115 to the field of view of the user 290 at the date and time (corresponding to the first image). The presentable image filed 2620 stores an image that is presentable at the date and time (corresponding to the second image). This image is generated by the image presentation module 115 or the output control module 125. In addition, the images in the presentation image field 2615 and the presentable image filed 2620 may be image data itself or may be links into the image storage module 110A.

The output image outputting module 130 outputs the images in the presentation image field 2615 and the presentable image filed 2620.

It should be noted that the target image ID field 2605 of the printing target image table 2600 corresponds to the target image ID field 1605 (the target image ID field 1805) of the combination result table 1600 illustrated in the example of FIG. 16 (the combination result table 1800 illustrated in the example of FIG. 18) and that the image of the user 290 (or an image of another user 290), a presentation image, and a presentable image may be associated with each other.

Figure 27:
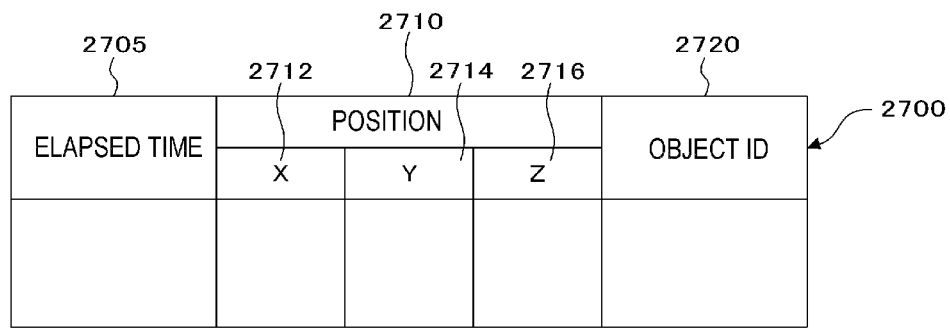
FIG. 27 is an explanatory view illustrating an example of the data structure of a three-dimensional object data file.

FIG. 27 is an explanatory view illustrating an example of the data structure of the three-dimensional object data file 2700.

The three-dimensional object data file 2700 is used in a case where the three-dimensional information is extracted from the image to be output. The three-dimensional object data file 2700 has an elapsed time field 2705, a position field 2710, and an object ID field 2720. The position field 2710 has an X field 2712, a Y field 2714, and a Z field 2716. The elapsed time field 2705 stores elapsed time from the start of the application software in the virtual reality display apparatus 200. The position field 2710 stores a position where an object exists. The X field 2712 stores an X coordinate of the position. The Y field 2714 stores a Y coordinate of the position. The Z field 2716 stores a Z coordinate of the position. That is, the position of the object is indicated by the elapsed time field 2705 and the position field 2710 (a time position and a spatial position). In the present exemplary embodiment, the object ID field 2720 stores information for uniquely identifying the object (object ID). The three-dimensional information may be extracted from the object ID. In addition, the object ID may be a file name of the three-dimensional information.

In the object ID field 2720 of the three-dimensional object data file 2700, the ID of the image of the user 290 (or an image of another user 290) may be stored.

Figure 28:
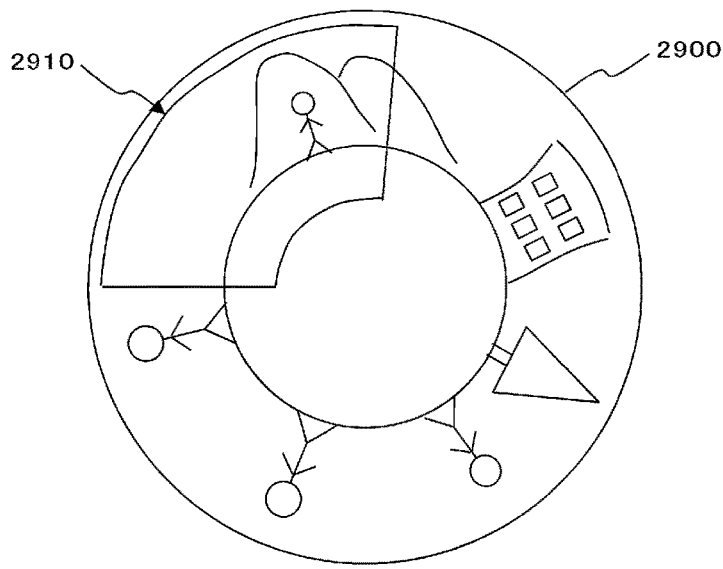
FIG. 28 is an explanatory view illustrating an example of the data structure of a printer attribute table.

FIG. 28 is an explanatory view illustrating an example of the data structure of the printer attribute table 2800. The printer attribute table 2800 is a table for managing the performance of the two-dimensional printer 135 (specifically, whether the two-dimensional printer 135 is capable of performing the borderless printing).

The printer attribute table 2800 has a printer ID field 2805, a borderless printable/unprintable field 2810, a black-and-white/color field 2815, and a paper size field 2820. In the present exemplary embodiment, the printer ID field 2805 stores information for uniquely identifying the printer (printer ID). The borderless printable/unprintable field 2810 stores information as to whether the printer is capable of performing the borderless printing. The black-and-white/color field 2815 stores information as to whether the printer is capable of only the black-and-white printing or both of the black-and-white printing and the color printing. The paper size field 2820 stores a printable paper size.

Figure 29A:
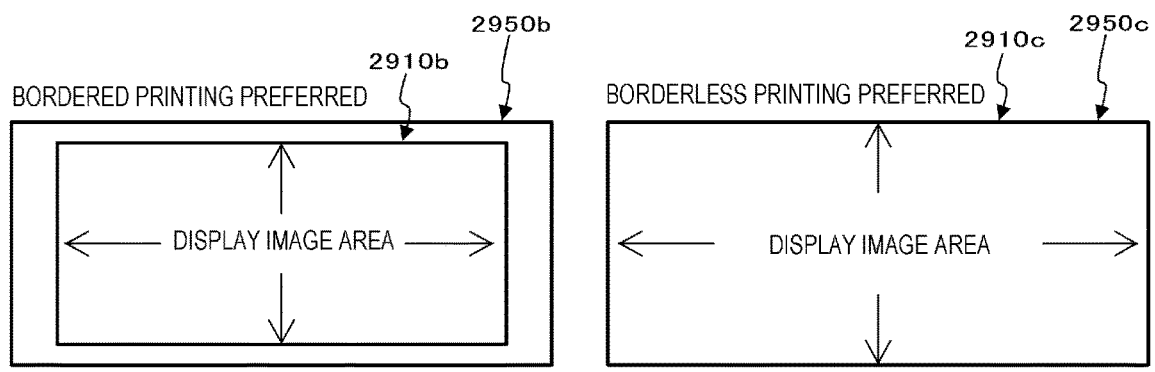

FIGS. 29A to 29C are explanatory views illustrating examples of a process according to the present exemplary embodiment.

The virtual reality display apparatus 200 detects a movement of the body or gaze of the user 290, and presents a presentation image 2910 to the user 290. At this time point, a 360-degree surrounding image 2900 is prepared. That is, if the user 290 conducts a motion, for example, turns to right at this time point, the image of the right side of the presentation image 2910 is presented. Here, when the output instruction is received, the presentation image 2910 is output in accordance with a dimension (two dimensions when a recording medium is a paper) and the size of the recording medium. It should be noted that a user image 2950 is combined with the presentation image 2910.

In addition, since the VR image is the 360-degree surrounding image, it may be preferable to print the 360-degree surrounding image at a time when the entire scene is to be included in the two-dimensional recording medium even though the image being currently viewed by the user 290 is a partial area.

The image 2900 represents an example where the 360-degree surrounding image is printed as a plan view viewed from above, on the entire sheet. The portion of the presentation image 2910 may be surrounded by, for example, a red frame to suggest the area of the place that the user 290 is viewing.

That is, here, when the output instruction is received, both the presentation image 2910 (corresponding to the first image) and the image other than the presentation image 2910 (corresponding to the second image) are output in accordance with the dimension of the recording medium (two dimensions when the recording medium is a paper) and the size of the recording medium. That is, the entire image 2900 is output.

In addition, since the image to be output is basically obtained by cutting off a part of the 360-degree image 2900, the image remains in an edge area. Accordingly, in a case where the printer (printing application) has both of a bordered printing mode and a borderless printing mode, the borderless printing mode is preferentially selected when a VR image is output, so as not to cause an unnatural feeling between the displayed object and the printed matter, to the user 290. Therefore, the borderless printing is preferentially set. It is noted that when a restriction is applied to a display area of the image that the virtual reality display apparatus 200 presents to the user 290 so that an image non-display area exists at an edge (see FIG. 29B) and when the output instruction is received, a process may be performed such that the bordered output is preferentially performed. In addition, in a case where the printer has a function of switching a priority between the borderless output and the bordered output based on such a situation determination, a process may be performed such that the borderless output is preferentially performed as long as the image that the virtual reality display apparatus 200 presents to the user 290 is displayed up to the edge of the display area (see FIG. 29C). In this way, even when an image which continues in the entire 360-degree surroundings is not prepared, an output form may be appropriately set along with a control of a display of the virtual reality display apparatus 200. In addition, FIG. 29B illustrates an example where since a display image area 2910b is smaller than a display area 2950b of the virtual reality display apparatus 200, the image non-display area exists at the edge. In this case, the bordered image is preferentially output. In addition, FIG. 29C illustrates an example where since a display image area 2910c is the same in size as a display area 2950c of the virtual reality display apparatus 200, no image non-display area exists at the edge. In this case, the borderless image is preferentially output.

In addition, for example, when an object which is three-dimensional information (e.g., a person) is included only in the presentation image 2910, when an object which is three-dimensional information is included only in the image other than the presentation image 2910, or when objects which are three-dimensional information are included in both of the presentation image 2910 and the image other than the presentation image 2910 in the image 2900, the screen 1130 is presented in the flowcharts illustrated in the examples of FIGS. 5 and 8, and the screen 1120 is presented in the flowcharts illustrated in the examples of FIGS. 6, 9A, and 9B. Meanwhile, when no three-dimensional information is included in the images, the screen 1110 is presented in the flowcharts illustrated in the examples of FIGS. 5, 6, 8, and 9.

Figure 30A:
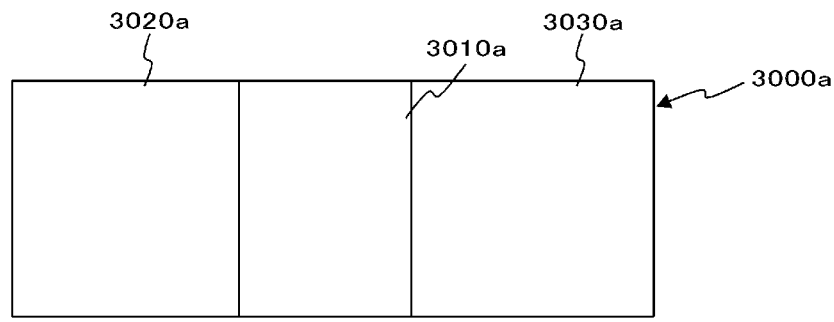
FIGS. 30A to 30C are explanatory views illustrating examples of a process according to the exemplary embodiment.
Figure 30B:
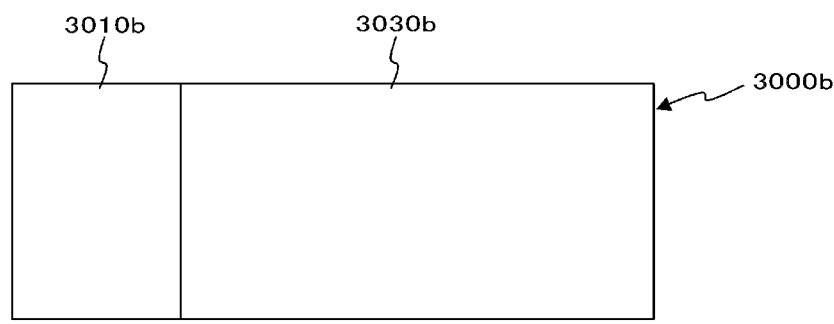
Figure 30C:
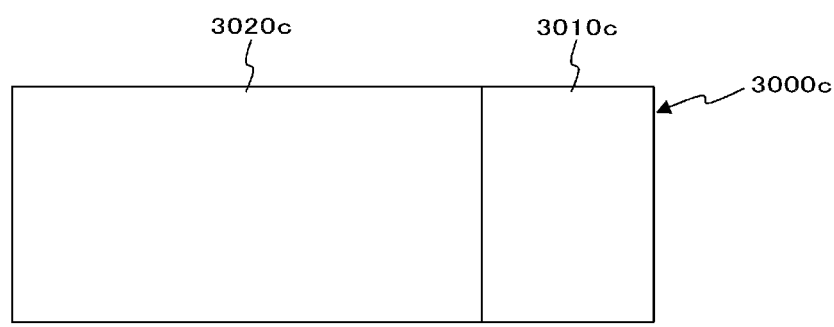

FIGS. 30A to 30C are explanatory views illustrating examples of a process according to the present exemplary embodiment. In the examples of FIGS. 29A to 29C, the circular image 2900 is illustrated as the 360-degree surrounding image. Alternatively, for example, the 360-degree surrounding image may be a panoramic image which is managed in a rectangular shape such that the right and left ends of the image continue to each other. An image 3000 is the panoramic image. That is, the image 3000 is an image that is presentable at a time point when the output instruction is received.

For example, the output image may be only a presentation image 3010 (corresponding to the first image) or the entire image 3000 including portions other than the presentation image 3010 (presentable images 3020 and 3030; corresponding to the second image). That is, the output image may be only the image that the user 290 is viewing or the entire image that the user 290 can view at the time point. In addition, the image with which the user images (the user image of the user 290 who is using the virtual reality display apparatus 200 and a user image of another user 290) are combined may be a presentation image 3010 or a portion other than the presentation image 3010. In addition, the image with which the user images are combined may be one of the presentation image 3010 and the portion other than the presentation image 3010.

In addition, as for the output form, as illustrated in the example of FIG. 30A, a presentation image 3010a may be centered, and presentable images 3020a and 3030a may be arranged at the left and right sides of the presentation image 3010a.

In addition, as for the output form, as illustrated in the example of FIG. 30B, a presentation image 3010b may be positioned at the left end, and a presentable image 3030b may be positioned at the right side of the presentation image 3010b.

In addition, as for the output form, as illustrated in the example of FIG. 30C, a presentation image 3010c may be positioned at the right end, and a presentable image 3020c may be positioned at the left side of the presentation image 3010c.

In addition, the output image may be output in another form (e.g., the presentation image 3010 is disposed slightly to the right side).

In addition, in the examples of FIGS. 30A to 30C, the presentable image (the presentable image 3020 or 3030) is arranged at the left or right side of the presentation image 3010. Alternatively, the presentable image may be arranged at the upper or lower side of the presentation image 3010. For example, the image that may be seen when the user is looking up or down at the time of the output instruction is arranged. That is, the position of the presentation image 3010 (e.g., the position in the paper for the two-dimensional printer 135) may be determined, and the presentable image may be arranged around the presentation image 3010. The position of the presentation image 3010 may be determined by the user 290 or according to a predetermined position (e.g., at the center).

When the first image (the portion that is being presented) and the second image (the portion that is not being presented and is the presentable image) are output in a panoramic form, only one of the first image and the second image may have an image at an edge thereof. That is, one of the first image and the second image may be a borderless image, and the other may be a bordered image. In this case, when one of the first image and the second image is a borderless image, the borderless printing may be performed. For example, when the first image is a borderless image, the entire image including the second image may also be printed borderless. When the second image is a borderless image, the entire image including the first image may also be printed borderless. In addition, the borderless printing may be performed only when both images are borderless images. Also, the bordered printing may be performed only when both images are bordered images.

In addition, the determination may be made for each side. For example, the borderless printing may be performed only when all sides are borderless. Also, the bordered printing may be performed only when all sides are bordered.

In addition, the setting of the priority of the borderless printing or the bordered printing may be made changeable. In addition, when a borderless image and a bordered image are mixed, or when a borderless side and a bordered side are mixed, it may be inquired of the user 290 about whether to perform the borderless printing (or whether to perform the bordered printing).

As described above, an image showing the entire 360-degree surroundings may not be prepared, that is, an image only up to a specific angle of the surroundings may be prepared.

In this case, for the image that is not prepared, a solid image such as a black image which is apparently inadequate to the output may exist in the second image (the portion that is not being presented) (the solid image may have a color other than black, e.g., dark blue, or may be a black-and-white dotted image). In that case, when the output instruction is received, a warning may be notified. In addition, it may be inquired about whether to perform the output. For example, a warning such as "An inadequate image is included" or "An unnecessary image will be output together" may be performed. As a result, for example, an occurrence of a difficulty in viewing the output image may be prevented, and the consumption amount of ink or toner in printing may be reduced.

Figure 30D:
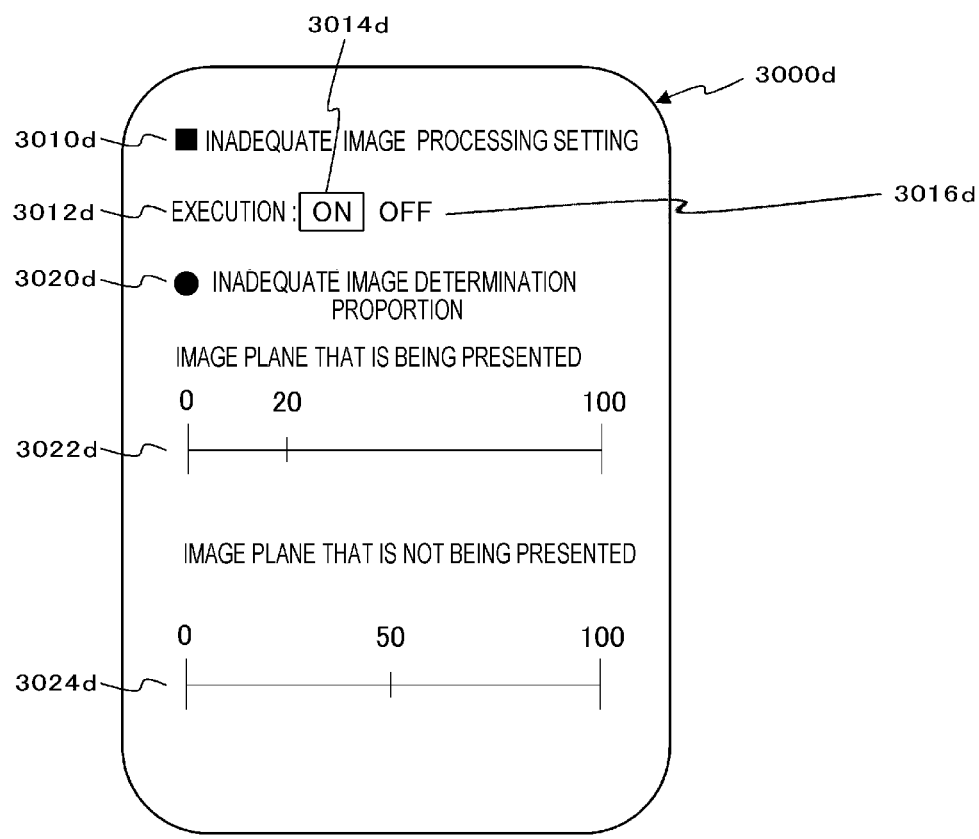
FIG. 30D is an explanatory view illustrating an example of a process according to the exemplary embodiment.

In addition, when it is determined that the inadequate solid image is included, only the image excluding the inadequate solid image may be automatically extracted and output. In that case, the setting for determining the inadequate image may be determined according to the user 290. As an example of the determination of the inadequate image, a portion that is temporarily set as an output area with a proportion of a majority (or another proportion) may be determined to be the inadequate image. In addition, a function of performing the output excluding the solid image from either or both of the first image (the portion that is being presented) and the second image (the portion that is not being presented) may be provided. For example, as illustrated in FIG. 30D, a screen 3000d may be presented on the display of the virtual reality display apparatus 200. That is, the screen represents that the proportion which is a determination criteria for each of image planes (an image plane that is being presented and an image plane that is not being presented) may be set by an operation of the user 290. For example, the screen 3000d presents an inadequate image processing setting field 3010d and an inadequate image determination proportion field 3020d. The inadequate image processing setting field 3010d has an execution instruction field 3012d in which an ON button 3014d and an OFF button 3016d are provided. When the ON button 3014d is selected, a process of deleting the inadequate image is performed according to the setting in the inadequate image determination proportion field 3020d. When the OFF button 3016d is selected, the deleting process is not performed. The inadequate image determination proportion field 3020d presents a proportion 3022d to the image plane that is being presented and a proportion 3024d to the image plane that is not being presented. When the proportion of the inadequate image to the image that is being presented is equal to or larger than (or larger than) the value set in the proportion 3022d, the process of deleting the inadequate image from the image that is being presented is performed. When the proportion of the inadequate image to the image that is not being presented is equal to or larger than (or larger than) the value set by the proportion 3024d, the process of deleting the inadequate image from the image that is not being presented is performed. That is, as a result of the deletion, the portion of the inadequate image is not output. In the case of FIG. 30D, when the proportion of the area of the inadequate image to the image plane that is being presented is equal to or larger than (or larger than) 20%, the inadequate image is not set to be a printing target. Also, when the proportion of the area of the inadequate image to the image plane that is not being presented is equal to or larger than (or larger than) 50%, the inadequate image is not set to be a printing target. The proportion can be set for each of the image plane that is being presented and the image plane that is not being presented. Alternatively, the proportion may be set only for one of the planes (e.g., the image plane that is not being presented) or may be set to a proportion to the entire image plane.

Figure 31:
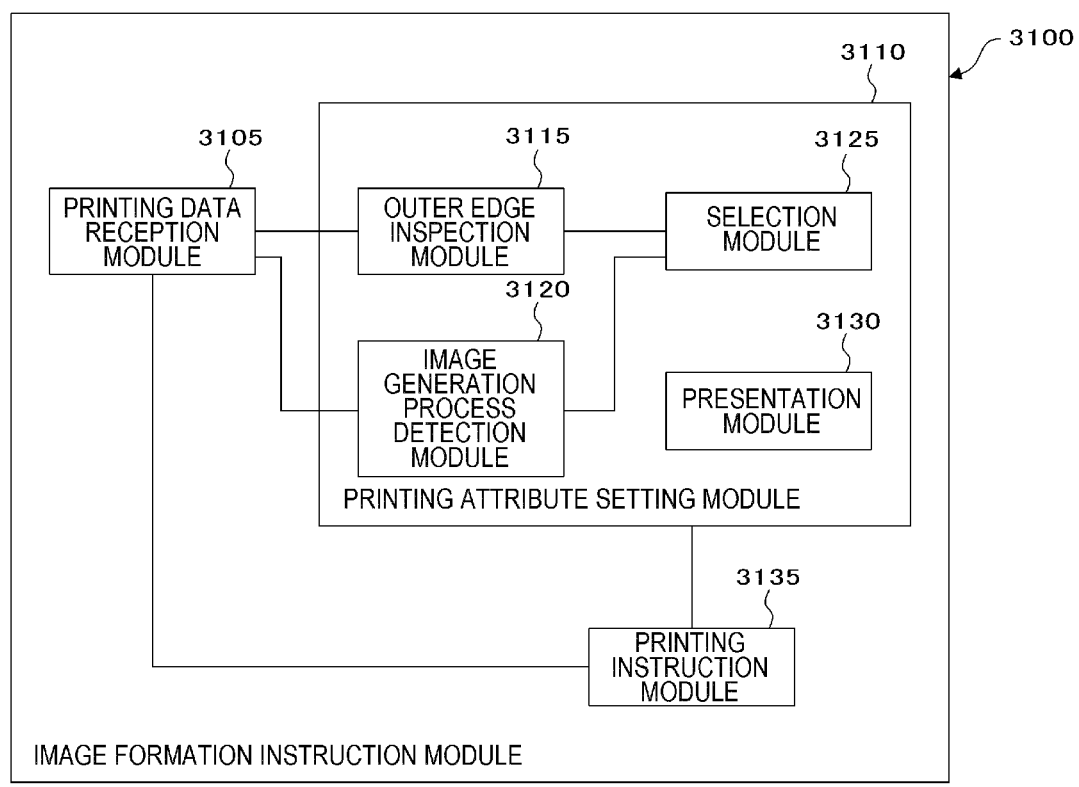
FIG. 31 is a conceptual module configuration diagram of an example of the configuration of an image formation instruction module.

FIG. 31 is a conceptual module configuration diagram illustrating an example of the configuration of an image formation instruction module 3100. When the output control module 125 performs the control to output the image to the two-dimensional printer 135, a process of the image formation instruction module 3100 may be performed.

The image formation instruction module 3100 designates either the borderless printing or the non-borderless printing with respect to the two-dimensional printer 135 capable of performing both of the borderless printing and the non-borderless printing (so-called bordered printing). The image formation instruction module 3100 includes a printing data reception module 3105, a printing attribute setting module 3110, and a printing instruction module 3135 as illustrated in the example of FIG. 31.

For example, in a case where the borderless printing mode (setting) and the non-borderless printing mode (setting) exist, if the user 290 is caused to set one of the modes each time the printing is performed, the number of work steps increases, and as a result, it takes long time to perform the operation. Then, in order to reduce the time, the image formation instruction module 3100 determines which of the borderless printing mode and the non-borderless printing mode is a more effective setting, and preferentially sets a mode according to the determination result.

The printing data reception module 3105 is connected to an outer edge inspection module 3115 and an image generation process detection module 3120 of the printing attribute setting module 3110, and the printing instruction module 3135. The printing data reception module 3105 receives printing data to be printed by the two-dimensional printer 135, and transfers the printing data to the outer edge inspection module 3115, the image generation process detection module 3120, and the printing instruction module 3135.

The printing attribute setting module 3110 includes the outer edge inspection module 3115, the image generation process detection module 3120, a selection module 3125, and a presentation module 3130. The printing attribute setting module 3110 is connected to the printing instruction module 3135. The printing attribute setting module 3110 sets a printing attribute in a case where the two-dimensional printer 135 is caused to perform the printing. The printing attribute setting module 3110 mainly sets one of the borderless printing and the non-borderless printing as the printing attribute. In addition, the printing attribute setting module 3110 determines whether the two-dimensional printer 135 is capable of setting both of the borderless printing and the non-borderless printing. When it is determined that the two-dimensional printer 135 is capable of setting both of the borderless printing and the non-borderless printing, the respective modules in the printing attribute setting module 3110 are caused to perform processes. When it is determined that the two-dimensional printer 135 is not capable of setting both of the borderless printing and the non-borderless printing (when the two-dimensional printer 135 is capable of setting only one of the borderless printing and the non-borderless printing), a setting of a printing attribute in a general printing device (e.g., setting of the number of copies, a paper size, and a black-and-white/color printing) may be performed.

The outer edge inspection module 3115 is connected to the printing data reception module 3105 and the selection module 3125. The outer edge inspection module 3115 inspects whether an image to be printed is present at an outer edge of the printing data received by the printing data reception module 3105. Here, the "outer edge of the printing data" refers to a peripheral portion of the printing data, and is a portion corresponding to an edge of a two-dimensional recording medium when the printing data is printed on the two-dimensional recording medium. That is, the outer edge of the printing data is determined based on a positional relationship between the area of the printing data and the two-dimensional recording medium on which the printing data is printed.

The printing data may not be limited to the rectangular shape. When the printing data has the rectangular shape, the outer edge refers to edge portions of the four sides Hereinafter, the description will be given using, for example, the rectangular shape. Specifically, the outer edge will be described later using examples illustrated in FIGS. 34A to 34C.

The image generation process detection module 3120 is connected to the printing data reception module 3105 and the selection module 3125. The image generation process detection module 3120 detects the generation process of the printing data received by the printing data reception module 3105. The generation process includes, for example, a process where the printing data is generated by a screenshot (the image that the user 290 is viewing is instructed to be printed; hereinafter, also referred to as screenshot). As for the detection method, for example, when an attribute of the printing data includes the generation process of the image, the generation process may be extracted. In addition, the generation process is not limited to the attribute of the printing data. The generation process may be extracted from other data. For example, a device that generates the printing data (which may be provided in the image formation instruction module 3100) may detect the generation process from an operation to generate the printing data, and the detected generation process may be received by the image generation process detection module 3120. The generation process may be detected from an operation for generating the printing data. In addition, the generation process may be detected from the operation log (operation history) for generating the printing data.

The selection module 3125 is connected to the outer edge inspection module 3115 and the image generation process detection module 3120. The selection module 3125 selects either the setting for borderless printing or the setting for non-borderless printing, based on the printing data.

In addition, the selection module 3125 may select either the setting for borderless printing or the setting for non-borderless printing, based on an image at the outer edge of the printing data. Here, the description "based on an image at the outer edge of the printing data" indicates the detection result by the outer edge inspection module 3115.

In addition, the selection module 3125 may select the setting for borderless printing when an image is present at the outer edge of the printing data. The description "when an image is present at the outer edge of the printing data" indicates a case where printing data to be printed is present at the outer edge of the two-dimensional recording medium on which printing.

In addition, the selection module 3125 may select the setting for non-borderless printing when no image is present at the outer edge of the printing data.

In addition, the selection module 3125 may select the setting for borderless printing or the setting for non-borderless printing, for each edge of the printing data. When the printing data has the rectangular shape, the printing setting may be selected for each side (each of the four sides).

In addition, the selection module 3125 may select either the setting for borderless printing or the setting for non-borderless printing, based on the generation process of the printing data.

In addition, the selection module 3125 may select the setting for borderless printing when the printing data is the image generated by the screenshot. In addition, the selection module 3125 may select the setting for non-borderless printing when the printing data is generated by a method other than the screenshot (e.g., when printing a manual).

The presentation module 3130 presents the selection result by the selection module 3125. The selection result is either the setting for borderless printing or the setting for non-borderless printing.

In addition, the presentation module 3130 may present the selection result by the selection module 3125 to be changeable by an operator. Specifically, the changing operation by the operator corresponds to changing the setting for borderless printing which is the selection result by the selection module 3125 to the setting for non-borderless printing, or in reverse, changing the setting for non-borderless printing which is the selection result by the selection module 3125 to the setting for borderless printing.

The printing instruction module 3135 is connected to the printing data reception module 3105 and the printing attribute setting module 3110. According to the setting of the printing attribute by the printing attribute setting module 3110, the printing instruction module 3135 generates a printing instruction (also referred to as a printing job) to cause the two-dimensional printer 135 to print the printing data received by the printing data reception module 3105, and transfers the printing instruction to the two-dimensional printer 135.

In addition, when the setting for borderless printing and the setting for non-borderless printing are mixed with respect to the printing data, the printing instruction module 3135 may generate an image having a leading edge that is set to the setting for non-borderless printing. When the printing data has the rectangular shape, an image having a leading side that is set to the setting for non-borderless printing is generated.

In addition, the printing instruction module 3135 may rotate the printing data so as to generate the image having the leading edge that is set to the setting for non-borderless. When the printing data has the rectangular shape, an image having a leading side that is set to the setting for non-borderless printing is generated.

Figure 32:
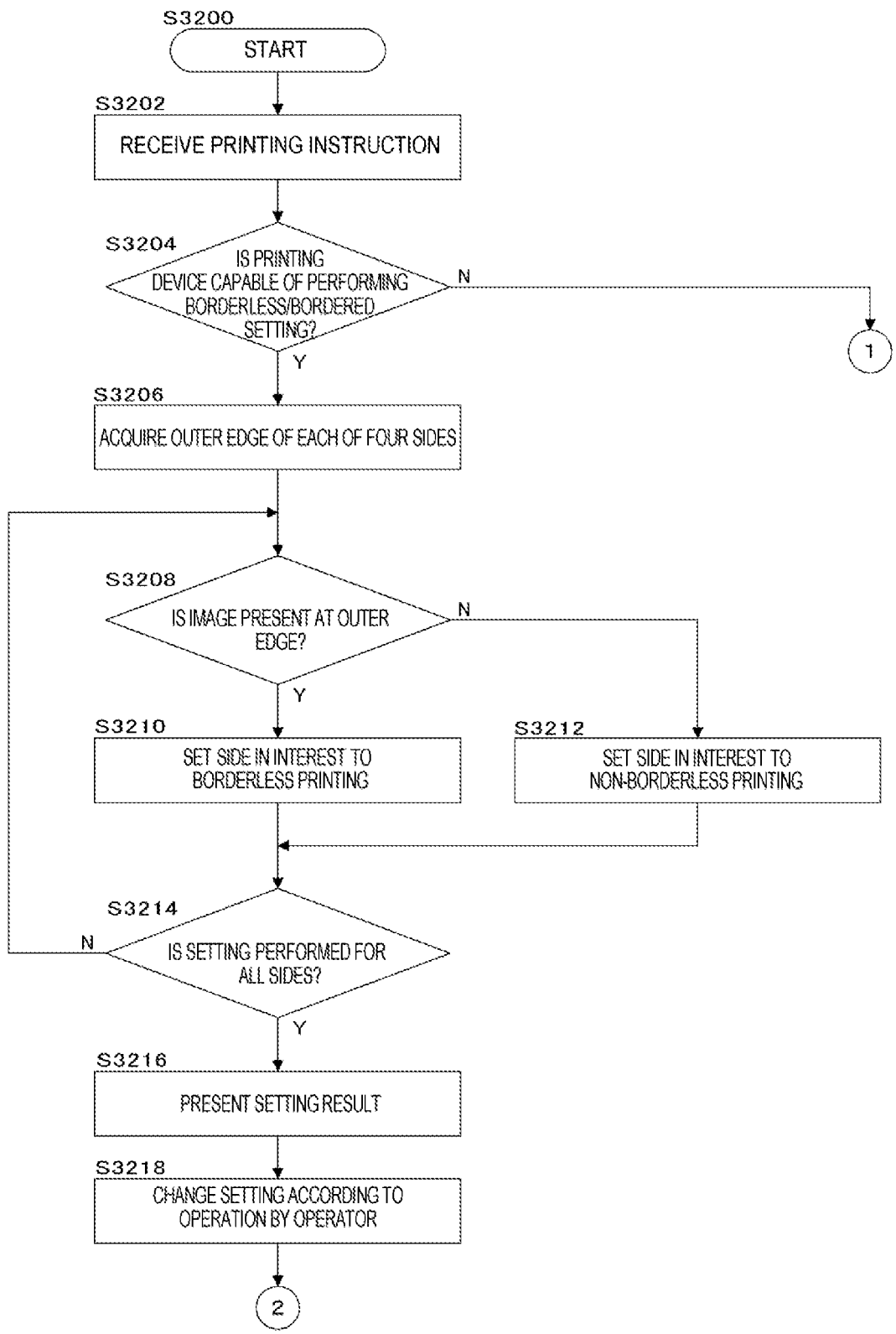
FIG. 32 is a flowchart illustrating an example of a process according to the exemplary embodiment.
Figure 33:
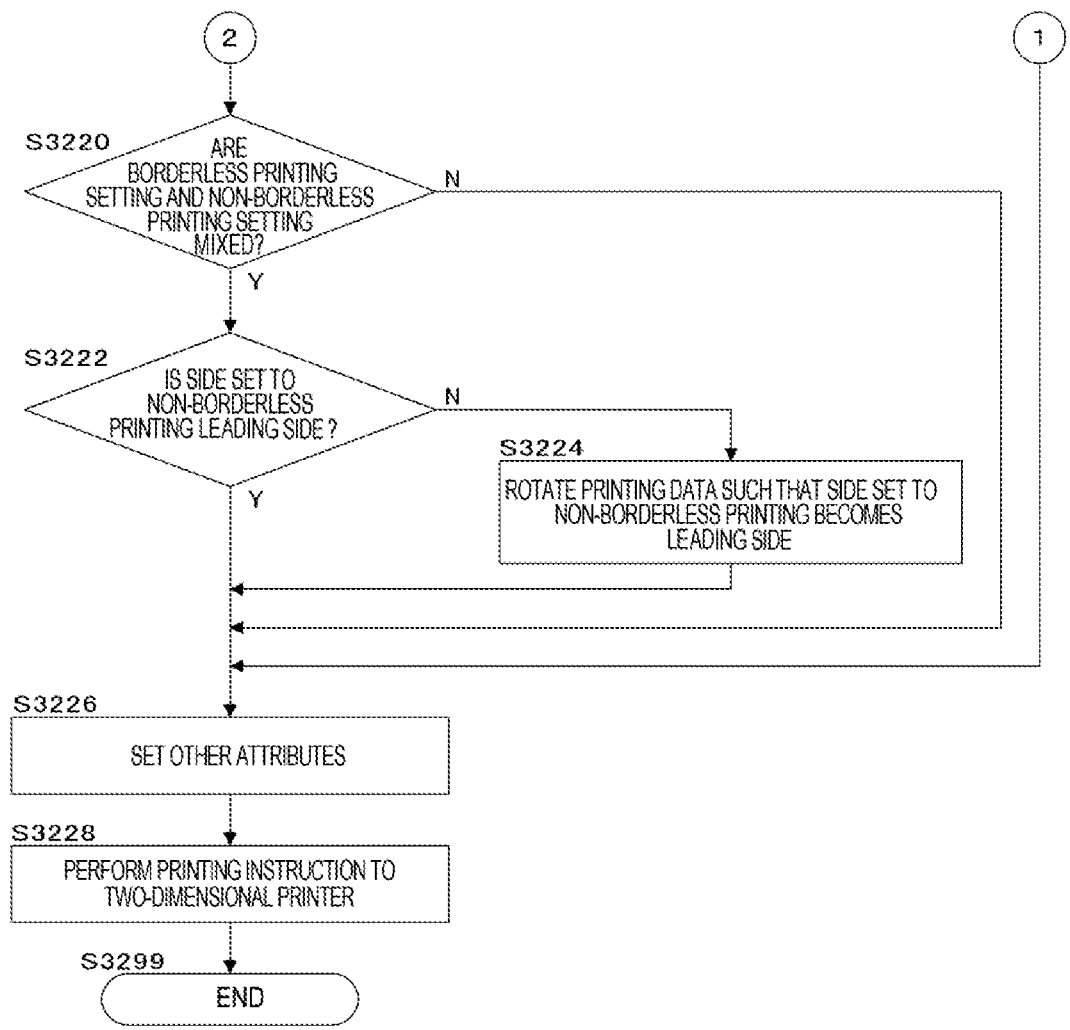
FIG. 33 is a flowchart illustrating an example of a process according to the exemplary embodiment.

Each of FIGS. 32 and 33 is a flowchart illustrating an example of a process according to the present exemplary embodiment.

In step S3202, the printing data reception module 3105 receives the printing instruction.

In step S3204, the printing attribute setting module 3110 determines whether the printing device is capable of performing the borderless/bordered (borderless printing/non-borderless printing) setting. When it is determined that the printing device is capable of the borderless/bordered setting, the process proceeds to step S3206. Otherwise, the process proceeds to step S3226.

Figure 34A:
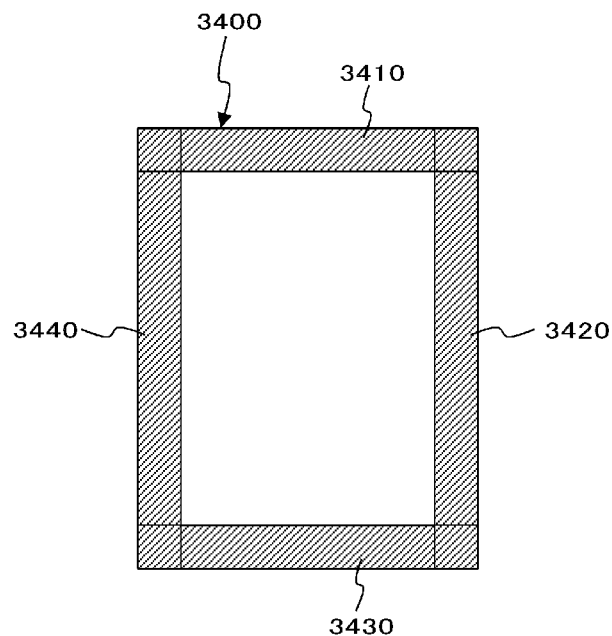
FIGS. 34A to 34C are explanatory views illustrating examples of an outer edge of a process target according to the exemplary embodiment.
Figure 34B:
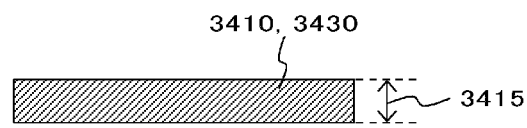
Figure 34C:
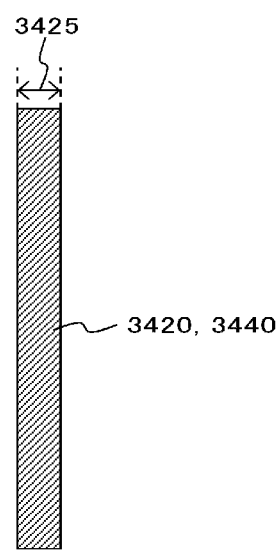

In step S3206, the outer edge inspection module 3115 acquires the outer edge of each of the four sides. For example, FIGS. 34A to 34C are explanatory views illustrating examples of an outer edge of a processing target according to the present exemplary embodiment. As illustrated in the example of FIG. 34A, printing data 3400 includes outer edges 3410, 3420, 3430, and 3440. As illustrated in the examples of FIGS. 34B and 34C, a width 3415 of each of the outer edges 3410 and 3430 and a width 3425 of each of the outer edges 3420 and 3440 correspond to widths of edge portions when the bordered printing is performed. In the example of FIG. 34B, the width 3415 of the outer edge 3410 is the same as the width 3415 of the outer edge 3430, but the widths may have different values. In addition, in the example of FIG. 34C, the width 3425 of the outer edge 3420 is the same as the width 3425 of the outer edge 3440, but the widths may have different values.

In step S3208, the outer edge inspection module 3115 determines whether an image is present at the outer edge. When it is determined that an image is present at the outer edge, the process proceeds to step S3210. Otherwise, the process proceeds to step S3212. In the examples of FIGS. 34A to 34C, it may be determined whether an image to be printed is present at the outer edges 3410, 3420, 3430, and 3440. In addition, the outer edges 3410, 3420, 3430, and 3440 may be areas in the two-dimensional recording medium on which printing is performed.

In step S3210, the selection module 3125 sets the side in interest to the borderless printing.

In step S3212, the selection module 3125 sets the side in interest to the non-borderless printing.

In step S3214, the selection module 3125 determines whether the setting is performed for all the sides. When it is determined that the setting is performed for all the sides, the process proceeds to step S3216. Otherwise, the process returns to step S3208.

In step S3216, the presentation module 3130 presents the setting result. For example, a presentation illustrated in FIG. 35 or 36 is performed.

Figure 35:
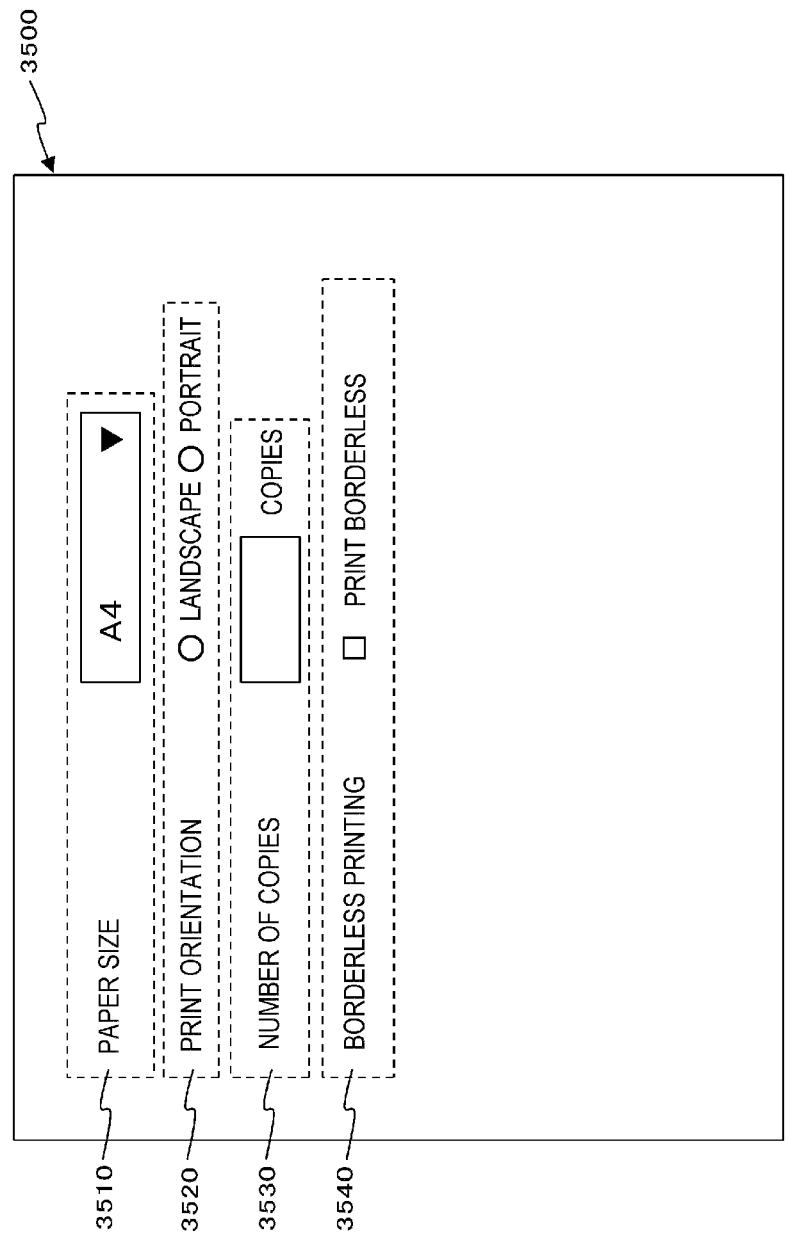
FIG. 35 are an explanatory view illustrating an example of presentation of a screen according to the exemplary embodiment.

FIG. 35 is an explanatory view illustrating an examples of a presentation of a screen 3500 according to the exemplary embodiment. FIG. 35 illustrates an example of a presentation in a case where all the sides are set to the non-borderless printing.

The screen 3500 displays the paper size designation field 3510, the print orientation designation field 3520, the number of copies designation field 3530, and the borderless printing designation field 3540. Since all the sides are set to the non-borderless printing, "perform borderless printing" is not selected in the borderless printing designation field 3540.

Figure 36:
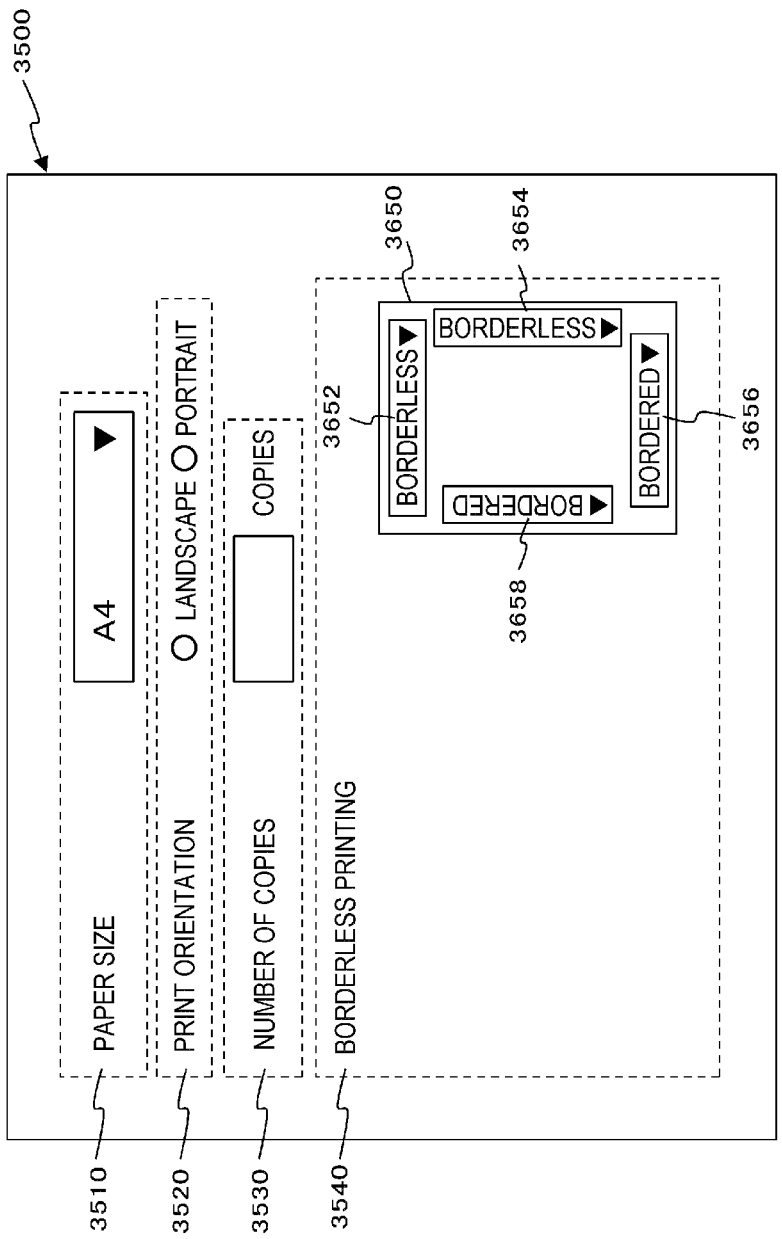
FIG. 36 is an explanatory view illustrating an example of the presentation of the screen according to the exemplary embodiment.

FIG. 36 is an explanatory view illustrating an examples of a presentation of a screen 3500 according to the exemplary embodiment. FIG. 36 represents an example of a presentation in a case where the sides set to the borderless printing and the sides set to the non-borderless printing are mixed.

The screen 3500 displays the paper size designation field 3510, the print orientation designation field 3520, the number of copies designation field 3530, and the borderless printing designation field 3640. The borderless printing designation field 3640 displays a thumbnail image 3650 of the printing data. The thumbnail image 3650 has borderless/bordered setting areas 3652, 3654, 3656, and 3658. Here, the borderless/bordered setting area 3652 (the upper side) is set to "borderless," the borderless/bordered setting area 3654 (the right side) is set to "borderless," the borderless/bordered setting area 3656 (the lower side) is set to "bordered," and the borderless/bordered setting area 3658 (the left side) is set to "bordered."

In step S3218, the presentation module 3130 changes the setting according to an operation by the operator. In the example of FIG. 35, the selection of "perform borderless printing" may be received through an operation by the user 290 in the borderless printing designation field 3540. That is, even after it is determined that the "bordered printing" is appropriate, a change from the "bordered printing" to the "borderless printing" may be performed though the operation by the user 290. In the example of FIG. 36, the change between the selection of the "borderless printing" and the selection of "bordered printing" may be received for each side through the operation by the user 290. That is, even after it is determined that the "borderless printing" or "bordered printing" is appropriate, the change from the "bordered printing" to the "borderless printing" or from the "borderless printing" to the "bordered printing" may be performed for each side through the operation by the user 290.

In step S3220, the printing instruction module 3135 determines whether the setting for borderless printing and the setting for non-borderless printing are mixed in one two-dimensional recording medium. When it is determined that the setting for borderless printing and the setting for non-borderless printing are mixed, the process proceeds to step S3222. Otherwise, the process proceeds to step S3226.

In step S3222, the printing instruction module 3135 determines whether the side that is set to the setting for non-borderless printing is the leading side. When it is determined that the side is the leading side, the process proceeds to step S3226. Otherwise, the process proceeds to step S3224. Here, the "leading side" refers to a side on which an image is formed earliest, in the two-dimensional recording medium on which printing is performed.

In step S3224, the printing instruction module 3135 rotates the printing data such that the side that is set to the setting for non-borderless printing becomes the leading side. In a case where the borderless printing is performed for the leading end, a contamination of the image (e.g., a contamination caused by the toner extending outward from the edge of the two-dimensional recording medium) may spread over the entire two-dimensional recording medium. Thus, the printing data is rotated such that the side that is set to the bordered printing becomes the leading side.

In step S3226, the printing attribute setting module 3110 sets other attributes. The setting of the other attributes corresponds to the settings in, for example, the paper size designation field 3510, the print orientation designation field 3520, and the number of copies designation field 3530 as illustrated in the example of FIG. 35.

In step S3228, the printing instruction module 3135 performs the printing instruction to the two-dimensional printer 135. For example, a printing instruction table 3700 is generated and transferred as a printing job to the two-dimensional printer 135. FIG. 37 is an explanatory view illustrating an example of the data structure of the printing instruction table 3700. The printing instruction table 3700 includes, for example, a printing instruction field 3710, a printing data field 3720, a paper size field 3730, a print orientation field 3740, a number of copies field 3750, and a borderless printing field 3760. The borderless printing field 3760 includes an upper side field 3762, a right side field 3764, a lower side field 3766, and a left side field 3768.

The printing instruction field 3710 stores the printing instruction. The printing data field 3720 stores the printing data to be printed. The paper size field 3730 stores a size of paper on which printing is performed. The print orientation field 3740 stores an orientation of printing. The number of copies field 3750 stores the number of copies. The borderless printing field 3760 stores information as to whether the borderless printing is set. The upper side field 3762 stores information as to whether the upper side is set to the borderless printing. The right side field 3764 stores information as to whether the right side is set to the borderless printing. The lower side field 3766 stores information as to whether the lower side is set to the borderless printing. The left side field 3768 stores information as to whether the left side is set to the borderless printing. In addition, instead of the information for each side, information as to whether the entire paper is set to the borderless printing (information indicating that the borderless printing is set if any one side is set to the setting for borderless printing) may be stored.

The two-dimensional printer 135 according to the present exemplary embodiment has a printing function. Generally, the two-dimensional printer 135 corresponds to, for example, a printer, a copying machine, or a multifunction machine (an image processing apparatus having the functions of one or more of the printer and the copying machine, and having plural functions such as a scanner and a facsimile).

Figure 38:
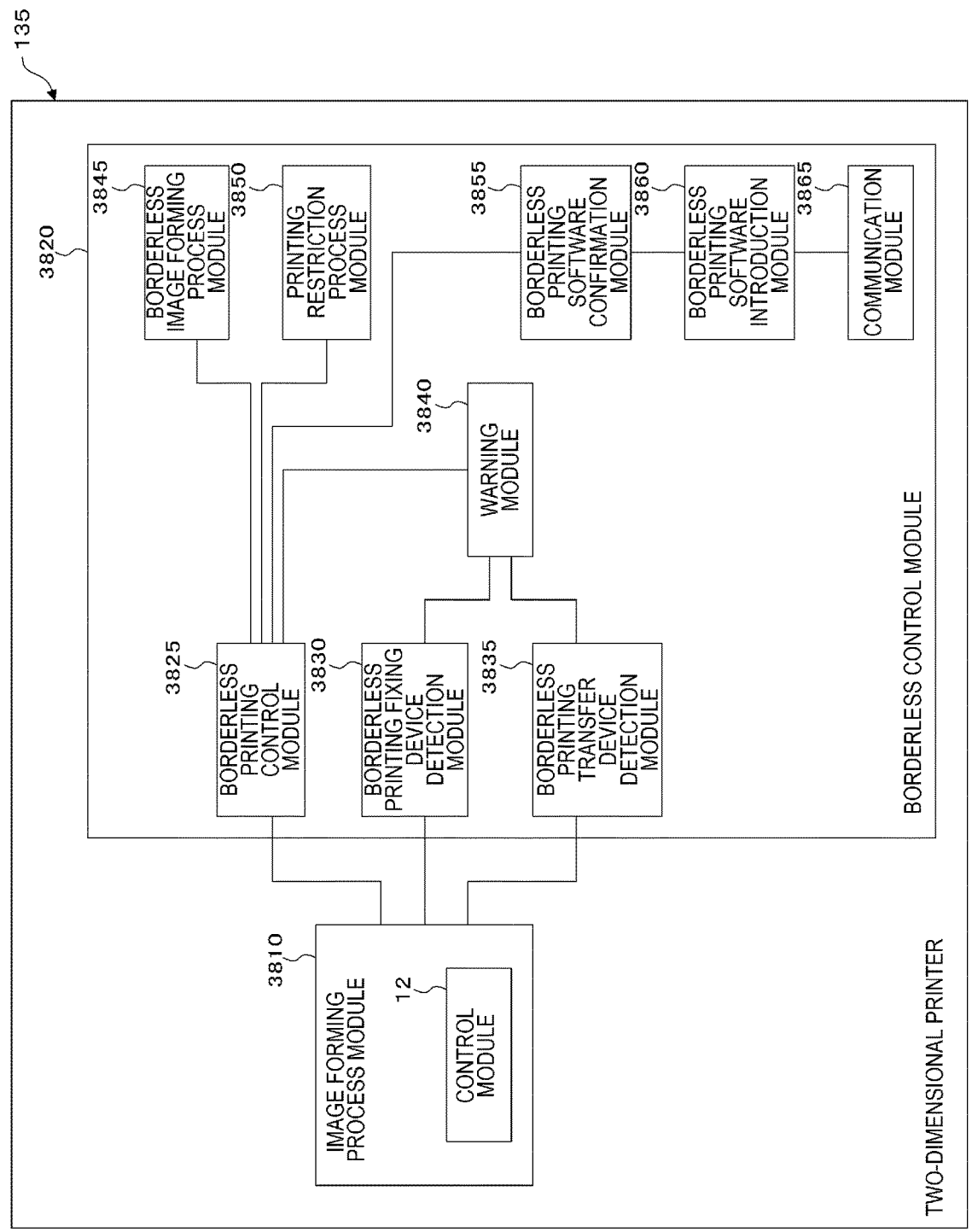
FIG. 38 is a conceptual module configuration diagram of an example of the configuration of a two-dimensional printer.

As illustrated in an example of FIG. 38, the two-dimensional printer 135 includes an image forming process module 3810 and a borderless control module 3820. In the two-dimensional printer 135, a fixing device for borderless printing or a transfer device for borderless printing is replaceable. In addition, only the fixing device for borderless printing may be replaceable, only the transfer device for borderless printing may be replaceable, or both the fixing device for borderless printing and the transfer device for borderless printing may be replaceable. The replacement (setting or mounting) of the fixing device for borderless printing refers to a replacement of a fixing device which is not for borderless printing (a general fixing device, i.e., a fixing device for bordered printing) with a fixing device for borderless printing, or vice versa. In addition, the replacement of the transfer device for borderless printing refers to a replacement of a transfer device which is not for borderless printing (a general transfer device, i.e., a transfer device for bordered printing) with a transfer device for borderless printing, or vice versa.

The two-dimensional printer 135 is capable of performing the borderless printing. When the fixing device for borderless printing and the transfer device for borderless printing are attached to the two-dimensional printer 135, the borderless printing may be performed with a high image quality. Even when one or more of the fixing device for borderless printing and the transfer device for borderless printing are not attached to the two-dimensional printer 135, the borderless printing itself may be performed. It is noted that, as compared with a case where both are attached, the image quality may be deteriorated or, for example, a failure of the two-dimensional printer 135 may be caused. In addition, it is difficult to recognize from the outside whether the fixing device for borderless printing and the transfer device for borderless printing are attached to the two-dimensional printer 135. In addition, a difference between the fixing device for borderless printing or the transfer device for borderless printing and a general fixing device or a general transfer device is found in, for example, a cleaning mechanism.

When it is designated to use the borderless printing function, the two-dimensional printer 135 determines whether the fixing device or the transfer device is for borderless printing. When the fixing device or the transfer device is not for the borderless printing, a warning is issued. In addition, despite the warning, the borderless printing may be performed according to the operation by the user 290.

The image forming process module 3810 includes a control module 12. The image forming process module 3810 is connected to a borderless printing control module 3825, a borderless printing fixing device detection module 3830, and a borderless printing transfer device detection module 3835 of the borderless control module 3820. The image forming process module 3810 performs an image forming process in the two-dimensional printer 135. Specifically, a printing process is performed according to the printing instruction provided by the operation of the user 290. In addition, when the printing instruction includes the designation of the borderless printing, the borderless control module 3820 is caused to perform the process. In addition, the borderless printing may be set for each side of the two-dimensional recording medium on which printing is performed. Accordingly, the setting for borderless printing and the setting for non-borderless printing may be mixed. In that case, the fixing device for borderless printing or the transfer device for borderless printing may be used.

The control module 12 controls the image forming process module 3810 to cause the image forming process module 3810 to perform the image forming process.

The detailed process of the image forming process module 3810 and the control module 12 (especially, the borderless printing process) will be described later using examples of FIGS. 39 to 41C.

The borderless control module 3820 includes the borderless printing control module 3825, the borderless printing fixing device detection module 3830, the borderless printing transfer device detection module 3835, a warning module 3840, a borderless image forming process module 3845, a printing restriction process module 3850, a borderless printing software confirmation module 3855, a borderless printing software introduction module 3860, and a communication module 3865. The borderless control module 3820 performs a process for a case where the printing instruction includes the designation of the borderless printing.

The borderless printing control module 3825 is connected to the image forming process module 3810, the warning module 3840, the borderless image forming process module 3845, the printing restriction process module 3850, and the borderless printing software confirmation module 3855. The borderless printing control module 3825 controls the modules in the borderless control module 3820 according to an instruction from the image forming process module 3810.

The borderless printing fixing device detection module 3830 is connected to the image forming process module 3810 and the warning module 3840. The borderless printing fixing device detection module 3830 detects whether the fixing device for borderless printing is provided in the image forming process module 3810. In addition, a cleaner unit attached to the fixing device may be detected as the fixing device for borderless printing.

The borderless printing transfer device detection module 3835 is connected to the image forming process module 3810 and the warning module 3840. The borderless printing transfer device detection module 3835 detects whether the transfer device for borderless printing is provided in the image forming process module 3810. In addition, a cleaner unit attached to the transfer device may be detected as the transfer device for borderless printing.

The borderless printing fixing device detection module 3830 and the borderless printing transfer device detection module 3835 may make the determination based on, for example, whether information (flag or attribute information) indicating that the fixing device for borderless printing and the transfer device for borderless printing are set is stored in a predetermined storage area. This storage area may be provided in a storage unit that the fixing device or the transfer device has, or in a storage unit of the two-dimensional printer 135. In addition, it may be detected by a sensor whether the fixing device for borderless printing and the transfer device for borderless printing are set. The sensor may be, for example, an optical sensor, a magnetic sensor, or a mechanical switch. The sensor is turned ON (or OFF) in a case where the fixing device for borderless printing and the transfer device for borderless printing are set. The determination may be made upon receipt of this information. Especially, in a case where the storage area described above is not provided, the detection may be performed using the sensor.

The warning module 3840 is connected to the borderless printing control module 3825, the borderless printing fixing device detection module 3830, and the borderless printing transfer device detection module 3835. In a case where the fixing device or the transfer device is not for borderless printing when the borderless printing function is used, the warning module 3840 issues the warning. The expression "when the borderless printing function is used" corresponds to, for example, a case where the printing instruction including the designation of the borderless printing is received from the operation of the user 290 as described above. The expression "in a case where the fixing device or the transfer device is not for the borderless printing" corresponds to, for example, a case where the borderless printing fixing device detection module 3830 does not detect that the fixing device for borderless printing is set, or a case where the borderless printing transfer device detection module 3835 does not detect that the transfer device for borderless printing is set. Combinations for the expression "in a case where the fixing device or the transfer device is not for the borderless printing" includes a "case where the fixing device is not for borderless printing," a "case where the transfer device is not for borderless printing," and a "case where both of the fixing device and the transfer device are not for borderless printing." It is noted that in a case where the two-dimensional printer 135 itself can perform the borderless printing with the high image quality only by the fixing device for borderless printing (a general transfer device rather than the transfer device for borderless printing), the combinations may only include the "case where the fixing device is not for borderless printing." In a case where the borderless printing with the high image quality may be performed only by the transfer device for borderless printing (a general fixing device rather than the fixing device for borderless printing), the combinations may only include the "case where the transfer device is not for borderless printing." Alternatively, in a case where in the two-dimensional printer 135, only the fixing device for borderless printing is replaceable (the transfer device is not replaceable), the combinations may only include the "case where the fixing device is not for borderless printing." In a case where in the two-dimensional printer 135, only the transfer device for borderless printing is replaceable (the fixing device is not replaceable), the combinations may only include the "case where the transfer device is not for borderless printing."

In addition to display of warning contents on a display device, the warning may include outputting as a 3D image, outputting of warning sound (including warning voice) to, for example, a speaker, vibration, and a combination thereof.

The borderless image forming process module 3845 is connected to the borderless printing control module 3825. In a case where the fixing device for borderless printing or the transfer device for borderless printing is not attached, and the designation of the borderless printing function is received, the borderless image forming process module 3845 performs an image forming process which is different from that in a case where the fixing device for borderless printing and the transfer device for borderless printing are attached. As for the determination that "the fixing device for borderless printing or the transfer device for borderless printing is not attached," as described above, the detection results by the borderless printing fixing device detection module 3830 and the borderless printing transfer device detection module 3835 may be used. As described above, the "case where the designation of the borderless printing function is received" corresponds to, for example, a case where the printing instruction including the designation of the borderless printing is received from the operation by the user 290.

As the "different image forming process," the density of an image of a peripheral portion which is an edge may be lowered. The peripheral portion refers to portions of the four sides of paper (portions each having a predetermined width from the edge) and is a portion where printing is not performed in the general printing (bordered printing). By lowering the density of the image printed at the peripheral portion, the amount of the toner required to be cleaned is reduced. For example, the density is lowered to 80% of the original density. In addition, rather than uniformly lowering the density of the peripheral portion, the lowering amount of density may be increased toward the edge. In addition, rather than lowering the density of the portions of all the four sides, the density of the edge portion of only the leading end portion of the paper in a transport direction may be lowered, or the density of the portions of the four sides such as the side edge portions of the paper may be selectively lowered. In addition, when the density of the image of the portions of the four sides is lower than or equal to or lower than a predetermined density, the process of lowering the density may not be performed.

In addition, as the "different image forming process," the cleaning of the transfer device or the fixing device may be performed more frequently than that in a case where the fixing device for borderless printing and the transfer device for borderless printing are attached. For example, in a case of the borderless printing, the number of times of the cleaning of each device may be increased. In order to increase the number of times of the cleaning, the devices may be caused to only transport paper without forming an image thereon after the borderless printing (the paper is processed in the transfer device and the fixing device so that the residual toner which causes the contamination is adsorbed on the paper). In addition, when the idle rotation without forming an image is impossible, the cleaning operation may be performed by forming an image similar to the background color of the paper (white image when the paper is white) or forming a transparent clear image. In addition, paper having a size larger than the size of the paper on which the borderless printing is performed may be used. This is because the borderless printing prints an image extending outward from the paper, as a printing target. In addition, the cleaning process may be performed for each paper on which the borderless printing is performed or each printing job.

In addition, when the borderless printing is consecutively performed on papers having the same size, a control may be performed so as not to perform the increasing cleaning process. It should be noted that the increasing cleaning process is performed after the last printing. In addition, when the next borderless printing is performed on paper having a size smaller than that in the previous borderless printing, a control may be performed not to perform the increasing cleaning process. It should be noted that the increasing cleaning process is performed after the last printing. Meanwhile, when the next borderless printing is performed on paper having a size larger than that in the previous borderless printing, a control may be performed to perform the increasing cleaning process.

The printing restriction process module 3850 is connected to the borderless printing control module 3825. When the warning module 3840 issues the warning, the printing restriction process module 3850 restricts the use of the borderless printing function. The "restriction on the use of the borderless printing function" may be a restriction on the number of times of use or a restriction on the user 290. The restriction on the number of times of use refers to performing a control not to permit the use of the borderless printing function when the "use of the borderless printing function" is performed the number of times which is more than or equal to or more than a predetermined threshold value. The restriction on the number of times of use includes, for example, a restriction on the number of copies, a restriction on the number of times of use per paper size, and a restriction on the number of times of use per white-and-black/color. The restriction on the user 290 refers to performing a control to permit only a predetermined user 290 to "use the borderless printing function." The restriction on the user 290 includes, for example, a specification by a user ID (identification) and a specification by the role of the user 290 (specifically, a group leader or a designer). In addition, the number of times of use and the user 290 may be combined with each other. For example, the number of times of use may be restricted per user ID.

The borderless printing software confirmation module 3855 is connected to the borderless printing control module 3825 and the borderless printing software introduction module 3860. The borderless printing software confirmation module 3855 confirms whether software (program) capable of using the borderless printing is introduced, when the fixing device for borderless printing and the transfer device for borderless printing are attached. As described above, as for whether the fixing device for borderless printing and the transfer device for borderless printing are attached (or whether the printer is in a state where the devices are attached), the detection results by the borderless printing fixing device detection module 3830 and the borderless printing transfer device detection module 3835 may be used. In addition, in order to determine whether the software capable of using the borderless printing is introduced, it may be determined whether information (flag or attribute information) indicating that the software is introduced is stored in a predetermined storage area, or a software ID capable of using the borderless printing may be acquired from a software storage server and it may be determined whether the software ID is introduced in the image forming process module 3810.

The borderless printing software introduction module 3860 is connected to the borderless printing software confirmation module 3855 and the communication module 3865. According to the confirmation result by the borderless printing software confirmation module 3855, the borderless printing software introduction module 3860 introduces the software via a communication line when the software capable of using the borderless printing is not introduced. Specifically, the software may be searched from the software storage server by using the model of the two-dimensional printer 135 as a search key (the search key may include, e.g., device IDs of the fixing device for borderless printing and the transfer device for borderless printing).

The communication module 3865 is connected to the borderless printing software introduction module 3860. The communication module 3865 communicates with the software storage server. Specifically, according to an instruction from the borderless printing software introduction module 3860, the communication module 3865 transmits a request for the software capable of using the borderless printing and receives the software.

Figure 39:
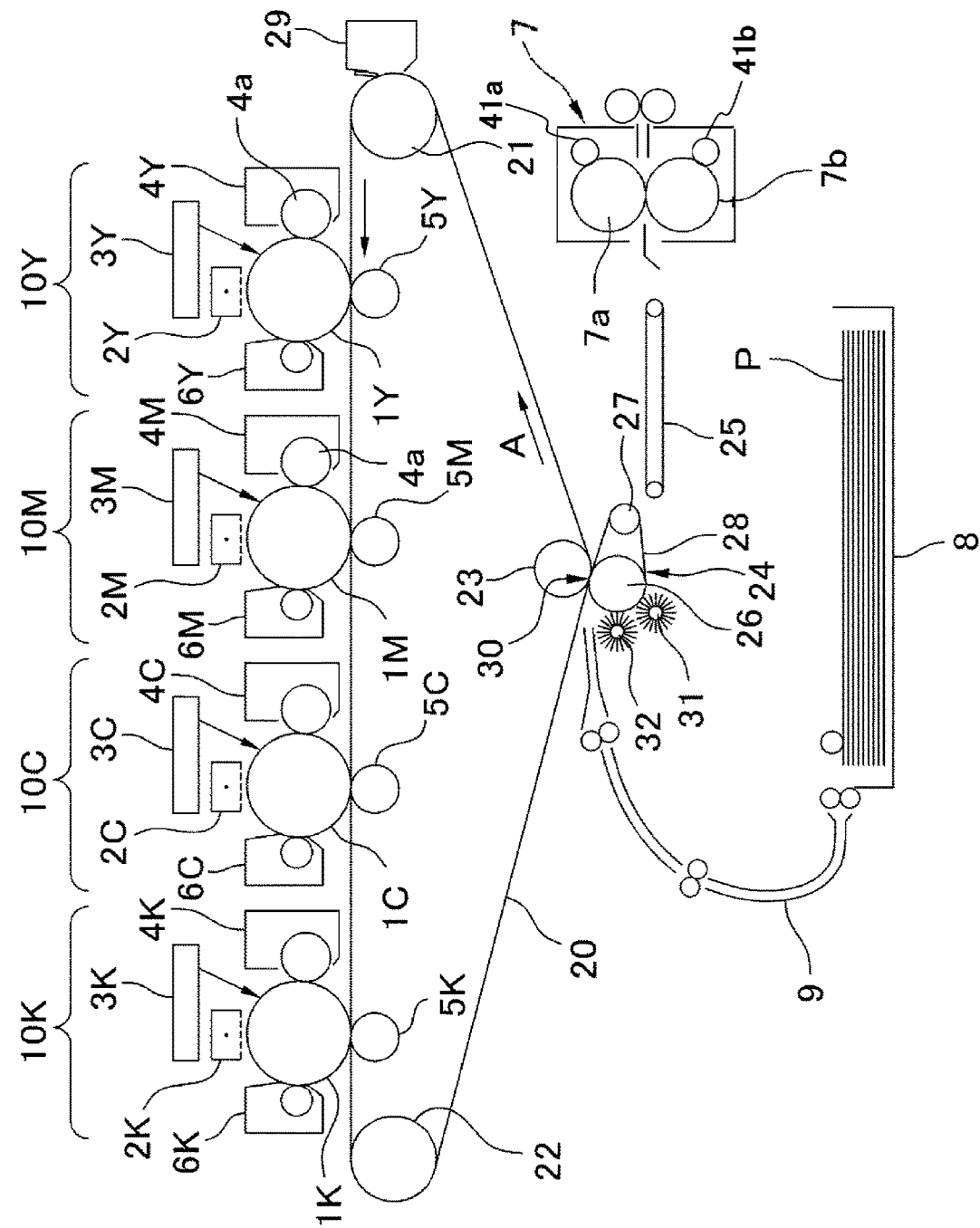
FIG. 39 is a view schematically illustrating the configuration in an image forming process module.
Figure 40:
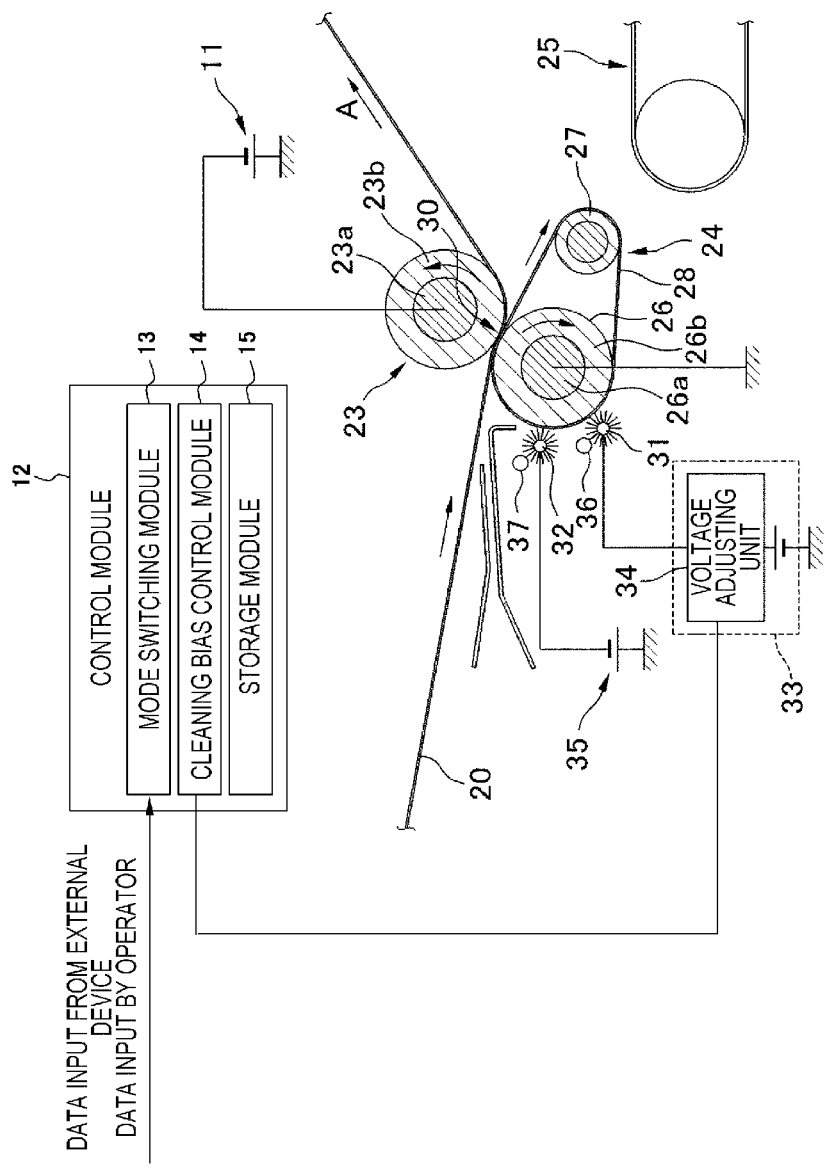
FIG. 40 is a view illustrating the configuration in the vicinity of a position where a secondary transfer is performed by the image forming process module, and the configuration to control a bias voltage applied between a secondary transfer member and a cleaning member.

FIG. 39 is a view schematically illustrating the configuration in the image forming process module 3810. FIG. 40 is a view illustrating the configuration in the vicinity of a position where a secondary transfer of the image forming process module 3810 illustrated in FIG. 39 is performed, and the configuration to control a bias voltage applied between a secondary transfer member and a cleaning member.

In an image forming apparatus which forms a toner image by transferring powdery toner onto a latent image formed by a difference of an electrostatic potential, the toner is caused to adhere onto the endless peripheral surface of a latent image carrying member on which the latent image is formed so that the toner image is formed. Then, the formed toner image is transferred directly onto the two-dimensional recording medium from the latent image carrying member, or the formed toner image is primarily transferred from the latent image carrying member onto an intermediate transfer body and secondarily transferred onto the two-dimensional recording medium. A transfer member that transfers the toner image onto the two-dimensional recording medium is generally, for example, a transfer roller that is in contact with the latent image carrying member or the intermediate transfer body and is configured such that the endless peripheral surface thereof circularly moves, or a transfer belt wrapped about plural roller-shaped members. This transfer member sandwiches the two-dimensional recording medium delivered to a transfer area which is a position where the transfer member and the latent image carrying member or the intermediate transfer body face each other, comes into contact with the back surface of the two-dimensional recording medium, and causes the two-dimensional recording medium to pass through between the transfer member and the latent image carrying member or the intermediate transfer body. Then, a transfer bias voltage is applied so that an electric field is formed between the transfer member and the latent image carrying member or the intermediate transfer body, and the toner image is transferred onto the two-dimensional recording medium within the electric field.

In such an image forming apparatus, a normal printing is generally performed, in which the toner image is transferred while leaving a margin at the outer periphery of the two-dimensional recording medium. However, an apparatus has been developed which is capable of performing the so-called borderless printing for transferring the toner image onto the entire surface of the two-dimensional recording medium. In the borderless printing, the toner image is formed in a range larger than the size of the two-dimensional recording medium, and the toner image which is full on the entire surface of the two-dimensional recording medium and extends outward from the periphery thereof is transferred. Accordingly, when the borderless printing is performed, in the transfer area, the toner extending outward from the two-dimensional recording medium is transferred onto the peripheral surface of the transfer member.

In addition, a so-called fogging toner slightly adheres to an area outside the area where the toner image is formed, on the latent image carrying member. Then, in the apparatus in which the toner image is transferred directly onto the two-dimensional recording medium from the latent image carrying member, the fogging toner is transferred onto the peripheral surface of the transfer member from the area which does not face the two-dimensional recording medium at the transfer position. In addition, in the apparatus in which the toner image is primarily transferred from the latent image carrying member onto the intermediate transfer body and secondarily transferred from the intermediate transfer body onto the two-dimensional recording medium, the fogging toner is transferred onto the intermediate transfer body at the primary transfer position, and is transferred onto the peripheral surface of the transfer member from the area which does not face the two-dimensional recording medium at the secondary transfer position.

As described above, when the transfer member circularly moves while the toner adheres to the peripheral surface of the transfer member, the toner adheres to the back surface of the two-dimensional recording medium delivered to the transfer area, and as a result, the back surface of the two-dimensional recording medium is contaminated. Accordingly, for example, JP-A-2008-89657 proposes an image forming apparatus in which a cleaning device that cleans the peripheral surface of the transfer member is provided and the toner transferred onto the peripheral surface of the transfer member is removed.

In the transfer area where the latent image carrying member or the intermediate transfer body and the transfer member face each other, the amount of the toner transferred onto the peripheral surface of the transfer member largely fluctuates depending on whether the normal printing or the borderless printing is performed. In addition, it may be considered that the fluctuation occurs according to a temperature or humidity. With respect to the fluctuating amount of transferred toner, when the toner is not sufficiently removed from the peripheral surface of the transfer member, a contamination occurs on the back surface of the two-dimensional recording medium.

The image forming process module 3810 prevents the contamination from occurring on the back surface of the two-dimensional recording medium onto which the toner image is transferred. To this end, a case where the fixing device for borderless printing and the transfer device for borderless printing are set will be described.

The two-dimensional printer 135 is an image forming apparatus that forms a color image using, for example, toner of four colors. The two-dimensional printer 135 includes electrophotographic type image forming units 10Y, 10M, 10C, and 10K that output images of the respective colors, yellow Y, magenta M, cyan C, and black K, and an intermediate transfer belt 20 that faces the image forming units 10Y, 10M, 10C, and 10K. The intermediate transfer belt 20 functions as an image carrier. The intermediate transfer belt 20 is wrapped to face each image forming unit 10 such that the peripheral surface of the intermediate transfer belt 20 is circularly driven. A secondary transfer member 24 that performs the secondary transfer is disposed downstream of the position where the image forming units 10 faces the intermediate transfer belt 20 in the circular movement direction of the intermediate transfer belt 20, so as to face the intermediate transfer belt 20. The secondary transfer member 24 functions as a transfer member. A sheet shaped two-dimensional recording medium P is delivered to a secondary transfer position 30 where the secondary transfer member 24 faces the intermediate transfer belt 20, from a sheet accommodation unit 8 via a transport path 9, and the toner image on the intermediate transfer belt 20 is transferred onto the two-dimensional recording medium. A transport device 25 and a fixing device 7 are provided downstream of the secondary transfer position 30 in the transport path of the two-dimensional recording medium. The transport device 25 transports the two-dimensional recording medium onto which the toner image is transferred. The fixing device 7 heats and pressurizes the toner image to fix the toner image to the two-dimensional recording medium. A discharged paper holding unit (not illustrated) is provided on the further downstream side. The discharged paper holding unit holds the two-dimensional recording media each with the toner image fixed thereon in a state of being piled up.

Meanwhile, a cleaning device 29 for the intermediate transfer belt is provided downstream of the secondary transfer position 30 in the circular movement direction of the intermediate transfer belt 20. The cleaning device 29 collects the toner remaining on the intermediate transfer belt 20 after the secondary transfer. In addition, at the position facing the endless peripheral surface of the secondary transfer member 24, first and second cleaning members 31 and 32 for the secondary transfer member are disposed to collect the toner transferred from the intermediate transfer belt 20 onto the secondary transfer member 24 at the secondary transfer position 30.

In addition, the two-dimensional printer 135 has plural printing modes including a normal printing mode M1 for forming a toner image while leaving a margin at the outer periphery of the two-dimensional recording medium, and a borderless printing mode M2 for forming a toner image on the entire surface of the two-dimensional recording medium. These printing modes are switched by the control module 12 based on data input from an external device or data input by the operator through, for example, an operation panel.

With respect to the image forming units 10, the image forming unit 10Y that forms a yellow toner image, the image forming unit 10M that forms a magenta toner image, the image forming unit 10C that forms a cyan toner image, and the image forming unit 10K that forms a black toner image are arranged in this order from the upstream side in the circular movement direction of the intermediate transfer belt 20. Each image forming unit 10 includes a photoconductor drum 1 having a surface on which an electrostatic latent image is to be formed, and is provided, around the photoconductor drum 1, with a charging device 2 that charges the surface of the photoconductor drum 1, a developing device 4 that causes the toner to be selectively transferred onto the latent image formed on the photoconductor drum so as to form a toner image, a primary transfer roller 5 that primarily transfers the toner image on the photoconductor drum 1 onto the intermediate transfer belt 20, and a cleaning device 6 that removes the toner remaining on the photoconductor drum after the transfer. In addition, an exposure device 3 is provided for each photoconductor drum 1 to generate image light based on an image signal, so that the image light is irradiated to the photoconductor drum 1 from the upstream side of the position where the developing device 4 faces the photoconductor drum 1 so as to record an electrostatic latent image.

The photoconductor drum 1 is formed by laminating an organic photoconductive layer on the peripheral surface of a metal cylindrical member, and the metal portion is electrically grounded. In addition, a bias voltage may be applied thereto.

The charging device 2 includes an electrode wire that is wrapped with a gap from the peripheral surface of the photoconductor drum 1 which is an object to be charged. The charging device 2 charges the surface of the photoconductor drum 1 by applying a voltage between the electrode wire and the photoconductor drum 1 so as to generate a corona discharge.

In the present exemplary embodiment, the device that performs the charging by the corona discharge is used, as described above. Meanwhile, a solid discharger or, for example, a roller or blade shaped contact or non-contact charging device may be used.

The exposure device 3 generates a blinking laser beam based on an image signal, and scans the laser beam in the main scanning direction (axial direction) of the rotating photoconductor drum 1 by a polygon mirror. As a result, an electrostatic latent image corresponding to the image of each color is formed on the surface of each photoconductor drum 1.

The developing device 4 uses a two-component developer containing toner and a magnetic carrier. The developing device 4 includes a developing roller 4a at the position facing the photoconductor drum 1, so that the layer of the two-component developer is formed on the peripheral surface of the rotating developing roller 4a. The toner is transferred from the peripheral surface of the developing roller 4a onto the photoconductor drum 1 so that the electrostatic latent image is visualized. In addition, the toner consumed due to the image formation is replenished according to the consumption amount.

In the present exemplary embodiment, the photoconductor drum 1 is charged to a negative polarity by the charging device 2, and toner charged to a negative polarity is transferred onto a portion where the charged potential is attenuated by the exposure.

The primary transfer roller 5 is disposed for each of the image forming units 10Y, 10M, 10C, and 10K at the position facing each of the photoconductor drums 1Y, 1M, 1C, and 1K on the back surface side of the intermediate transfer belt 20. Then, a primary transfer bias voltage is applied between the primary transfer rollers 5Y, 5M, 5C, and 5K and the photoconductor drums 1Y, 1M, 1C, and 1K, and the toner image on each photoconductor drum is electrostatically transferred onto the intermediate transfer belt 20 at the primary transfer position where each primary transfer roller and each photoconductor drum face each other.

The cleaning device 6 for the photoconductor drum removes the toner remaining on the photoconductor drum 1 after the transfer, by a cleaning blade disposed in contact with the peripheral surface of the photoconductor drum 1.

The intermediate transfer belt 20 is formed by making a film shaped member obtained by laminating plural layers into an endless form. The intermediate transfer belt 20 functions as an image carrier. The intermediate transfer belt 20 is wrapped about a driving roller 21 that is rotatably driven, an adjusting roller 22 that adjusts the bias of the intermediate transfer belt 20 in the width direction thereof, and a facing roller 23 that is supported at the position facing the secondary transfer member 24, so as to circularly move in the direction of the arrow A illustrated in FIG. 39.

The secondary transfer member 24 is disposed at the position facing the facing roller 23 across the intermediate transfer belt 20. The secondary transfer member 24 includes a secondary transfer roller 26, an assisting roller 27, and a secondary transfer belt 28 wrapped about the two rollers. The secondary transfer belt 28 is sandwiched between the facing roller 23 and the secondary transfer roller 26 in a state of overlapping with the intermediate transfer belt 20, so as to circularly move accompanied by the circular driving of the intermediate transfer belt 20. In addition, when the two-dimensional recording medium is delivered between the intermediate transfer belt 20 and the secondary transfer belt 28, the two-dimensional recording medium is transported through therebetween.

The secondary transfer roller 26 is obtained by forming an outer peripheral layer 26b made of a rubber to which conductive particles are added, on the outer peripheral surface of a metal core member 26a. In addition, the facing roller 23 is obtained by forming an outer peripheral layer 23b on the outer peripheral surface of a metal core member 23a, and the outer peripheral layer 23b may be formed of a single layer or plural layers.

As illustrated in FIG. 40, a secondary transfer bias voltage is applied between the secondary transfer roller 26 and the facing roller 23 from a power supply 11 for transfer bias, so that a transfer electric field is formed at the secondary transfer position 30.

The fixing device 7 heats and pressurizes the two-dimensional recording medium onto which the toner image is transferred at the secondary transfer position 30, so as to fix the toner image to the two-dimensional recording medium. The fixing device 7 includes a heating roller 7a equipped with a heating source therein and a pressure roller 7b in pressure-contact with the heating roller 7a. The two-dimensional recording medium onto which the toner image is transferred is transported to the contact portion, and is heated and pressurized between the heating roller 7a and the pressure roller 7b which are rotatably driven, so that the toner image is fixed to the two-dimensional recording medium. In order to collect the toner transferred onto the heating roller 7a and the pressure roller 7b, a cleaning member 41a is provided on the heating roller 7a, and a cleaning member 41b is provided on the pressure roller 7b. In addition, the cleaning members 41a and 41b perform the cleaning in the transfer device. In addition, the cleaning members 41a and 41b may be rollers or blades.

The cleaning device 29 for the intermediate transfer belt removes the residual toner after the transfer onto the two-dimensional recording medium at the secondary transfer position 30, from the peripheral surface of the intermediate transfer belt 20. The cleaning device 29 for the intermediate transfer belt includes a cleaning blade in contact with the peripheral surface of the intermediate transfer belt 20. The toner adhering onto the peripheral surface of the intermediate transfer belt 20 is scraped off and removed by the cleaning blade.

The first and second cleaning members 31 and 32 are arranged in contact with the peripheral surface of the secondary transfer belt 28. Each of the cleaning members 31 and 32 is formed by providing brush bristles radially around a rotary shaft made of a metal. The brush bristles are formed of a resin material mixed with particles for imparting the conductivity. Then, a voltage is applied to the brush bristles from the rotary shaft so that an electric field is formed between the brush bristles and the secondary transfer roller 26. That is, a cleaning bias voltage is applied between the first cleaning member 31 that is in contact with the secondary transfer belt 28 on the upstream side in the circular movement direction of the secondary transfer belt 28 and the electrically grounded secondary transfer roller 26, from a first cleaning bias power supply 33, so that the potential of a positive polarity side is imparted to the first cleaning member 31. In addition, a cleaning bias voltage is applied between the second cleaning member 32 that is in contact with the secondary transfer belt 28 on the downstream side and the secondary transfer roller 26 from a second cleaning bias power supply 35, such that the potential of the second cleaning member 32 becomes a negative polarity side. Accordingly, the first cleaning member 31 to which the bias voltage is applied such that the first cleaning member 31 becomes the positive polarity side usually removes the toner charged to the negative polarity from the peripheral surface of the secondary transfer belt 28, and the second cleaning member 32 to which the voltage of the negative polarity is applied usually removes the toner charged to the positive polarity.

In addition, in FIG. 40, the reference numerals 36 and 37 represent dropping members that are disposed in contact with the brush bristles of the first and second cleaning members 31 and 32 so as to drop the toner adsorbed from the peripheral surface of the secondary transfer belt 28.

The first cleaning member 31 functions as a cleaning member, and the first cleaning bias power supply 33 that applies the cleaning bias voltage to the first cleaning member 31 functions as a cleaning bias applying unit. The voltage applied from the first cleaning bias power supply 33 to the first cleaning member is controlled by the control module 12.

In addition to a mode switching module 13 that performs a switching to a printing mode selected from the plural printing modes of the two-dimensional printer 135, the control module 12 further includes a cleaning bias control module 14 that controls the cleaning bias voltage applied to the first cleaning member 31. Further, the control module 12 has a function of controlling the operation of the two-dimensional printer 135 to form an image on the two-dimensional recording medium.

The mode switching module 13 functions as a printing mode switching unit, and is configured to select one of the plural printing modes such as the normal printing mode M1 and the borderless printing mode M2 based on information input from an external device or information input by the operator using, for example, an operation panel, and switch a control such that the image according to each mode is formed.

The cleaning bias control module 14 functions as a bias voltage controller, and controls a voltage value applied from the first cleaning bias power supply 33 to the first cleaning member 31 based on the printing mode switched in the mode switching module 13. That is, a voltage adjusting unit 34 of the first cleaning bias power supply 33 is operated such that when the printing mode is switched to the normal printing mode M1, a first bias voltage value V1 is applied, and when the printing mode is switched to the borderless printing mode M2, a second bias voltage value V2 is applied.

The first and second bias voltage values V1 and V2 are preset and stored in the storage module 15, and the second bias voltage value V2 applied when the borderless printing mode M2 is executed is set such that the potential difference between the secondary transfer roller 26 and the first cleaning member 31 becomes large, as compared with the first bias voltage value V1 applied when the normal printing mode M1 is executed.

In the present exemplary embodiment, the first and second bias voltage values V1 and V2 are preset to constant values. However, the bias voltage values may be controlled based on, for example, an environmental condition such as a temperature or humidity and other conditions, in addition to the printing mode to be executed. However, when, for example, the environmental condition is the same, the second bias voltage value V2 at the time of the borderless printing mode M2 is controlled such that the potential difference becomes large, as compared with the first bias voltage value V1 at the time of the normal printing mode M1.

The two-dimensional printer 135 operates as follows.

The electrostatic latent image is formed on each of the four photoconductor drums 1, and the toner is transferred from the developing device 4 so that the toner image is formed. Each toner image is transferred onto the intermediate transfer belt 20 at the position facing the primary transfer roller 5, and superimposed on each other on the intermediate transfer belt 20 so that the color toner image is formed. The toner image is transported to the secondary transfer position 30 by the circular movement of the intermediate transfer belt 20, and transferred onto the two-dimensional recording medium P from the intermediate transfer belt 20.

In a case where the image forming operation is performed in the normal printing mode M1, the toner image is formed in an area smaller than the size of the two-dimensional recording medium, and transferred at the secondary transfer position 30 while leaving a margin at the outer peripheral portion of the two-dimensional recording medium. In many cases, the so-called fogging toner slightly adheres to a portion outside the range where the toner image is held on the intermediate transfer belt 20, for example, a non-image area between the area where the image is held and an area where the next image is held. The toner adhering to an area that does not face the two-dimensional recording medium at the secondary transfer position 30 is transferred onto the secondary transfer belt 28 at the secondary transfer position 30. The secondary transfer belt 28 circularly moves and passes through the position facing the first cleaning member 31 to which the first bias voltage value V1 is applied and the position facing the second cleaning member 32, so that a part of the toner is removed by the cleaning members 31 and 32. In addition, another part of the toner is not removed by the cleaning members 31 and 32 and remains on the secondary transfer belt 28. However, since the amount of the toner adhering to the non-image area is small, a contamination does not immediately occur on the back surface of the two-dimensional recording medium.

Meanwhile, in a case where the image formation is performed in the borderless printing mode M2, the toner image is formed in a range larger than the size of the two-dimensional recording medium. Accordingly, when the toner image is transferred onto the two-dimensional recording medium at the secondary transfer position 30, the toner extends outward from the outer peripheral edge of the two-dimensional recording medium, and the extending toner is transferred onto the secondary transfer belt 28. At this time, the amount of the toner adhering to the secondary transfer belt 28 is remarkably larger than that of the fogging toner at the time of the normal printing mode. Further, the fogging toner adheres to the secondary transfer belt 28 from the non-image area, as in the case where the normal printing mode M1 is executed. Then, the secondary transfer belt 28 circularly moves and passes through the positions facing the first and second cleaning members 31 and 32, so that a part of the toner is removed by the cleaning members 31 and 32. At this time, the second bias voltage value V2 is applied to the first cleaning member 31 that makes the potential difference from the secondary transfer roller 26 larger than that when the first bias voltage value V1 is applied, and the cleaning member 31 becomes the positive polarity side. Accordingly, the large amount of negatively charged toner adhering to the secondary transfer belt 28 is mostly removed by the first cleaning member 31. The cleaning members 31 and 32 perform the cleaning in the fixing device. In addition, the cleaning members 31 and 32 may be brushes, rollers, or blades.

In a case where the borderless printing mode M2 is executed, if the toner which extends outward from the outer peripheral edge of the two-dimensional recording medium passing through the secondary transfer position 30 and adheres to the secondary transfer belt 28 is not removed by the cleaning operation performed once, the toner may adhere to the back surface of the two-dimensional recording medium and cause the toner contamination.

Figure 41A:
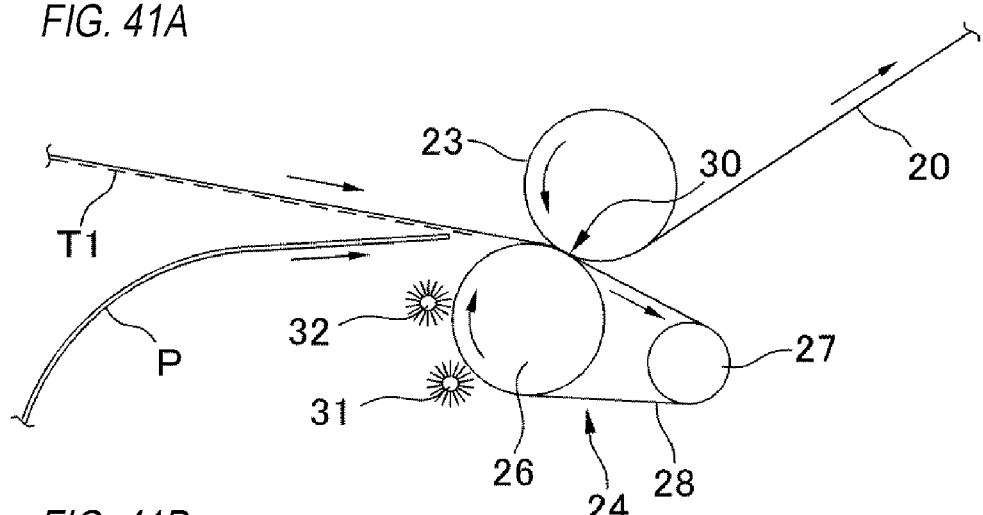
FIGS. 41A to 41C are views for explaining a state where a contamination occurs on the back surface of a recording medium due to a toner image formed to extend outward from the recording medium in a borderless printing.
Figure 41B:
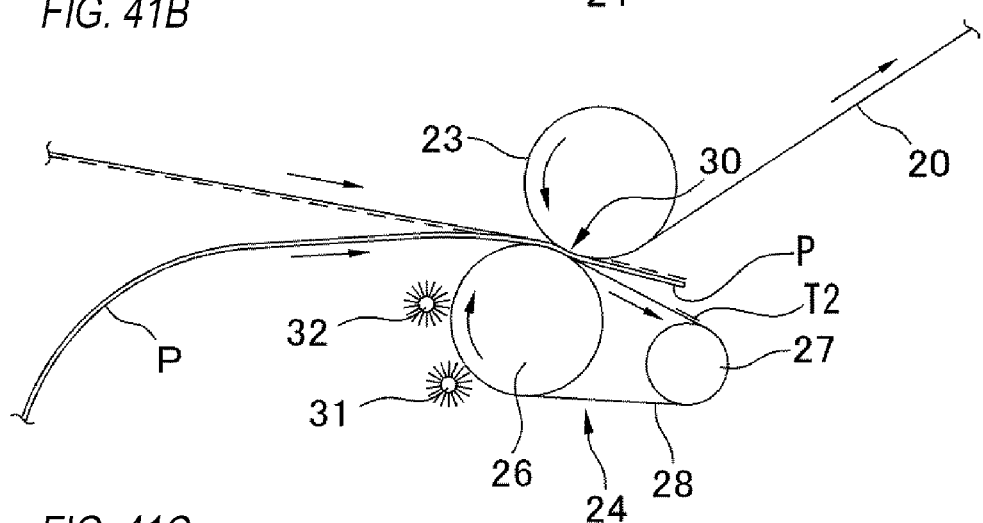
Figure 41C:
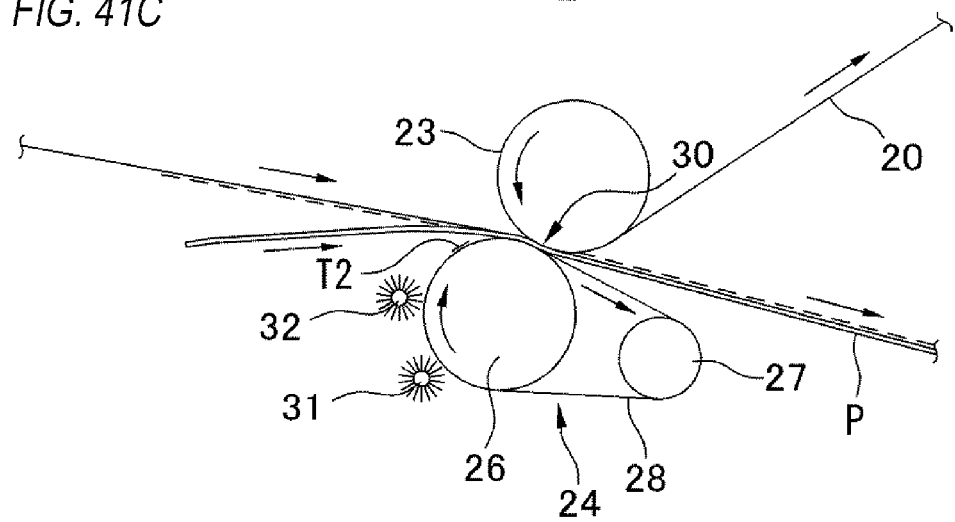

FIGS. 41A to 41C are views for explaining a state where a contamination occurs on the back surface of the two-dimensional recording medium due to the toner image formed extending outward from the two-dimensional recording medium in the borderless printing.

As illustrated in FIG. 41A, when the borderless printing mode M2 is executed, a toner image T1 held on the intermediate transfer belt 20 is larger than the size of the two-dimensional recording medium P, and thus, extends forward from the leading end edge of the two-dimensional recording medium P, at the secondary transfer position 30 where the toner image is transferred onto the interposed two-dimensional recording medium P. When this portion passes through the secondary transfer position 30, the portion is transferred onto the secondary transfer belt 28 as illustrated in FIG. 41B. Then, the portion passes through the positions facing the first and second cleaning members 31 and 32, along with the circular driving of the secondary transfer belt 28. When the toner is not fully removed by the cleaning members 31 and 32 and remains on the secondary transfer belt 28, the remaining toner T2 reaches the secondary transfer position 30 again. When the circumferential length of the secondary transfer belt 28 is formed shorter than the length of the two-dimensional recording medium P in the transport direction, the rear portion of the two-dimensional recording medium P in the transport direction still stays at the secondary transfer position 30 at the time when the remaining toner T2 reaches the secondary transfer position 30. As a result, the remaining toner T2 adheres to the back surface of the two-dimensional recording medium P, as illustrated in FIG. 41C.

Thus, in the case of the borderless printing mode M2, the toner T2 that extends outward from the head end of the two-dimensional recording medium P and adheres to the secondary transfer belt 28 needs to be removed by passing through the positions facing the first and second cleaning members 31 and 32 only once, to the extent that the toner contamination on the back surface of the two-dimensional recording medium P is acceptable.

Figure 42:
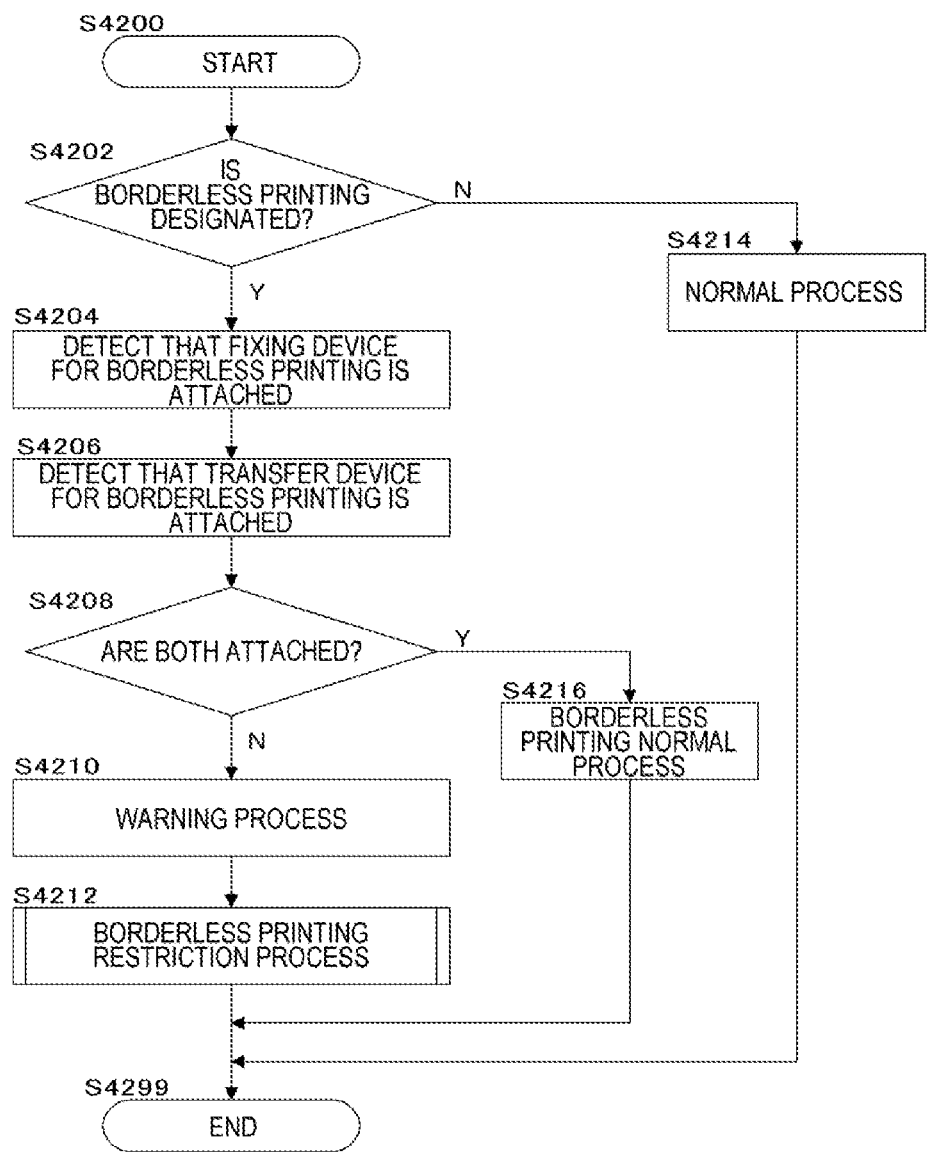
FIG. 42 is a flowchart illustrating an example of a process according to the exemplary embodiment.

FIG. 42 is a flowchart illustrating an example of a process according to the present exemplary embodiment (especially, the borderless control module 3820).

In step S4202, the borderless printing control module 3825 determines whether the borderless printing is designated. When it is determined that the borderless printing is designated, the process proceeds to step S4204. Otherwise, the process proceeds to step S4214.

In step S4204, the borderless printing fixing device detection module 3830 detects that the fixing device for borderless printing is attached.

In step S4206, the borderless printing transfer device detection module 3835 detects that the transfer device for borderless printing is attached.

In step S4208, the warning module 3840 determines whether both of the fixing device for borderless printing and the transfer device for borderless printing are attached. When it is determined that both are attached, the process proceeds to step S4216. Otherwise, the process proceeds to step S4210.

In step S4210, the warning module 3840 performs the warning process.

In step S4212, the borderless printing restriction process is performed. The detailed process of step S4212 will be described later using the flowchart illustrated in an example of FIG. 44.

In step S4214, the image forming process module 3810 performs the normal process. For example, the bordered printing process is performed.

In step S4216, the image forming process module 3810 performs the borderless printing normal process described above.

Figure 43A:
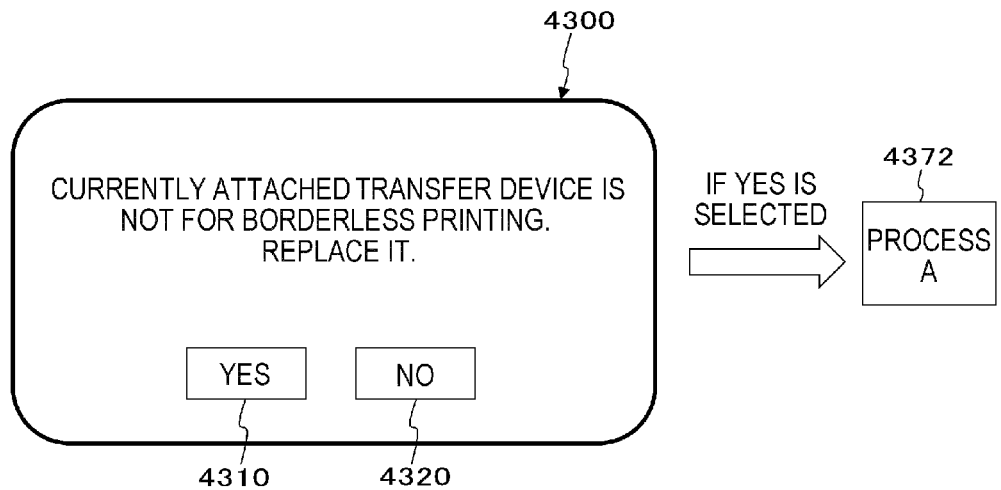
FIGS. 43A and 43B are explanatory views illustrating an example of a process according to the exemplary embodiment.
Figure 43B:
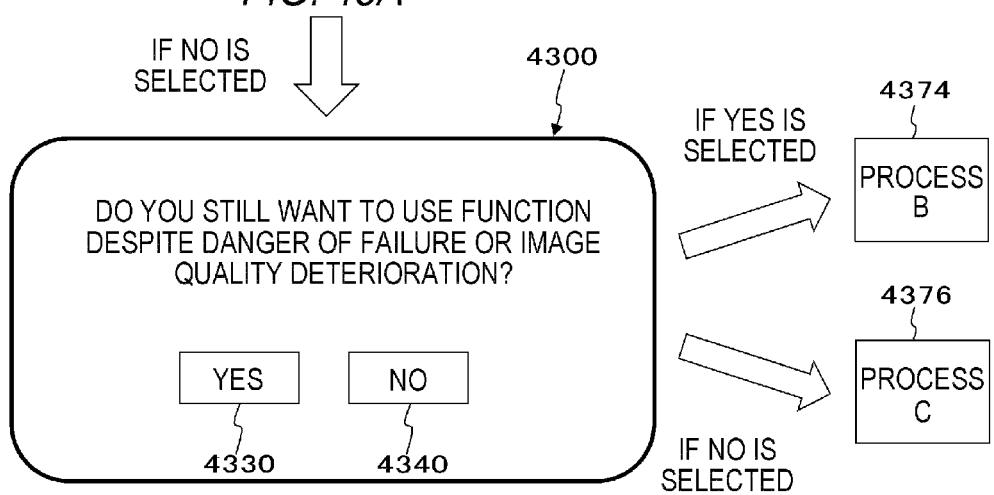

FIGS. 43A and 43B are explanatory views illustrating an example of a process according to the present exemplary embodiment. Especially, FIGS. 43A and 43B illustrate an example of the process of step S4210 in the flowchart illustrated in the example of FIG. 42.

In the example illustrated in FIG. 43A, a screen 4300 displays "The currently attached transfer device is not for the borderless printing. Replace it," and displays a YES button 4310 and a NO button 4320 in a selectable manner. Then, when the user 290 selects the YES button 4310, a process A 4372 is performed. When the NO button 4320 is selected, the display illustrated in the example of FIG. 43B is performed.

As the process A 4372, the following process is performed: "If there is no problem after the replacement, no error is displayed. Alternatively, a message indicating that the borderless printing function becomes usable is displayed, and the borderless printing function is brought into a usable state." According to the flowchart illustrated in the example of FIG. 42, the determination that the answer in step S4208 is "Y" is made, and then, the process of step S4216 is performed.

In the example of FIG. 43B, the screen 4300 displays "Do you still want to use the function despite a danger of a failure or an image quality deterioration?," and displays a YES button 4330 and a NO button 4340 in a selectable manner. Then, when the user 290 selects the YES button 4330, a process B 4374 is performed. When the NO button 4340 is selected, a process C 4376 is performed.

As the process B 4374, the following process is performed: "The borderless printing function is restrictively released. As the 'restrictively' release, for example, the borderless printing may be permitted only for the current job or the user 290. When the printing process for the current job or by the operation of the user 290 is completed, the borderless printing function is brought into the unusable state." According to the flowchart illustrated in the example of FIG. 42, the process of step S4212 is performed.

As the process C 4376, the following process is performed: "Return to the home screen. Alternatively, the warning screen is displayed again."

In addition, when one of the fixing device for borderless printing and the transfer device for borderless printing is set (the other is not set), the borderless printing may be restrictively released (the borderless printing is permitted). When both are not set, the borderless printing may be prohibited.

Figure 44:
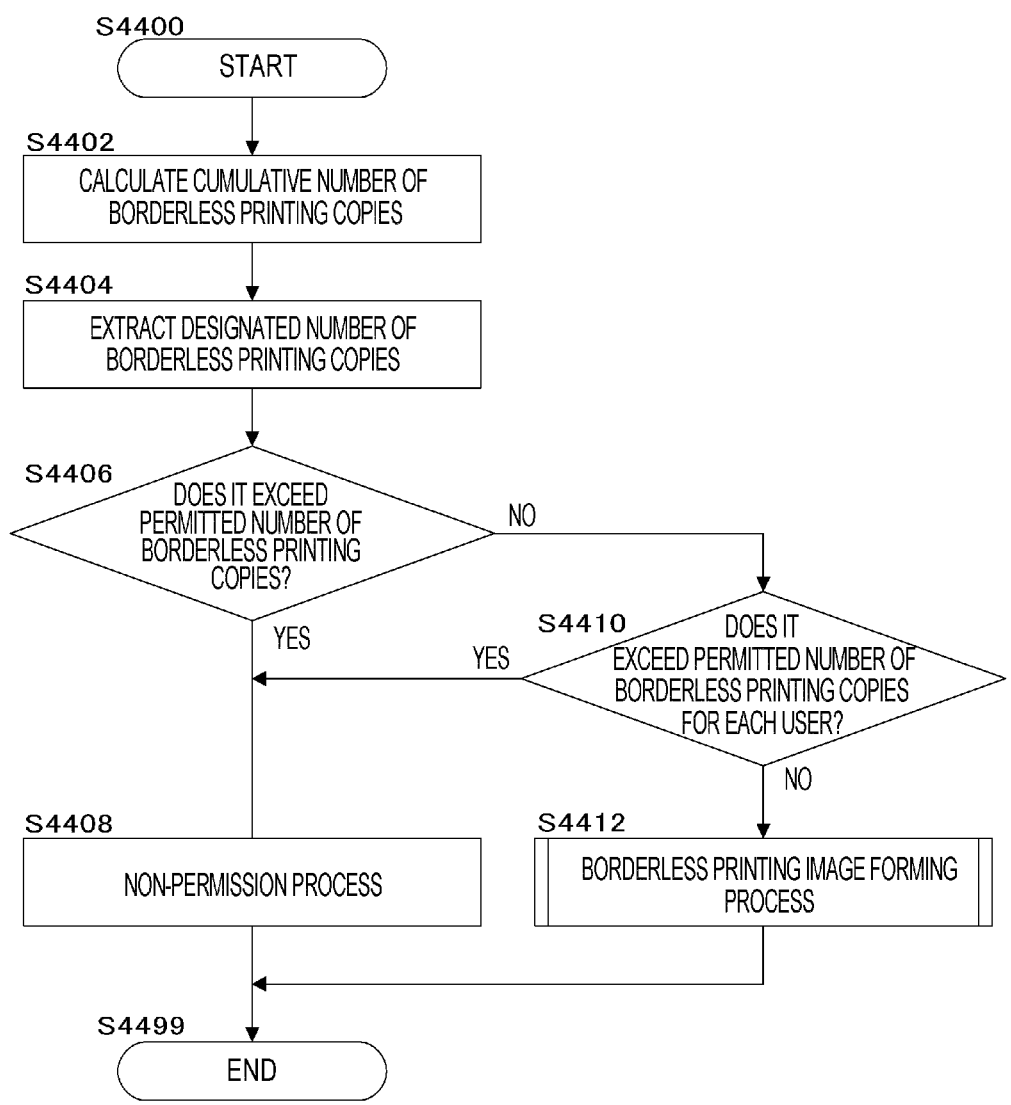
FIG. 44 is a flowchart illustrating an example of a process according to the exemplary embodiment.

FIG. 44 is a flowchart illustrating an example of a process by the present exemplary embodiment.

In step S4402, the cumulative number of copies in the borderless printing is calculated. As described above, for example, the cumulative number of copies may be calculated for each user or each paper size. For example, the calculation may be performed using a borderless printing log table 4500. FIG. 45 is an explanatory view illustrating an example of a data structure of the borderless printing log table 4500. The borderless printing log table 4500 has a date/time field 4510, a number of borderless printing copies field 4520, a paper size field 4530, a black-and-white/color field 4540, and a user field 4550. The borderless printing log table 4500 stores the history (log) of the borderless printing in a state where the fixing device for borderless printing or the transfer device for borderless printing is not set. The number of borderless printing copies field 4520 has an upper side field 4522, a right side field 4524, a lower side field 4526, and a left side field 4528. The date/time field 4510 stores date and time at which the borderless printing is performed. The number of borderless printing copies field 4520 stores the number of borderless printing copies. The upper side field 4522 stores the number of borderless printing copies of the upper side. The right side field 4524 stores the number of borderless printing copies of the right side. The lower side field 4526 stores the number of borderless printing copies of the lower side. The left side field 4528 stores the number of borderless printing copies of the left side. In addition, instead of storing the number of borderless printing copies for each side, the number of borderless printing copies for the entire paper may be stored (the number of borderless printing copies is counted whenever the borderless printing is performed for even any one side). The paper size field 4530 stores the paper size in the borderless printing. The black-and-white/color field 4540 stores information indicating whether the borderless printing is a black-and-white printing or color printing. The user field 4550 stores the user (user ID) who performs the borderless printing.

In step S4404, the designated number of borderless printing copies is extracted. In this process, the number of copies may be counted for each side.

In step S4406, it is determined whether the permitted number of borderless printing copies is exceeded. When it is determined that the permitted number of borderless printing copies is exceeded, the process proceeds to step S4408. Otherwise, the process proceeds to step S4410. In the two-dimensional printer 135, the preset number of copies (the number of copies that can be printed borderless in a state where the fixing device for borderless printing or the transfer device for borderless printing is not set) is set as a threshold value. This determination process may be performed for each side.

In step S4408, a non-permission process is performed. For example, a display is performed to indicate that the borderless printing cannot be performed.

Figure 46:
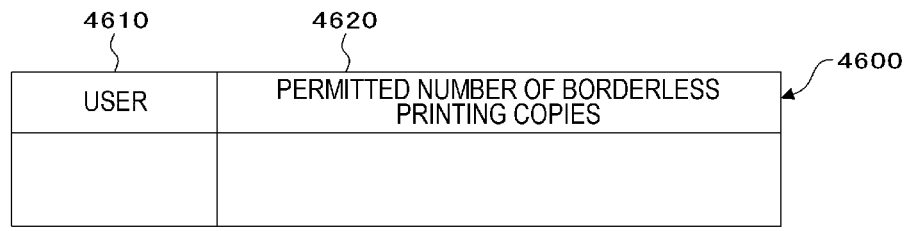
FIG. 46 is an explanatory view illustrating an example of the data structure of a per-user permitted number of copies table.

In step S4410, it is determined whether the permitted number of borderless printing copies for each user is exceeded. When it is determined that the permitted number of borderless printing copies for each user is exceeded, the process proceeds to step S4408. Otherwise, the process proceeds to step S4412. For example, the permitted number of copies may be determined using a per-user permitted number of copies table 4600. FIG. 46 is an explanatory view illustrating an example of a data structure of the per-user permitted number of copies table 4600. The per-user permitted number of copies table 4600 has a user field 4610 and a permitted number of borderless printing copies field 4620. The user field 4610 stores the user 290. The permitted number of borderless printing copies field 4620 stores the permitted number of borderless printing copies for the user 290. In this example, the permitted number of copies is set per user. Alternatively, the permitted number of copies may be set according to, for example, each paper size.

When the borderless printing may be designated for each side, the permitted number of borderless printing copies field 4620 may be the number of sides that can be printed borderless. In addition, the number of sides that can be printed borderless may be set for each of the upper side, right side, lower side, and left side. Then, the determination process of step S4410 may be performed for each side.

In step S4412, a borderless printing image forming process is performed. The detailed process of step S4412 will be described later using the flowchart illustrated in an example of FIG. 47.

Figure 47:
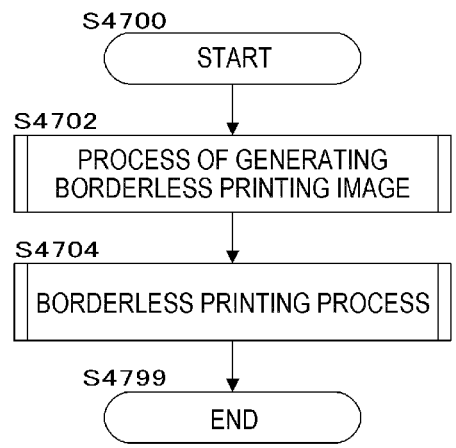
FIG. 47 is a flowchart illustrating an example of a process according to the exemplary embodiment.

FIG. 47 is a flowchart illustrating an example of a process by the present exemplary embodiment.

In step S4702, a process of generating a borderless printing image is performed. The detailed process of step S4702 will be described later using the flowchart illustrated in an example of FIG. 48.

In step S4704, a borderless printing process is performed. The detailed process of step S4704 will be described later using the flowchart illustrated in an example of FIG. 49.

Figure 48:
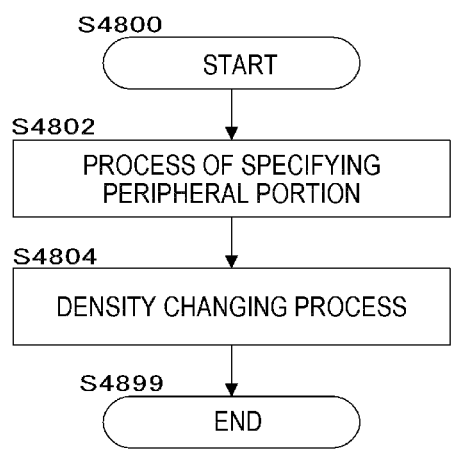
FIG. 48 is a flowchart illustrating an example of a process according to the exemplary embodiment.

FIG. 48 is a flowchart illustrating an example of a process by the present exemplary embodiment.

In step S4802, a process of specifying a peripheral portion is performed. For example, a predetermined area (a portion having a predetermined width from an edge) is specified.

In step S4804, a density changing process is performed. For example, rather than uniformly lowering the density of the peripheral portion, the lowering amount of density may be increased toward the edge.

Figure 49:
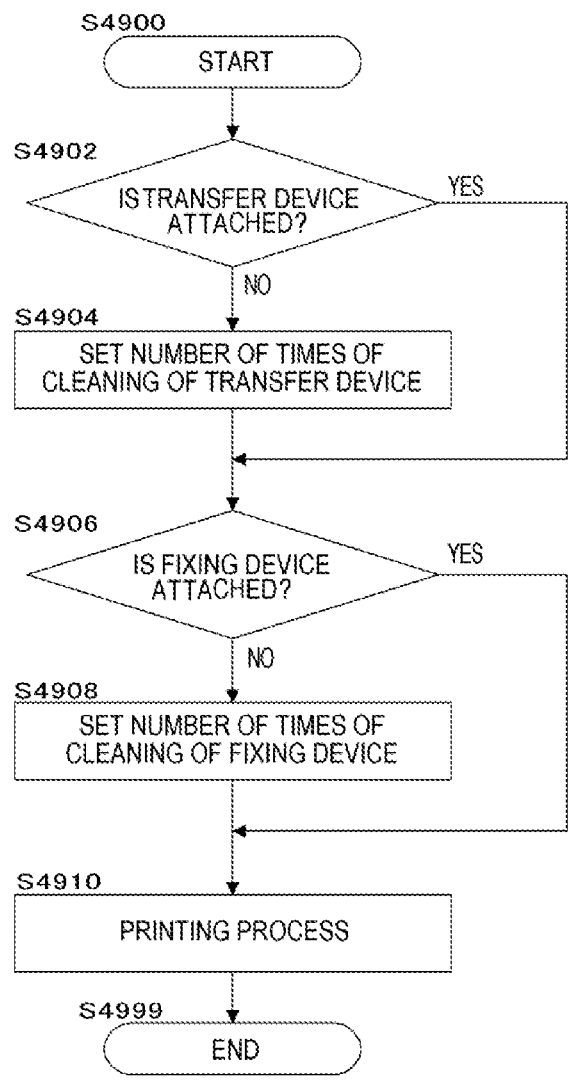
FIG. 49 is a flowchart illustrating an example of a process according to the exemplary embodiment.

FIG. 49 is a flowchart illustrating an example of a process by the present exemplary embodiment.

In step S4902, it is determined whether the transfer device is not attached. When it is determined that the transfer device is not attached, the process proceeds to step S4904. Otherwise, the process proceeds to step S4906.

In step S4904, the number of times of the cleaning of the transfer device is set.

In step S4906, it is determined whether the fixing device is not attached. When it is determined that the fixing device is not attached, the process proceeds to step S4908. Otherwise, the process proceeds to S4910.

In step S4908, the number of times of the cleaning of the fixing device is set.

In step S4910, the borderless printing process is performed.

Figure 50:
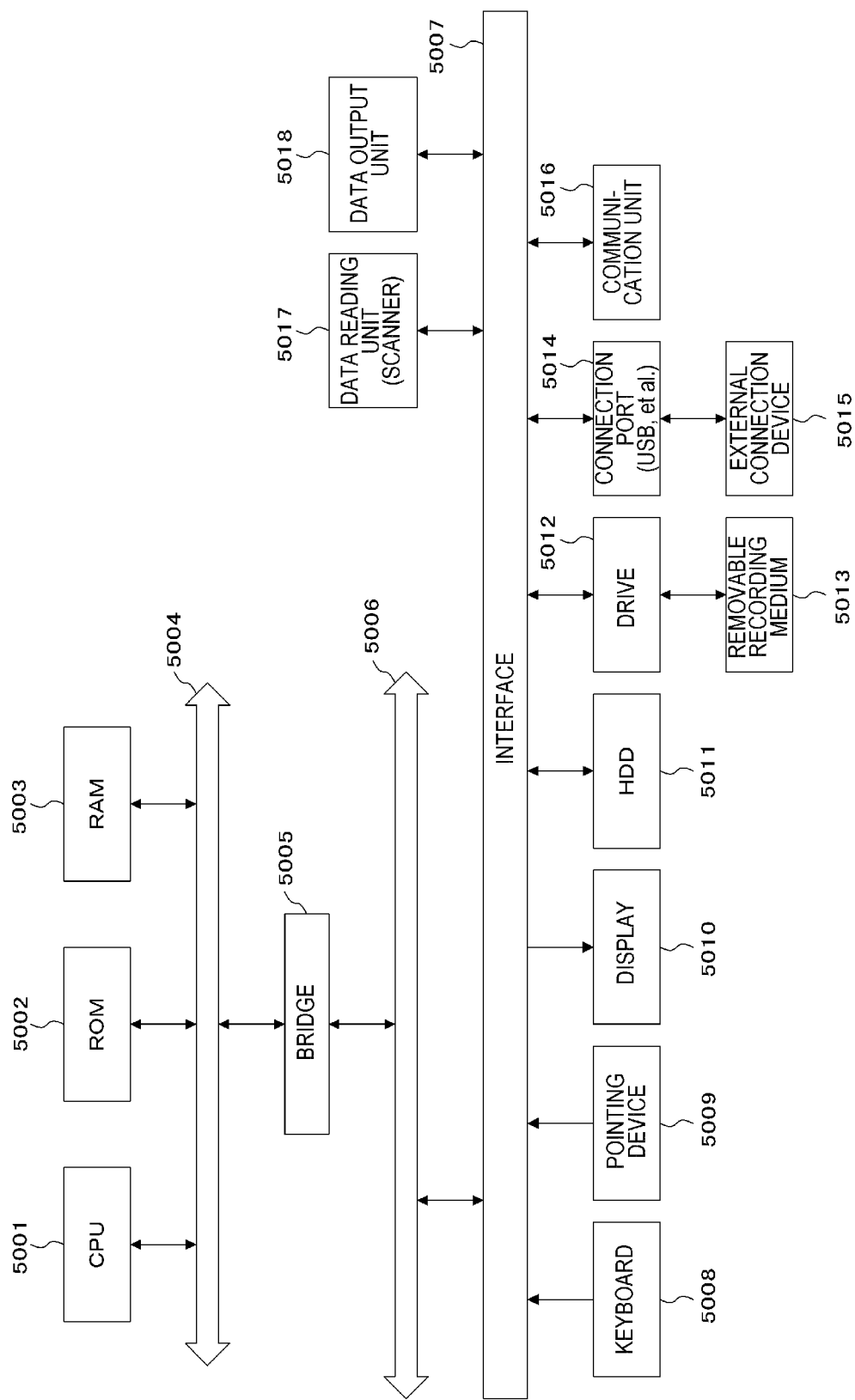
FIG. 50 is a block diagram illustrating an example of the hardware configuration of a computer for implementing the exemplary embodiment.

With reference to FIG. 50, an example of a hardware configuration of the present exemplary embodiment (e.g., the information processing apparatus 100, the two-dimensional printer 135, and the image formation instruction module 3100) will be described. The configuration illustrated in FIG. 50 is implemented by, for example, a personal computer (PC). FIG. 50 illustrates an example of a hardware configuration including a data reading unit 5017 such as a scanner and a data output unit 5018 such as a printer.

A CPU 5001 is a controller that performs processes according to a computer program describing an execution sequence of each of the various modules described in the above-described exemplary embodiment, that is, the movement detection module 105, the image presentation module 115, the output instruction reception module 120, the output control module 125, the output image outputting module 130, the image generation module 330, the presentation and detection module 310, the presentation module 315, the eyeball detection module 320, the printing data reception module 3105, the printing attribute setting module 3110, the outer edge inspection module 3115, the image generation process detection module 3120, the selection module 3125, the presentation module 3130, the printing instruction module 3135, the image forming process module 3810, the control module 12, the borderless printing control module 3825, the borderless printing fixing device detection module 3830, the borderless printing transfer device detection module 3835, the warning module 3840, the borderless image forming process module 3845, the printing restriction process module 3850, the borderless printing software confirmation module 3855, the borderless printing software introduction module 3860, and the communication module 3865.

A ROM 5002 stores, for example, programs or operation parameters used by the CPU 5001. A RAM 5003 stores, for example, programs used in the execution by the CPU 5001 or parameters appropriately varying in the execution. These components are connected to each other by a host bus 5004 configured with, for example, a CPU bus.

The host bus 5004 is connected to an external bus 5006 such as a peripheral component interconnect/interface (PCI) bus via a bridge 5005.

A keyboard 5008 and a pointing device 5009 such as a mouse are devices operated by an operator. A display 5010 is, for example, the image presentation module 115, a liquid crystal display device, or a cathode ray tube (CRT), and displays various types of information as texts or image information. In addition, for example, a touch screen having the functions of both the pointing device 5009 and the display 5010 may be used. In this case, the function of the keyboard may be implemented by drawing the keyboard using software (also called, for example, a so-called software keyboard, screen keyboard) on the screen (the touch screen), without the physical connection as in the keyboard 5008.

A hard disk drive (HDD) 5011 is equipped with a hard disk (which may be, for example, a flash memory) therein, drives the hard disk, and causes the hard disk to store or play programs or information executed by the CPU 5001. The hard disk implements, for example, the functions of the image storage module 110A and the user image storage module 110B. In addition, the hard disk stores, for example, other various data (e.g., output image data) and various computer programs.

A drive 5012 reads data or programs stored in a removable recording medium 5013 such as a mounted magnetic disk, an optical disc, a magneto-optical disc, or a semiconductor memory, and supplies the data or programs to an interface 5007, the external bus 5006, the bridge 5005, and the RAM 5003 connected via the host bus 5004. In addition, the removable recording medium 5013 may also be used as a data storage area.

A connection port 5014 is a port for a connection of an external connection device 5015, and has a connection portion for, for example, a USB or IEEE1394. The connection port 5014 is connected to, for example, the CPU 5001 via, for example, the interface 5007, the external bus 5006, the bridge 5005, or the host bus 5004. A communication unit 5016 is connected to a communication line and performs a process of a data communication with an external device. The data reading unit 5017 is, for example, a microphone. The data output unit 5018 is, for example, the two-dimensional printer 135, the three-dimensional printer 140, the electronic image file generation module 145, or a speaker.

In addition, the hardware configuration of, for example, the information processing apparatus 100 illustrated in FIG. 50 merely represents an example of a configuration. The present exemplary embodiment is not limited to the configuration illustrated in FIG. 50, and may be any configuration that can execute the modules described in the present exemplary embodiment. For example, some of the modules may be configured with dedicated hardware (e.g., application specific integrated circuit (ASIC)), and some of the modules may be in the form in which the modules are present in an external system and connected via a communication line. In addition, the plural systems illustrated in FIG. 50 may be connected to each other via a communication line and operated in cooperation with each other.

In addition, the programs described above may be provided in a state of being stored in a recording medium, or may be provided by a communication unit. In that case, for example, the programs described above may be construed as a "computer readable recording medium storing a program."

The "computer readable recording medium storing a program" refers to a computer readable recording medium storing a program, which is used for, for example, installation, execution, and distribution of a program.

In addition, examples of the recording medium include a digital versatile disc (DVD) such as "DVD-R, DVD-RW, or DVD-RAM" which is the standard formulated in the DVD forum, "DVD+R or DVD+RW" which is the standard formulated in DVD+RW, a compact disc (CD) such as a CD read only memory (CD-ROM), a CD recordable (CD-R), or a CD rewritable (CD-RW), a Blue ray disc (Blu-ray (registered trademark) disc), a magneto-optical (MO) disc, a flexible disc (FD), a magnetic tape, a hard disk, a ROM, an electrically erasable and rewritable read only memory (EEPROM (registered trademark)), a flash memory, a random access memory (RAM), and a secure digital (SD) memory card.

All or some of the programs described above may be stored in the recording medium above and thus may be, for example, saved or distributed. In addition, the programs may be transmitted using a transmission medium such as a wired network used in, for example, a local area network (LAN), a metropolitan area network (MAN), a wide area network (WAN), the Internet, the Intranet, and the Extranet, a wireless communication network, or a combination thereof, or may be carried on carrier waves.

In addition, the programs described above may be all or parts of other programs, or may be stored together with another program in the recording medium. In addition, the programs described above may be distributed and stored in plural recording media. In addition, the programs described above may be stored in a compressed or encrypted form as long as the programs may be restored.

In addition, the present exemplary embodiment may be combined with the following image forming apparatus. That is, the two-dimensional printer 135 may be the following image forming apparatus. (a) An image forming device including: an image carrier that carries a toner image; a transfer member disposed such that a circulatively-moving endless peripheral surface faces the image carrier, an electric field being formed between the image carrier and the transfer member, the electric field that transfers the toner image onto a recording medium passing between the image carrier and the transfer member; a cleaning member disposed to contact the peripheral surface of the transfer member, the cleaning member that removes a toner adhering to the surface of the transfer member; a cleaning bias applying unit that applies a cleaning bias voltage between the cleaning member and the transfer member; a printing mode switching unit that selects and switches one of plural printing modes including a borderless printing mode in which the toner image is transferred onto the entire surface of the recording medium and a normal printing mode in which the toner image is transferred while leaving a margin on an outer peripheral portion of the recording medium; and a bias voltage controller that controls such that the cleaning bias voltage applied by the cleaning bias applying unit is set to a first bias voltage in the normal printing mode and is set to a second bias voltage in the borderless printing mode, the second bias voltage making a potential difference between the cleaning member and the transfer member larger than that when the first bias voltage is applied, wherein when the formation of the image in the borderless printing mode is continuously executed, plural borderless images are formed until a predetermined condition is met, and then the second bias voltage applied between the cleaning member and the transfer member is switched to the first bias voltage so that the peripheral surface of the transfer member is circulatively driven in a state where the first bias voltage is applied.

(b) The image forming device according to (a), wherein when the formation of the image in the borderless printing mode is continuously executed, the second bias voltage is switched to the first bias voltage so that the peripheral surface of the transfer member is circulatively driven in the state where the first bias voltage is applied, and then the first bias voltage is switched to the second bias voltage so that the formation of the image in the borderless printing mode is resumed.

The following effects are obtained.

In the image forming device of item (a), as compared with a device not equipped with this configuration, even when the formation of the image in the borderless printing mode is continuously executed, it is possible to prevent the rear surface of the recording medium onto which the toner image is transferred from being contaminated by toner.

In the image forming device of item (b), as compared with a device not equipped with this configuration, even when the formation of the image in the borderless printing mode is continuously executed, it is possible to prevent the rear surface of the recording medium onto which the toner image is transferred from being contaminated by toner.

The exemplary embodiment described above may be construed as follows.

For example, the present disclosure has the following object.

A head mounted display or the like is used as one of the VR technologies, to interact with mainly the vision among the human sensory organs and artificially generate realistic environments.

There is a demand to print an image that is presented by the head mounted display or the like.

The present disclosure may provide an information processing apparatus and an information processing program that, when a device that changes a presented image along with a motion direction of a user receives an output instruction, may output an outputtable image.

[A1] An information processing apparatus including:
a controller that, when a device that changes an image presented in a field of view of a user along with a motion direction of the user receives an output instruction, performs a control to output an image including a first image of an area being presented to the field of view of the user at a time when the output instruction is received and a second image outside the area.

[A2] The information processing apparatus according to [A1], wherein the controller outputs the image including the first image and the second image to a module that generates an electronic image file of the image including the first image and the second image.

[A3] The information processing apparatus according to [A1], wherein the controller outputs the image including the first image and the second image to a module that generates a three-dimensional object from the image including the first image and the second image.

[A4] The information processing apparatus according to [A3], wherein when the area being presented to the user includes three-dimensional data, at least the three-dimensional data is output to an output destination.

[A5] The information processing apparatus according to [A1], wherein the controller outputs the image including the first image and the second image to a module that prints the image including the first image and the second image on a two-dimensional recording medium.

[A6] The information processing apparatus according to [A5], wherein when the output instruction is received, a form of the image to be output on the two-dimensional recording medium is caused to be a borderless form.

[A7] The information processing apparatus according to [A5], wherein when the output instruction is received, a form of the image to be output on the two-dimensional recording medium is determined according to whether an output destination is capable of performing borderless printing.

[A8] The information processing apparatus according to [A7], wherein when the output instruction is received and when the output destination is capable of performing the borderless printing, the form of the image to be output on the two-dimensional recording medium is caused to be a borderless form.

[A9] The information processing apparatus according to [A7], wherein when the output instruction is received and when the output destination is incapable of performing the borderless printing, the form of the image to be output on the two-dimensional recording medium is caused to be a bordered form.

[A10] The information processing apparatus according to [A1], wherein the second image is an image that is presentable, but is not included in the field of view of the user at the time when the output instruction is received.

[A11] The information processing apparatus according to [A10], wherein the second image is an image that is located at a position on any one or more of a left side, a right side, an upper side, and a lower side of the first image.

[A12] The information processing apparatus according to [A11], wherein when outputting the image including the first image and the second image, the controller performs the output so that the first image and the second image are distinguished from each other.

[A13] The information processing apparatus according to [A1], wherein the controller determines in which direction of the first image the second image is arranged.

[A14] The information processing apparatus according to [A1], wherein the controller determines a position of the first image and arranges the second image around the position.

[A15] The information processing apparatus according to [A1], wherein when an image non-display area exists at an edge of a display area of the image presented by the device and when the output instruction is received, a bordered image is preferentially output.

[A16] The information processing apparatus according to [A1], wherein when an image non-display area does not exist at an edge of a display area of the image presented by the device and when the output instruction is received, a borderless image is preferentially output.

[A17] The information processing apparatus according to [A1], wherein when a borderless image exists in only any one of the first image of the area that is being presented to the field of view of the user and the second image outside the area, a setting of the output is inquired.

[A18] The information processing apparatus according to [A1], wherein when a uniform image exists in the second image outside the area of the field of view of the user, a warning of the output is notified.

[A19] The information processing apparatus according to [A1], wherein when an image instructed by the user to be output includes an image inadequate to the output, the output is performed excluding the inadequate image.

[A20] An information processing program causing a computer to execute information processing, the information processing including:

when a device that changes an image presented in a field of view of a user along with a motion direction of the user receives an output instruction, performing a control to output an image including a first image of an area being presented to the field of view of the user at a time when the output instruction is received and a second image outside the area.

The present disclosure described above has the following effects.

With the information processing apparatus of [A1], when a device that changes a presented image along with a motion direction of a user receives an output instruction, it is possible to output the image.

With the information processing apparatus of [A2], it is possible to generate an electronic image file.

With the information processing apparatus of [A3], it is possible to generate a three-dimensional object.

With the information processing apparatus of [A4], when an area that a user is seeing includes three-dimensional data, it is possible to output the three-dimensional data to an output destination.

With the information processing apparatus of [A5], it is possible to print an image.

With the information processing apparatus of [A6], it is possible to cause a format of an image to be output on a two-dimensional recording medium, to be a borderless format.

With the information processing apparatus of [A7], it is possible to determine a form of an image to be output on a two-dimensional recording medium according to whether an output destination is capable of performing a borderless printing.

With the information processing apparatus of [A8], when an output destination is capable of performing a borderless printing, it is possible to cause a form of an image to be output on a two-dimensional recording medium, to be a borderless form.

With the information processing apparatus of [A9], when an output destination is incapable of performing a borderless printing, it is possible to cause a form of an image to be output on a two-dimensional recording medium, to be a bordered form.

With the information processing apparatus of [A10], the second image is caused to be an image that is presentable, but is not included in a field of view of a user at a time when an output instruction is received.

With the information processing apparatus of [A11], the second image is caused to be an image that is located at a position on any one or more of a left side, a right side, an upper side, and a lower side of the first image.

With the information processing apparatus of [A12], when outputting the image including the first image and the second image, it is possible to perform the output so that the first image and the second image are distinguished from each other.

With the information processing apparatus of [A13], it is possible to determine in which direction of the first image the second image is arranged.

With the information processing apparatus of [A14], it is possible to determine a position of the first image and arrange the second image around the position.

With the information processing apparatus of [A15], an image non-display area exists at an edge of a display area of an image presented by a device, it is possible to preferentially output a bordered image.

With the information processing apparatus of [A16], no image non-display area exists at an edge of a display area of an image presented by a device, it is possible to preferentially output a borderless image.

With the information processing apparatus of [A17], when a borderless image exists in only any one of the first image and the second image, it is possible to inquire a setting of the output.

With the information processing apparatus of [A18], when a uniform image exists in the second image, it is possible to notify a warning of the output.

With the information processing apparatus of [A19], when an image instructed by the user to be output includes an image inadequate to the output, it is possible to perform the output excluding the inadequate image.

With the information processing program of [A20], when a device that changes a presented image along with a motion direction of a user receives an output instruction, it is possible to output the image.

In addition, the exemplary embodiments described above may be construed as follows.

For example, the present disclosure has the following object.

A head mounted display or the like is used as one of the virtual reality (VR) technologies, to interact with mainly the vision among the human sensory organs and artificially generate realistic environments.

There is a demand to print an image that is presented by the head mounted display or the like.

The present disclosure may provide an information processing apparatus and an information processing program that, when a device that changes a presented image along with a motion direction of a user receives an output instruction of the image, may output the image.

[B1] An information processing apparatus including:

a controller that, when a device that changes an image presented in a field of view of a user along with a motion direction of the user receives an output instruction of the image, performs a control to output an image of an area being presented to the user at a time when the output instruction is received.

[B2] The information processing apparatus according to [B1], wherein the controller outputs the image to a module that generates an electronic image file of the image.

[B3] The information processing apparatus according to [B1], wherein the controller outputs the image to a module that generates a three-dimensional object from the image.

[B4] The information processing apparatus according to [B3], wherein when the area being presented in the field of view of the user includes three-dimensional data, at least the three-dimensional data is output to an output destination.

[B5] The information processing apparatus according to [B1], wherein the controller outputs the image to a module that prints the image on a two-dimensional recording medium.

[B6] The information processing apparatus according to [B5], wherein when the output instruction is received, a form of the image to be output on the two-dimensional recording medium is caused to be a borderless form.

[B7] The information processing apparatus according to [B5], wherein when the output instruction is received, a form of the image to be output on the two-dimensional recording medium is determined according to whether an output destination is capable of performing borderless printing.

[B8] The information processing apparatus according to [B7], wherein when the output instruction is received and when the output destination is capable of performing the borderless printing, the form of the image to be output on the two-dimensional recording medium is caused to be a borderless form.

[B9] The information processing apparatus according to [B7], wherein when the output instruction is received and when the output destination is incapable of performing the borderless printing, the form of the image to be output on the two-dimensional recording medium is caused to be a bordered form.

[B10] The information processing apparatus according to [B1], wherein when an image non-display area exists at an edge of a display area of the image presented by the device and when the output instruction is received, a bordered image is preferentially output.

[B11] The information processing apparatus according to [B1], wherein when an image non-display area does not exist at an edge of a display area of the image presented by the device and when the output instruction is received, a borderless image is preferentially output.

[B12] An information processing program that causes a computer to execute information processing, the information processing including:

a controller that when a device that changes an image presented in a field of view of a user along with a motion direction of the user receives an output instruction of the image, performs a control to output an image of an area being presented to the user at a time when the output instruction is received.

The present disclosure described above has the following effects.

With the information processing apparatus of [B1], when a device that changes a presented image along with a motion direction of a user receives an output instruction of the image, it is possible to output the image.

With the information processing apparatus of [B2], it is possible to generate an electronic image file of an image.

With the information processing apparatus of [B3], it is possible to generate a three-dimensional object.

With the information processing apparatus of [B4], when an area that a user is seeing includes three-dimensional data, it is possible to output the three-dimensional data to an output destination.

With the information processing apparatus of [B5], it is possible to generate an image on a two-dimensional recording medium.

With the information processing apparatus of [B6], it is possible to cause a format of an image to be output on a two-dimensional recording medium, to be a borderless format.

With the information processing apparatus of [B7], it is possible to determine a form of an image to be output on a two-dimensional recording medium according to whether an output destination is capable of performing a borderless printing.

With the information processing apparatus of [B8], when an output destination is capable of performing a borderless printing, it is possible to cause a form of an image to be output on a two-dimensional recording medium, to be a borderless form.

With the information processing apparatus of [B9], when an output destination is incapable of performing a borderless printing, it is possible to cause a form of an image to be output on a two-dimensional recording medium, to be a bordered form.

With the information processing apparatus of [B10], an image non-display area exists at an edge of a display area of an image presented by a device, it is possible to preferentially output a bordered image.

With the information processing apparatus of [B11], no image non-display area exists at an edge of a display area of an image presented by a device, it is possible to preferentially output a borderless image.

With the information processing program of [B12], when a device that changes a presented image along with a motion direction of a user receives an output instruction of the image, it is possible to output the image.

In addition, the exemplary embodiments described above may be construed as follows.

For example, the present disclosure has the following object.

When a printing instruction is given an image forming apparatus capable of performing the borderless printing, either a setting for borderless printing or a setting for non-borderless printing is selectable. One of the settings is selected by an operator's operation. Since the operator needs to perform the selecting operation, a process becomes complicated, as compared with a case where the operation is performed in an image forming apparatus which is incapable of performing the borderless printing.

The present disclosure may provide an image forming instruction apparatus and an image forming instruction program which facilitate an operation related to the setting for borderless printing when the printing instruction is given to the image forming apparatus capable of performing the borderless printing.

[C1] An image forming instruction apparatus including:

a selector that selects either a setting for borderless printing or a setting for non-borderless printing based on print data.

[C2] The image forming instruction apparatus according to [C1], wherein the selector selects either the setting for borderless printing or the setting for non-borderless printing based on an image at an outer edge of the print data.

[C3] The image forming instruction apparatus according to [C2], wherein the selector selects the setting for borderless printing when there is an image on the outer edge of the print data.

[C4] The image forming instruction apparatus according to [C2], wherein the selector selects the setting for non-borderless printing when there is no image on the outer edge of the print data.

[C5] The image forming instruction apparatus according to [C1], wherein the selector selects the setting for borderless printing or the setting for non-borderless printing, for each edge of the print data.

[C6] The image forming instruction apparatus according to [C5], further including a generator that generates an image having a leading edge that is set to the setting for non-borderless printing when the setting for borderless printing and the setting for non-borderless printing are mixed in the print data.

[C7] The image forming instruction apparatus according to [C6], wherein the generator generates the image having the leading edge that is set to the setting for non-borderless printing, by rotating the print data.

[C8] The image forming instruction apparatus according to [C1], wherein the selector selects either the setting for borderless printing or the setting for non-borderless printing based on a generating process of the print data.

[C9] The image forming instruction apparatus according to [C8], wherein the selector selects the setting for borderless printing when the print data is an image generated by taking a screenshot.

[C10] The image forming instruction apparatus according to [C1], further including:

a presentation unit that presents a selection result obtained by the selector.

[C11] The image forming instruction apparatus according to [C10], wherein the presentation unit presents the selection result so as to be changeable by an operator.

[C12] An image forming instruction program that causes a computer to execute an image forming instruction process, the image forming instruction process including:

selecting either a setting for borderless printing or a setting for non-borderless printing based on print data.

The present disclosure described above has the following effects.

With the image forming instruction apparatus of [C1], when a printing instruction is given to an image forming apparatus capable of performing borderless printing, it is possible to facilitate the operation related to the setting for borderless printing.

With the image forming instruction apparatus of [C2], it is possible to select one of the setting for borderless printing and the setting for non-borderless printing by using the image at the outer edge of the print data.

With the image forming instruction apparatus of [C3], when there is an image on the outer edge of the print data, it is possible to select the setting for borderless printing.

With the image forming instruction apparatus of [C4], when there is no image on the outer edge of the print data, it is possible to select the setting for non-borderless printing.

With the image forming instruction apparatus of [C5], it is possible to select the setting for borderless printing or the setting for non-borderless printing for each edge of the print data.

With the image forming instruction apparatus of [C6], it is possible to generate an image having a leading edge that is set to the setting for non-borderless printing when the setting for borderless printing and the setting for non-borderless printing are mixed in the printing data.

With the image forming instruction apparatus of [C7], it is possible to generate an image having the leading edge that is set to the setting for non-borderless printing, by rotating the print data.

With the image forming instruction apparatus of [C8], it is possible to select one of the setting for borderless printing and the setting for non-borderless printing based on a process of generating the print data.

With the image forming instruction apparatus of [C9], it is possible to select the setting for borderless printing when the print data is an image generated by a screenshot.

With the image forming instruction apparatus of [C10], it is possible to present the selection result.

With the image forming instruction apparatus of [C11], it is possible to present the selection result so that the selection result can be changed by an operator.

With the image forming instruction program of [C12], when a printing instruction is given to an image forming apparatus capable of borderless printing, it is possible to facilitate the operation related to the setting for borderless printing.

In addition, the exemplary embodiments described above may be construed as follows. [D1] An image forming apparatus in which a fixing device or a transfer device is replaceable, the image forming apparatus including:

a warning unit that issues a warning when a borderless printing function is used and when the fixing device or the transfer device is not for borderless printing.

[D2] The image forming apparatus according to [D1], wherein the use of the borderless printing function is restricted when the warning is issued.

[D3] The image forming apparatus according to [D2], wherein the restriction on the use of the borderless printing function is a restriction on the number of times of use or a restriction on a user.

[D4] An image forming apparatus including:

an image forming processing unit that, when a fixing device for borderless printing or a transfer device for borderless printing is not attached thereto and when a designation of a borderless printing function is received, performs another image forming process different from that in a case where the fixing device for borderless printing and the transfer device for borderless printing are attached.

[D5] The image forming apparatus according to [D4], wherein the other image forming process lowers the density of an image of a peripheral portion which is an edge.

[D6] The image forming apparatus according to [D4], wherein the other image forming process executes cleaning of the transfer device or the fixing device more frequently than in the case where the fixing device for borderless printing and the transfer device for borderless printing are mounted.

[D7] The image forming apparatus according to any one of [D1] to [D6], further including a checking unit that checks whether or not software capable of using borderless printing is introduced, when the fixing device for borderless printing and the transfer device for borderless printing are attached.

[D8] The image forming apparatus according to [D7], further including an introduction unit that, when the software capable of using the borderless printing is not introduced, introduces the software via a communication line.

[D9] An information processing program that causes a computer in an image forming apparatus in which a fixing device or a transfer device is replaceable to perform an image forming process, the process including issuing a warning when a borderless printing function is used and when the fixing device or the transfer device is not for borderless printing.

[D10] An information processing program that causes a computer in an image forming apparatus to perform an image forming process, the process including:

when a fixing device for borderless printing or a transfer device for borderless printing is not attached and when a designation of a borderless printing function is received, performing another image forming process different from that in a case where the fixing device for borderless printing and the transfer device for borderless printing are attached.

The present disclosure described above has the following effects.

With the image forming apparatus of [D1], when a transfer device and a fixing device which are suitable for borderless printing are not attached, it is possible to notify the fact to a user.

With the image forming apparatus of [D2], in a case where the fixing device is not for borderless printing or the transfer device is not for borderless printing, it is possible to restrict the use of the borderless printing function.

With the image forming apparatus of [D3], the use of borderless printing can be restricted according to the number of times of use or a user.

With the image forming apparatus of [D4], it is possible to prevent deterioration in image quality, failure, etc. due to the borderless printing.

With the image forming apparatus of [D5], it is possible to reduce the load of cleaning.

With the image forming apparatus of [D6], it is possible to reduce a cleaning leakage due to the borderless printing.

With the image forming apparatus of [D7], it is possible to prevent software capable of using the borderless printing from not being introduced even though a fixing device for borderless printing and a transfer device for borderless printing are attached.

With the image forming apparatus of [D8], when a fixing device for borderless printing and a transfer device for borderless printing are attached, it is possible to introduce software capable of using borderless printing.

With the information processing program of [D9], when a transfer device and a fixing device which are suitable for borderless printing are not attached, it is possible to notify the fact to a user.

With the information processing program of [D10], it is possible to prevent a deterioration in image quality, failure, etc. due to borderless printing.

In addition, the exemplary embodiments described above may be construed as follows. [E1] An image forming apparatus in which a fixing device or a transfer device is replaceable, the image forming apparatus including:

a warning unit that issues a warning when a borderless printing function is used and when the fixing device or the transfer device is not for borderless printing, wherein when the warning is issued, the number of times of use of the borderless printing function or a user is restricted.

[E2] An image forming apparatus including:

an image forming processing unit that, when a fixing device for borderless printing or a transfer device for borderless printing is not attached thereto and when a designation of a borderless printing function is received, performs another image forming process different from that in a case where the fixing device for borderless printing and the transfer device for borderless printing are attached.

[E3] The image forming apparatus according to [E2], wherein the other image forming process lowers the density of an image of a peripheral portion which is an edge.

[E4] The image forming apparatus according to [E2], wherein the other image forming process executes cleaning of the transfer device or the fixing device more frequently than in the case where the fixing device for borderless printing and the transfer device for borderless printing are mounted.

[E5] The image forming apparatus according to any one of [E1] to [E4], further including a checking unit that checks whether or not software capable of using borderless printing is introduced, when the fixing device for borderless printing and the transfer device for borderless printing are attached.

[E6] The image forming apparatus according to [E5], further including an introduction unit that, when the software capable of using the borderless printing is not introduced, introduces the software via a communication line.

[E7] An information processing program that causes a computer in an image forming apparatus to perform an image forming process, the process including:

issuing a warning when a borderless printing function is used and when the fixing device or the transfer device is not for borderless printing, wherein when the warning is issued, the number of times of use of the borderless printing function or a user is restricted.

[E8] An information processing program that causes a computer in an image forming apparatus to perform an image forming process, the process including:

when a fixing device for borderless printing or a transfer device for borderless printing is not attached and when a designation of a borderless printing function is received, performing another image forming process different from that in a case where the fixing device for borderless printing and the transfer device for borderless printing are attached.

The present disclosure described above has the following effects.

With the image forming apparatus of [E1], when a transfer device and a fixing device which are suitable for borderless printing are not attached, it is possible to notify the fact to a user. In addition, the use of the borderless printing can be restricted according to the number of times of use or a user.

With the image forming apparatus of [E2], it is possible to prevent deterioration in image quality, failure, etc. due to the borderless printing.

With the image forming apparatus of [E3], it is possible to reduce the load of cleaning.

With the image forming apparatus of [E4], it is possible to reduce a cleaning leakage due to the borderless printing.

With the image forming apparatus of [E5], it is possible to prevent software capable of using the borderless printing from not being introduced even though a fixing device for borderless printing and a transfer device for borderless printing are attached.

With the image forming apparatus of [E6], when a fixing device for borderless printing and a transfer device for borderless printing are attached, it is possible to introduce software capable of using borderless printing.

With the information processing program of [E7], when a transfer device and a fixing device which are suitable for borderless printing are not attached, it is possible to notify the fact to a user. In addition, the use of the borderless printing can be restricted according to the number of times of use or a user.

With the information processing program of [E8], it is possible to prevent a deterioration in image quality, failure, etc. due to borderless printing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores a plurality of pre-stored images of a user captured by a camera from a plurality of different capturing angles and a plurality of different capturing distances with respect to a position of the user;
a controller that, when a device that changes a presented image in a field of view of the user along with a motion direction of the user receives an output instruction, performs a control to output an image including a user's own image and a presentation image of an area being presented to the user at a time when the output instruction is received, wherein the user's own image is selected from the pre-stored images of the user, and wherein the capturing angle and the capturing distance of the user's own image corresponds to the field of view of the user at the time when the output instruction is received.

2. The information processing apparatus according to claim 1, wherein the controller outputs the image including the presentation image and the user's own image to a module that generates an electronic image file of the image including the presentation image and the user's own image.

3. The information processing apparatus according to claim 1, wherein the controller outputs the image including the presentation image and the user's own image to a module that generates a three-dimensional object from the image including the presentation image and the user's own image.

4. The information processing apparatus according to claim 3, wherein when the area being presented to the user includes three-dimensional data, at least the three-dimensional data is output to an output destination.

5. The information processing apparatus according to claim 1, wherein the controller outputs the image including the presentation image and the user's own image to a module that prints the image including the presentation image and the user's own image on a two-dimensional recording medium.

6. The information processing apparatus according to claim 5, wherein when the output instruction is received, a form of the image to be output on the two-dimensional recording medium is caused to be a borderless form.

7. The information processing apparatus according to claim 5, wherein when the output instruction is received, a form of the image to be output on the two-dimensional recording medium is determined according to whether an output destination is capable of performing borderless printing.

8. The information processing apparatus according to claim 7, wherein when the output instruction is received and when the output destination is capable of performing the borderless printing, the form of the image to be output on the two-dimensional recording medium is caused to be a borderless form.

9. The information processing apparatus according to claim 7, wherein when the output instruction is received and when the output destination is incapable of performing the borderless printing, the form of the image to be output on the two-dimensional recording medium is caused to be a bordered form.

10. The information processing apparatus according to claim 1, wherein the controller performs a control to output an image including the presentation image, the user's own image, and a user image of another user.

11. The information processing apparatus according to claim 10, wherein when there is another user who is using the same contents as contents being processed in the device, the controller performs the control to output the image including the presentation image, the user's own image, and the user image of the other user.

12. The information processing apparatus according to claim 10, wherein when the output instruction is received and when another user is present nearby, the controller performs the control to output the image including the presentation image, the user's own image, and the user image of the other user.

13. The information processing apparatus according to claim 1, wherein when the user moves to a predetermined position in contents being processed in the device, the controller urges the user to make the output instruction or determines that the output instruction is received and performs the control of the output.

14. The information processing apparatus according to claim 1, wherein when the output instruction is received, the controller receives a setting change of the user's own image.

15. The information processing apparatus according to claim 14, wherein the setting change is an arrangement position or angle of the user's own image.

16. The information processing apparatus according to claim 14, wherein the setting change is a facial expression in the user's own image.

17. The information processing apparatus according to claim 1, wherein when performing the output, the controller generates information for managing history information of the user and the image to be output.

18. The information processing apparatus according to claim 17, wherein the information is embedded in the image to be output.

19. An non-transitory computer readable medium storing a program that causes a computer to execute information processing and storing a plurality of pre-stored images of a user captured by a camera from a plurality of different capturing angles and a plurality of different capturing distances with respect to a position of the user, the information processing comprising:

when a device that changes a presented image in a field of view of the user along with a motion direction of the user receives an output instruction, performing a control to output an image including a user's own image and a presentation image of an area being presented to the user at a time when the output instruction is received, wherein the user's own image is selected from the pre-stored images of the user, and wherein the capturing angle and the capturing distance of the user's own image corresponds to the field of view of the user at the time when the output instruction is received.

* * * * *